(12) United States Patent
Song

(10) Patent No.: US 10,911,667 B2
(45) Date of Patent: Feb. 2, 2021

(54) OPTICAL CAMERA SYSTEM

(71) Applicant: TDK TAIWAN CORP., Taoyuan (TW)

(72) Inventor: Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/409,053

(22) Filed: May 10, 2019

(65) Prior Publication Data
US 2019/0349523 A1 Nov. 14, 2019

Related U.S. Application Data

(60) Provisional application No. 62/670,580, filed on May 11, 2018, provisional application No. 62/688,694, filed on Jun. 22, 2018.

(51) Int. Cl.
| | |
|---|---|
| *H04N 5/232* | (2006.01) |
| *G03B 13/36* | (2006.01) |
| *G03B 5/04* | (2006.01) |
| *H04N 5/225* | (2006.01) |
| *H04N 5/265* | (2006.01) |
| *H04N 9/04* | (2006.01) |
| *G06T 7/00* | (2017.01) |

(52) U.S. Cl.
CPC .......... *H04N 5/23229* (2013.01); *G03B 5/04* (2013.01); *G03B 13/36* (2013.01); *G06T 7/0002* (2013.01); *H04N 5/2254* (2013.01); *H04N 5/265* (2013.01); *G03B 2205/0015* (2013.01); *G03B 2205/0069* (2013.01); *G03B 2205/0076* (2013.01); *H04N 9/0451* (2018.08)

(58) Field of Classification Search
CPC .. H04N 5/23229; H04N 5/265; H04N 5/2254; H04N 5/2253; H04N 9/0451; G03B 5/04; G03B 13/36; G03B 2205/0069; G03B 2205/0076; G03B 2205/0015; G06T 7/0002
See application file for complete search history.

(56) References Cited

U.S. PATENT DOCUMENTS

| | | | | |
|---|---|---|---|---|
| 8,773,562 B1 * | 7/2014 | Fan | ............ | H01L 27/14654 |
| | | | | 348/308 |
| 9,083,873 B1 * | 7/2015 | Lewkow | ............ | H04N 5/23212 |
| 9,681,052 B1 * | 6/2017 | Lewkow | ............ | H04N 5/23287 |

(Continued)

*Primary Examiner* — Lin Ye
*Assistant Examiner* — John H Morehead, III
(74) *Attorney, Agent, or Firm* — Muncy, Geissler, Olds & Lowe, P.C.

(57) ABSTRACT

An optical camera system includes a first lens driving mechanism, a second lens driving mechanism, and a casing. The first lens driving mechanism includes a first outer frame and a first driving assembly. The first driving assembly is configured to drive a first optical component to move relative to the first outer frame. The second lens driving mechanism includes a second outer frame and a second driving assembly. The second driving assembly is configured to drive a second optical component to move relative to the second outer frame. The casing has at least three side walls perpendicular to each other, at least two side walls of the first outer frame face two side walls of the casing, and at least two side walls of the second outer frame face two side walls of the casing.

18 Claims, 45 Drawing Sheets

(56) References Cited

U.S. PATENT DOCUMENTS

| | | | |
|---|---|---|---|
| 2004/0218099 A1* | 11/2004 | Washington | H04N 21/4382 348/571 |
| 2012/0236248 A1* | 9/2012 | Kang | G03B 3/04 349/200 |
| 2013/0265394 A1* | 10/2013 | Lim | H04N 5/2253 348/46 |
| 2017/0146771 A1* | 5/2017 | Ho | G03B 17/12 |
| 2017/0150046 A1* | 5/2017 | Sondhi | H04N 5/23293 |
| 2017/0195566 A1* | 7/2017 | Hu | H01L 21/0217 |
| 2017/0244878 A1* | 8/2017 | Wang | H04N 5/2258 |
| 2017/0315376 A1* | 11/2017 | Hu | G02B 7/09 |
| 2017/0353634 A1* | 12/2017 | Kim | H04N 5/2258 |
| 2018/0074415 A1* | 3/2018 | Wu | G11B 7/0935 |
| 2018/0196219 A1* | 7/2018 | O | G03B 19/22 |
| 2018/0234629 A1* | 8/2018 | Tseng | G02B 7/021 |
| 2018/0352161 A1* | 12/2018 | Heo | H04N 5/23287 |
| 2018/0364450 A1* | 12/2018 | Lee | H04N 5/23248 |
| 2018/0367714 A1* | 12/2018 | Im | H04N 5/2254 |

* cited by examiner

OPTICAL CAMERA SYSTEM

CROSS REFERENCE TO RELATED APPLICATIONS

This application claims the benefit of U.S. Provisional Application No. 62/670,580, filed May 11, 2018, and U.S. Provisional Application No. 62/688,694, filed Jun. 22, 2018, the entirety of which are incorporated by reference herein.

BACKGROUND OF THE DISCLOSURE

Field of the Disclosure

The present disclosure relates to an optical camera system, and in particular it relates to an optical camera system having a multiple-lens driving mechanism.

Description of the Related Art

As technology has progressed, many kinds of electronic devices, such as tablet computers and smart phones, have developed the functionality of digital photography or video recording. A user can operate the electronic device to capture various images using the camera module of the electronic device, and electronic devices with camera modules have become popular.

Recently, a type of camera module that has multiple lenses has become popular. However, such multiple-lens driving modules are used for driving the lenses in current multiple-lens camera modules, and they are usually so close to each other that magnetic interference is generated between the magnets in different lens-driving modules, affecting the focus speed and accuracy of the lens.

Therefore, how to design an optical camera system capable of preventing magnetic interference between different lens-driving modules is an important subject for further research and development.

BRIEF SUMMARY OF THE DISCLOSURE

Accordingly, one objective of the present disclosure is to provide an optical camera system to solve the problems described above.

According to some embodiments of the disclosure, an optical camera system includes a first lens driving mechanism, a second lens driving mechanism and a casing. The first lens driving mechanism is configured to hold a first optical component and includes a first outer frame and a first driving assembly. The first outer frame has at least three side walls perpendicular to each other. The first driving assembly is configured to drive the first optical component to move relative to the first outer frame. The second lens driving mechanism is configured to hold a second optical component and includes a second outer frame and a second driving assembly. The second outer frame has at least three side walls perpendicular to each other. The second driving assembly is configured to drive the second optical component to move relative to the second outer frame. The casing has at least three side walls perpendicular to each other, at least two side walls of the first outer frame face two side walls of the casing, and at least two side walls of the second outer frame face two side walls of the casing.

According to some embodiments, the optical camera system further includes an outer frame configured to be disposed between the first outer frame, the second outer frame, and the casing after the first optical component and the second optical component are arranged in parallel, so that the first outer frame and the second outer frame do not move relative to the casing.

According to some embodiments, the second driving assembly includes a shape memory alloy driving assembly.

According to some embodiments, the second driving assembly includes a first driving magnetic member and a first driving coil.

According to some embodiments, the first lens driving mechanism and the second lens driving mechanism are arranged in a first direction, and the first driving magnetic member has a long strip-shaped structure extending in the first direction.

According to some embodiments, the first driving magnetic member is not disposed between the first optical component and the second optical component.

According to some embodiments, the first lens driving mechanism further includes a position sensing assembly for sensing a distance of the first optical component moving along an optical axis of the first optical component.

According to some embodiments, the first lens driving mechanism further includes a circuit member, and a portion of the position sensing assembly is disposed on the circuit member.

According to some embodiments, the second lens driving mechanism further includes a reflecting unit.

According to some embodiments, a direction of an incident light entering the first optical component is different from a direction of an incident light entering the second optical component.

According to some embodiments, the optical camera system further includes a third lens driving mechanism and a processing circuit. The third lens driving mechanism is configured to hold a third optical component, and the third lens driving mechanism includes a third outer frame and a third driving assembly. The third outer frame has at least three side walls perpendicular to each other. The third driving assembly is configured to drive the third optical component to move relative to the third outer frame. The first lens driving mechanism, the second lens driving mechanism and the third lens driving mechanism are configured to respectively generate a first image, a second image, and a third image, and the processing circuit is configured to composite the first image, the second image and the third image.

According to some embodiments, the processing circuit is configured to compare the first image, the second image, and the third image, and when a graph is included in the first image but is not included in the second image and the third image, the processing circuit determines that the graph is a noise.

According to some embodiments, the first lens driving mechanism has a first focal length, the second lens driving mechanism has a second focal length, the third lens driving mechanism has a third focal length, the third focal length is greater than the second focal length, the second focal length is greater than the first focal length, and the processing circuit is configured to composite the first image, the second image and the third image according to the third image.

According to some embodiments, the third image corresponds to a region in the second image, and the second image corresponds to a region in the first image.

According to some embodiments, at least one of the first image, the second image and the third image includes infrared light information.

According to some embodiments, at least one of the first image, the second image and the third image is a color image, and at least one of the first image, the second image and the third image is a black and white image.

According to some embodiments of the disclosure, the first image, the second image and the third image respectively include information of different colors, and information of colors of the first image, the second image and the third image are not the same.

According to some embodiments, the first image, the second image and the third image respectively include red light information, blue light information and green light information.

According to some embodiments, each of the first lens driving mechanism, the second lens driving mechanism and the third lens driving mechanism has a circuit pin, and the circuit pins are disposed on the same side of the optical camera system.

According to some embodiments, the first optical component has a first focal length, the second optical component has a second focal length, and the second focal length is at least three times the first focal length.

The present disclosure provides an optical camera system disposed in an electronic device, and the optical camera system has a plurality of lens driving mechanisms that can be arranged in different manners so as to obtain different photography effects. In an embodiment, the first lens driving mechanism and the second lens driving mechanism are arranged in the first direction and there is no magnetic member of the second lens driving mechanism disposed between the first optical component and the second optical component. Thus, the problem of electromagnetic interference can be avoided.

In addition, in another embodiment, the plurality of lens driving mechanisms may have different focal lengths, and they can photograph the same object to obtain a plurality of images. Then, the images are composited by the processing circuit to obtain a clearer composite image.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
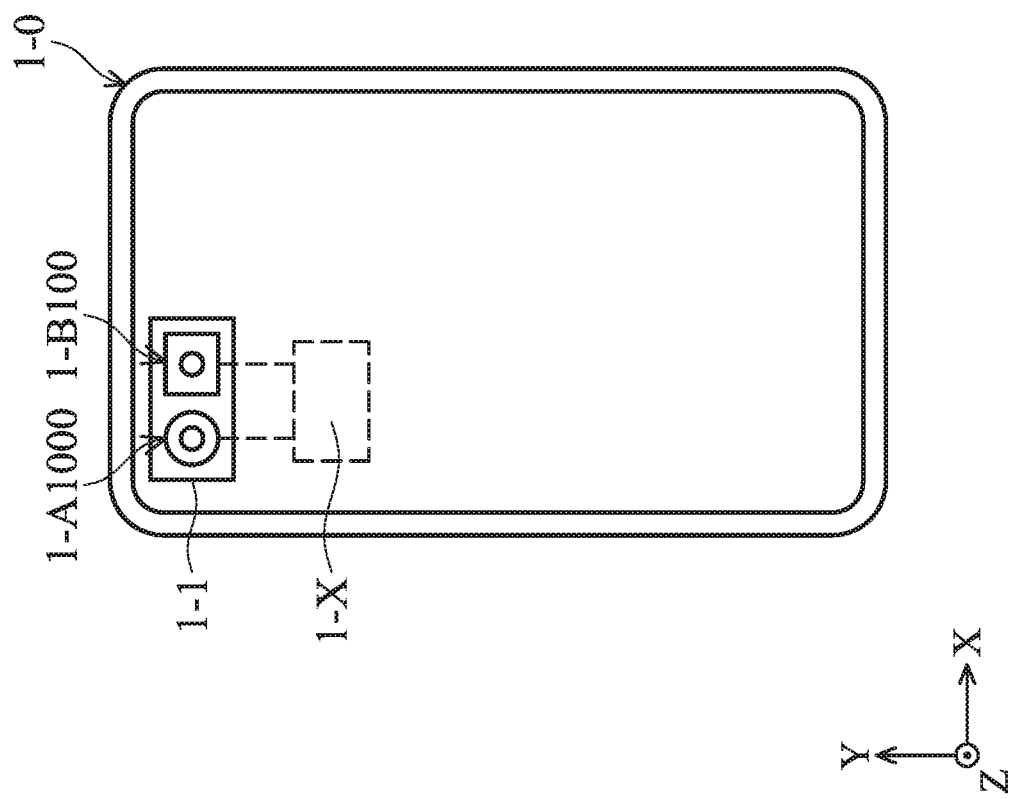
FIG. 1 is a schematic diagram of an electronic device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

The terms "first", "second", "third", "fourth", and the like are merely generic identifiers and, as such, may be interchanged in various embodiments. For example, while an element may be referred to as a "first" element in some embodiments, the element may be referred to as a "second" element in other embodiments.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

First Group of Embodiments

Please refer to FIG. 1, which is a schematic diagram of an electronic device 1-0 according to an embodiment of the present disclosure. In the embodiment of the present invention, an optical camera system 1-1 can be installed in the electronic device 1-0 and includes a first lens driving mechanism 1-A1000 and a second lens driving mechanism 1-B100. The focal lengths of the first lens driving mechanism 1-A1000 and the second lens driving mechanism 1-B100 are different, and they are adjacent to each other. The electronic device 1-0 can include a processing circuit 1-X configured to be electrically connected to the first lens driving mechanism 1-A1000 and the second lens driving mechanism 1-B100.

Figure 2:
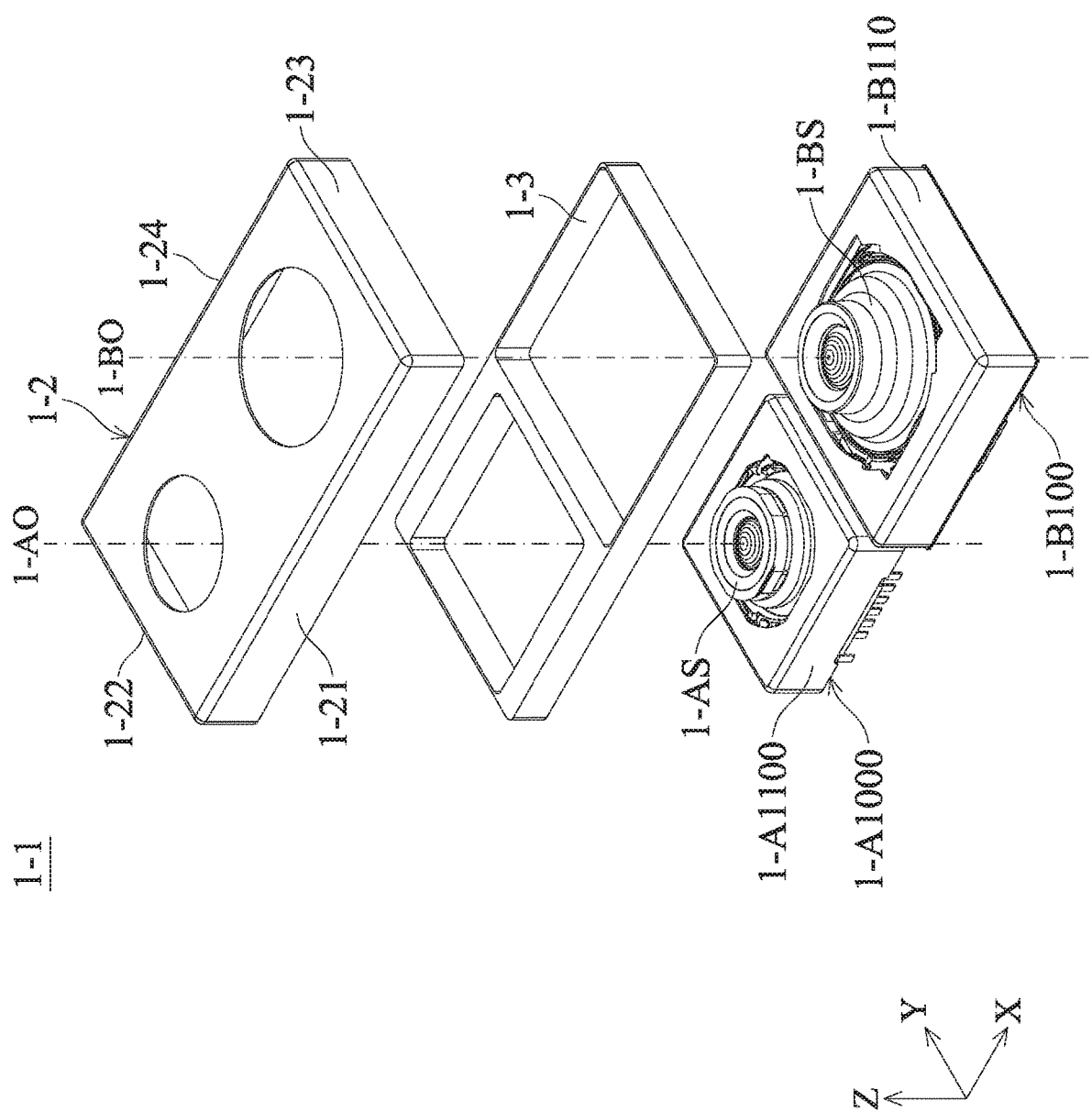
FIG. 2 is a partial exploded diagram of the optical camera system according to an embodiment of the present disclosure.

Please refer to FIG. 2, which is a partial exploded diagram of the optical camera system 1-1 according to an embodiment of the present disclosure. The optical camera system 1-1 can be installed in a portable electronic device, such as a smart phone (such as the electronic device 1-0) or a tablet computer. The optical camera system 1-1 includes a casing 1-2, an outer frame 1-3, a first lens driving mechanism 1-A1000, and a second lens driving mechanism 1-B100. The first lens driving mechanism 1-A1000 and the second lens driving mechanism 1-B100 are, for example, voice coil motors (VCM) for driving an optical component (for example, a lens) and have the autofocus (AF) and/or optical image stabilization (OIS) functions. The casing 1-2 has four side walls perpendicular to each other, such as a side walls 1-21, a side walls 1-22, a side walls 1-23, and a side walls 1-24.

The first lens driving mechanism 1-A1000 has a first outer frame 1-A1100, the first outer frame 1-A1100 has four side walls perpendicular to each other, and at least two side walls face two side walls of the casing 1-2 (for example, the two side walls of the first outer frame 1-A1100 perpendicular to the Y-axis are parallel to the side wall 1-21 and the side wall 1-24). The second lens driving mechanism 1-B100 has a second outer frame 1-B110, and the second outer frame 1-B110 has four side walls perpendicular to each other, and at least two side walls of the second outer frame 1-B110 face two side walls of the casing 1-2 (for example, the two side walls of the second outer frame 1-B110 perpendicular to the Y axis are parallel to the side wall 1-21 and the side wall 1-24).

As shown in FIG. 2, the first lens driving mechanism 1-A1000 is configured to hold a first optical component 1-AS, and the second lens driving mechanism 1-B100 is configured to hold a second optical component 1-BS. The outer frame 1-3 is disposed between the first outer frame 1-A1100, the second outer frame 1-B110, and the casing 1-2 after the first optical component 1-AS and the second optical component 1-BS are arranged in parallel, so as to prevent relative movement of the first outer frame 1-A1100, the second outer frame 1-B110, and the casing 1-2, and an optical axis 1-AO of the first lens driving mechanism 1-A1000 is parallel to an optical axis 1-BO of the second lens driving mechanism 1-B100.

Figure 3:
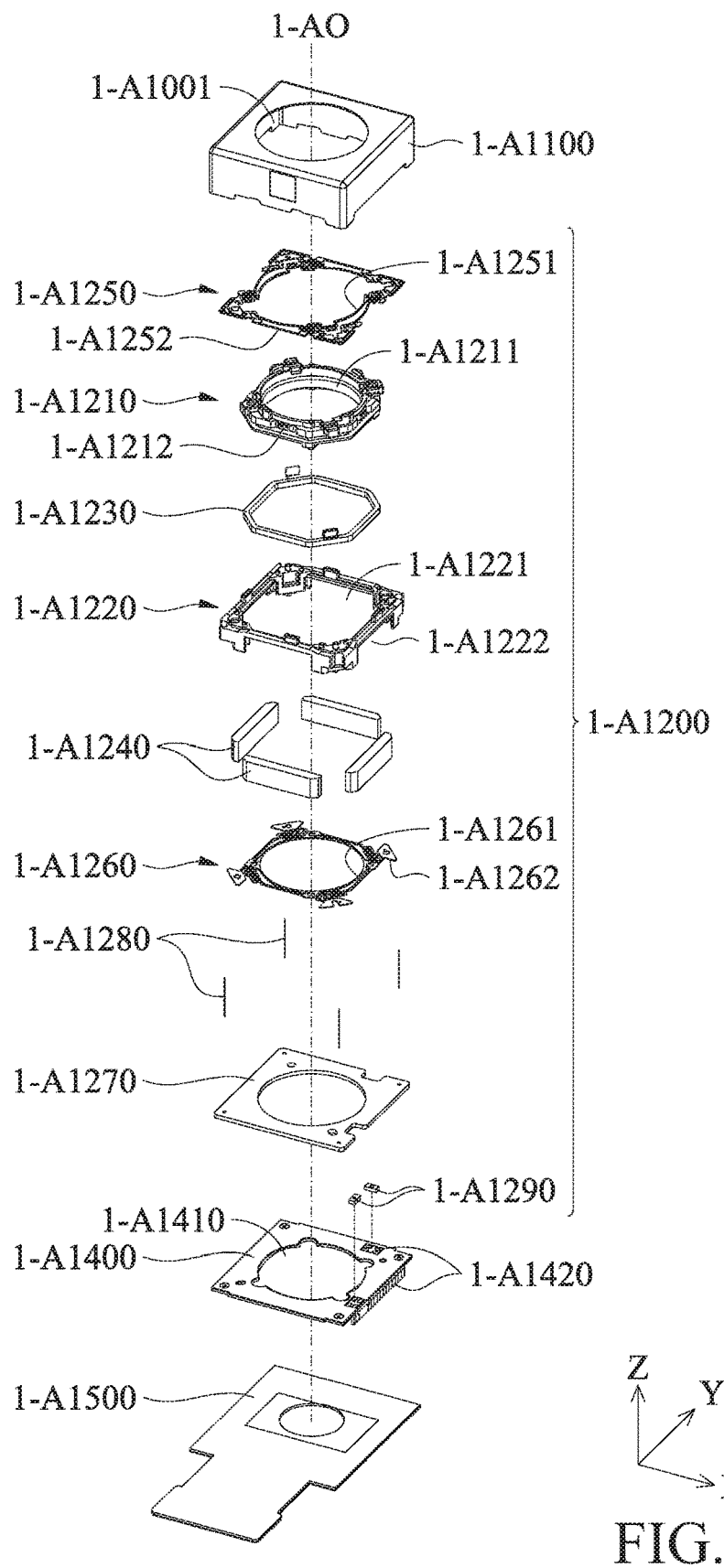
FIG. 3 is an exploded diagram of the first lens driving mechanism according to an embodiment of the present disclosure.

Please refer to FIG. 3, which is an exploded diagram of the first lens driving mechanism 1-A1000 according to an embodiment of the present disclosure. In this embodiment, the first lens driving mechanism 1-A1000 includes a first outer frame 1-A1100, a first driving assembly 1-A1200, a base 1-A1400, an image sensor 1-A1500. The first outer frame 1-A1100 and the base 1-A1400 can form a hollow box, and the first outer frame 1-A1100 surrounds the first driving assembly 1-A1200. Therefore, the first driving assembly 1-A1200 can be accommodated in the aforementioned box. The image sensor 1-A1500 is disposed on a side of the box, the first light-entering hole 1-A1001 is formed on the first outer frame 1-A1100, and the base 1-A1400 has an opening 1-A1410 corresponding to the first light-entering hole 1-A1001. Thus, the light can reach the image sensor 1-A1500 through the first light-entering hole 1-A1001, the first optical component 1-AS, and the opening 1-A1410 in sequence, so as to form an image on the image sensor 1-A1500.

The first driving assembly 1-A1200 comprises a lens holder 1-A1210, a frame 1-A1220, at least one first electromagnetic driving assembly 1-A1230, at least one second electromagnetic driving assembly 1-A1240, a first elastic member 1-A1250, a second elastic member 1-A1260, a coil board 1-A1270, a plurality of suspension wires 1-A1280, and a position sensing assembly (including a plurality of position detectors 1-A1290).

The lens holder 1-A1210 has an accommodating space 1-A1211 and a concave structure 1-A1212, wherein the accommodating space 1-A1211 is formed at the center of the lens holder 1-A1210, and the concave structure 1-A1212 is formed on the outer wall of the lens holder 1-A1210 and surrounds the accommodating space 1-A1211. The first optical component 1-AS can be affixed to the lens holder 1-A1210 and accommodated in the accommodating space 1-A1211. The first electromagnetic driving assembly 1-A1230 can be disposed in the concave structure 1-A1212.

The frame 1-A1220 has a receiving portion 1-A1221 and a plurality of recesses 1-A1222. The lens holder 1-A1210 is received in the receiving portion 1-A1221, and the second electromagnetic driving assembly 1-A1240 is affixed in the recess 1-A1222 and adjacent to the first electromagnetic driving assembly 1-A1230.

The lens holder 1-A1210 and the first optical component 1-AS disposed thereon can be driven by the electromagnetic effect between the first electromagnetic driving assembly 1-A1230 and the second electromagnetic driving assembly 1-A1240 to move relative to the frame 1-A1220 or the first outer frame 1-A1100 along the Z-axis. For example, in this embodiment, the first electromagnetic driving assembly 1-A1230 can be a driving coil surrounding the accommodating space 1-A1211 of the lens holder 1-A1210, and the second electromagnetic driving assembly 1-A1240 can comprise at least one magnet. When a current flows through the driving coil (the first electromagnetic driving assembly 1-A1230), an electromagnetic effect is generated between the driving coil and the magnet. Thus, the lens holder 1-A1210 and the first optical component 1-AS disposed thereon can be driven to move relative to the frame 1-A1220 and the image sensor 1-A1500 along the Z-axis, and the purpose of auto focus can be achieved.

In some embodiments, the first electromagnetic driving assembly 1-A1230 can be a magnet, and the second electromagnetic driving assembly 1-A1240 can be a driving coil.

The first elastic member 1-A1250 and the second elastic member 1-A1260 are respectively disposed on opposite sides of the lens holder 1-A1210 and the frame 1-A1220, and the lens holder 1-A1210 and the frame 1-A1220 can be disposed therebetween. The inner portion 1-A1251 of the first elastic member 1-A1250 is connected to the lens holder 1-A1210, and the outer portion 1-A1252 of the first elastic member 1-A1250 is connected to the frame 1-A1220. Similarly, the inner portion 1-A1261 of the second elastic member 1-A1260 is connected to the lens holder 1-A1210, and the outer portion 1-A1262 of the second elastic member 1-A1260 is connected to the frame 1-A1220. Thus, the lens holder 1-A1210 can be hung in the receiving portion 1-A1221 of the frame 1-A1220 by the first elastic member 1-A1250 and the second elastic member 1-A1260, and the range of motion of the lens holder 1-A1210 along the Z-axis can also be restricted by the first and second elastic members 1-A1250 and 1-A1260.

Referring to FIG. 3, the coil board 1-A1270 is disposed on the base 1-A1400. Similarly, when a current flows through the coil board 1-A1270, an electromagnetic effect is generated between the coil board 1-A1270 and the second electromagnetic driving assembly 1-A1240 (or the first electromagnetic driving assembly 1-A1230). Thus, the lens holder 1-A1210 and the frame 1-A1220 can be driven to move relative to coil board 1-A1270 along the X-axis and/or the Y-axis, and the first optical component 1-AS can be driven to move relative to image sensor 1-A1500 along the X-axis and/or the Y-axis. The purpose of image stabilization can be achieved.

In this embodiment, the first driving assembly 1-A1200 comprises four suspension wires 1-A1280. Four suspension wires 1-A1280 are respectively disposed on the four corners of the coil board 1-A1270 and connect the coil board 1-A1270, the base 1-A1400 and the first elastic member 1-A1250. When the lens holder 1-A1210 and the first optical component 1-AS move along the X-axis and/or the Y-axis, the suspension wires 1-A1280 can restrict their range of motion. Moreover, since the suspension wires 1-A1280 comprise metal (for example, copper or an alloy thereof), the suspension wires 1-A1280 can be used as a conductor. For example, the current can flow into the first electromagnetic driving assembly 1-A1230 through the base 1-A1400 and the suspension wires 1-A1280.

A circuit member 1-A1420 is disposed in the base 1-A1400, and the position detectors 1-A1290 are disposed on the circuit member 1-A1420. The position detectors 1-A1290 can detect the movement of the second electromagnetic driving assembly 1-A1240 to obtain the position of the lens holder 1-A1210 and the first optical component 1-AS in the X-axis and the Y-axis. For example, each of the position detectors 1-A1290 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

In addition, the first optical component 1-AS may define an optical axis 1-A0, and the position sensing assembly may also be used to sense the distance that the first optical component 1-AS moves along the optical axis 1-AO.

Figure 4:
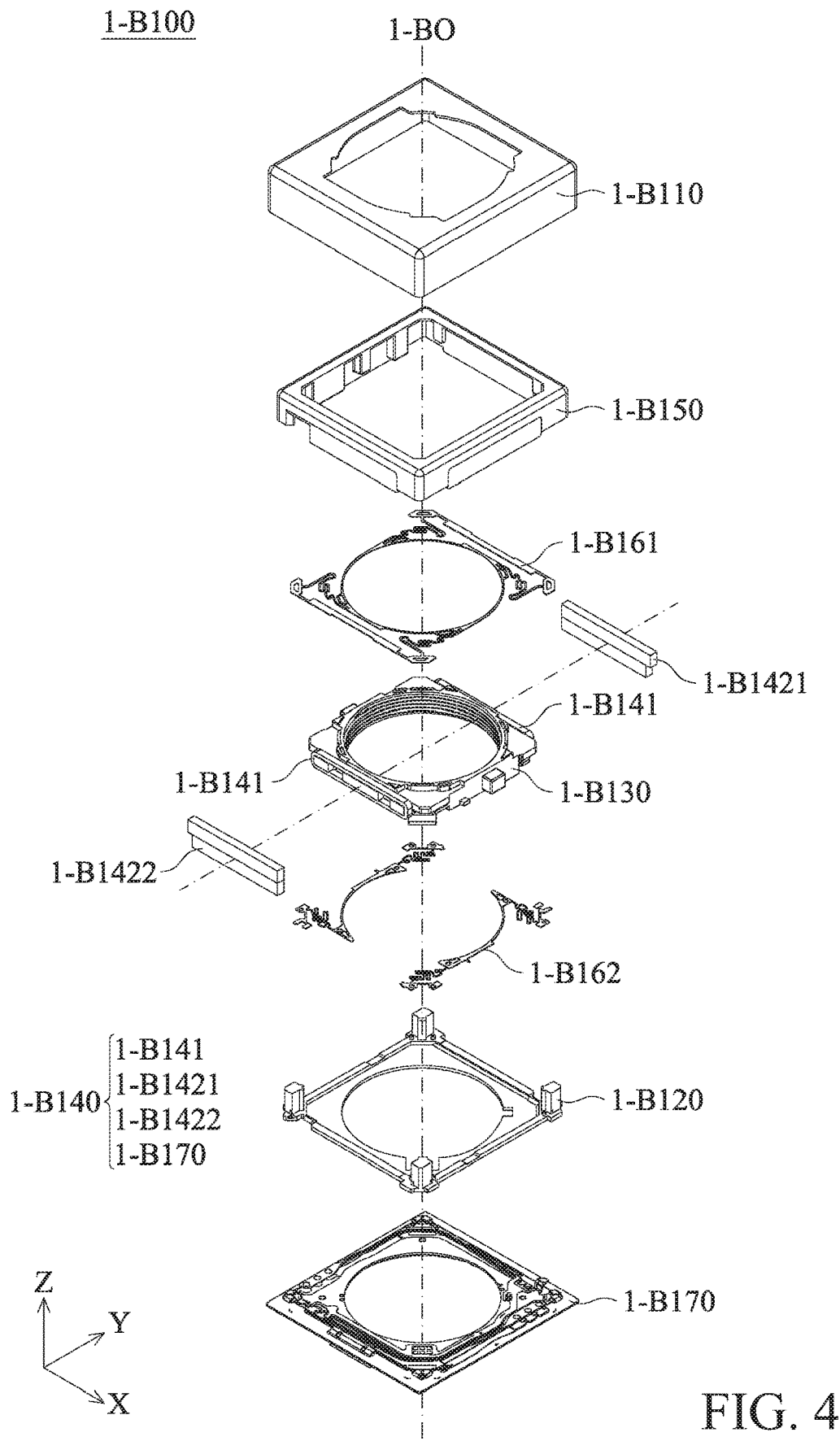
FIG. 4 is an exploded diagram of the second lens driving mechanism according to an embodiment of the present disclosure.

Next, please refer to FIG. 4, which is an exploded diagram of the second lens driving mechanism 1-B100 according to an embodiment of the present disclosure. The second outer frame 1-B110 of the second lens driving mechanism 1-B100 has a hollow structure and has an opening corresponding to the optical component (the second optical component 1-BS). That is, the optical axis 1-BO of the second optical component 1-BS passes through the opening of the second outer frame 1-B110, so that the light can enter the second lens driving mechanism 1-B100 along the optical axis 1-BO.

As shown in FIG. 4, the second lens driving mechanism 1-B100 mainly includes a second outer frame 1-B110, a base 1-B120, a holder 1-B130, a second driving assembly 1-B140, a frame 1-B150, a first elastic member 1-B161, a second elastic member 1-B162, and a shape memory alloy driving assembly 1-B170. The second outer frame 1-B110 and the base 1-B120 may be assembled as a hollow case. Therefore, the holder 1-B130, the second driving assembly 1-B140, the frame 1-B150, the first elastic member 1-B161, and the second elastic member 1-B162 may be surrounded by the second outer frame 1-B110, and thus may be contained in the case.

The holder 1-B130 has a hollow structure, and carries an optical component (such as the second optical component 1-BS in FIG. 2) with an optical axis 1-BO. The frame 1-B150 is disposed on the base 1-B120, and fixed to the second outer frame 1-B110. In addition, the holder 1-B130 is movably connected to the second outer frame 1-B110 and the base 1-B120. To be more specific, the holder 1-B130 may be connected to the frame 1-B150 through the first elastic member 1-B161, the holder 1-B130 may also be connected to the base 1-B120 through the second elastic member 1-B162, and the first elastic member 1-B161 and the second elastic member 1-B162 are metallic materials. Therefore, the holder 1-B130 is movably suspended between the frame 1-B150 and the base 1-B120.

The second driving assembly 1-B140 at least includes a first driving coil (the driving coil 1-B141), a first driving magnetic member 1-B1421, and a second driving magnetic member 1-B1422. The driving coil 1-B141 is disposed on the holder 1-B130, and the first driving magnetic member 1-B1421 and the second driving magnetic member 1-B1422 may be disposed on the frame 1-B150. When a current is applied to the driving coil 1-B141, an electromagnetic driving force may be generated by the driving coil 1-B141 and the first driving magnetic member 1-B1421, the second driving magnetic member 1-B1422 to drive the holder 1-B130 and the optical component (such as the second optical component 1-BS) carried therein to move along Z-axis (the optical axis 1-BO) relative to the base 1-B120 or the second outer frame 1-B110. Therefore, the autofocus (AF) function is performed. Furthermore, the second driving assembly 1-B140 includes the shape memory alloy driving assembly 1-B170 which is disposed below the base 1-B120, and drives the holder 1-B130 and the optical component carried therein to move along a direction that is perpendicular to the optical axis 1-BO (X-Y plane) relative to the base 1-B120. Therefore, the optical image stabilization (OIS) function is performed. Regarding the operation of the shape memory alloy driving assembly 1-B170, a further description will be provided below accompanied by FIG. 5.

Figure 5:
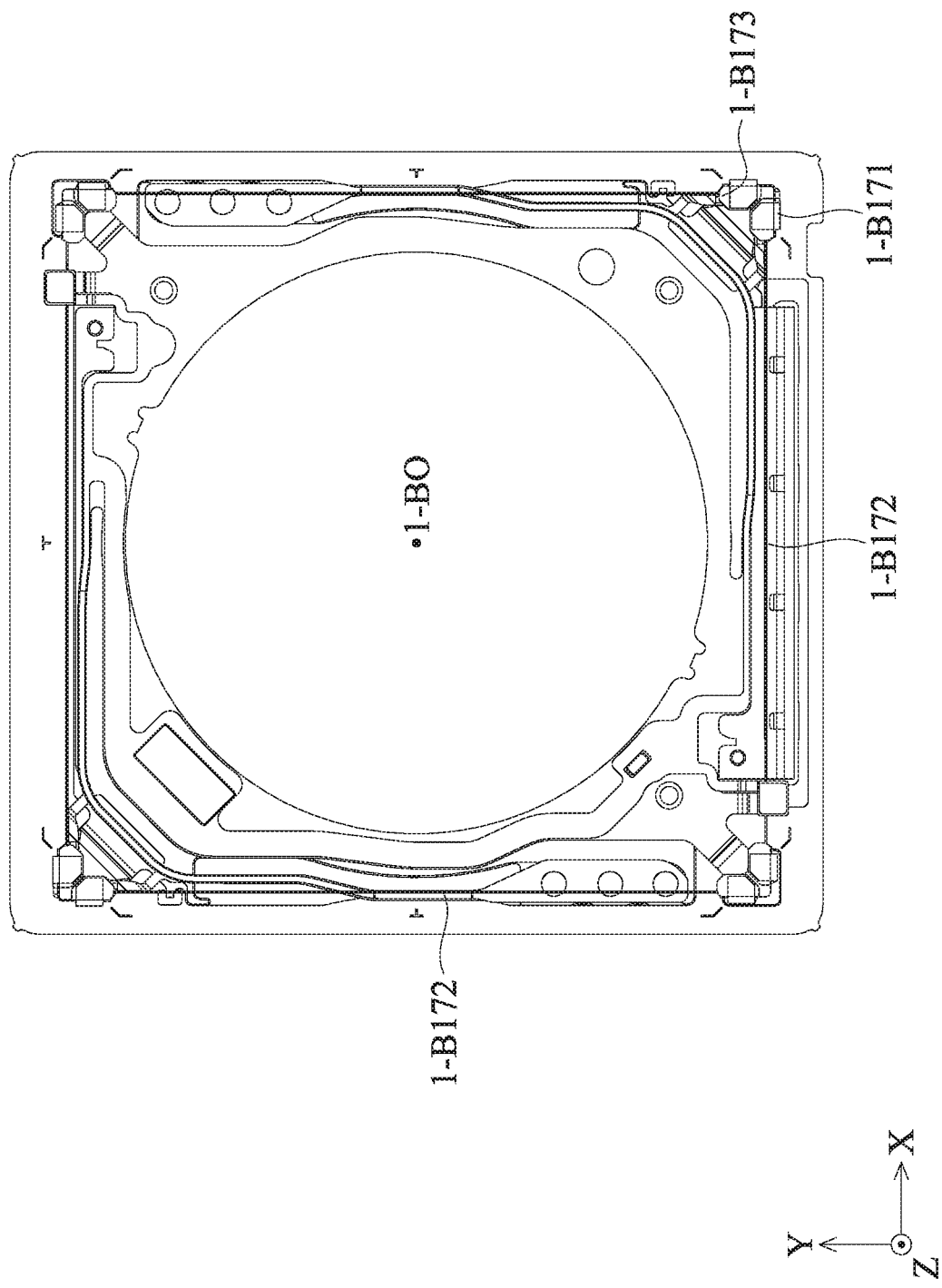
FIG. 5 is a top view illustrating the shape memory alloy driving assembly in accordance with an embodiment of the present disclosure.

FIG. 5 is a top view illustrating the shape memory alloy driving assembly 1-B170 in accordance with an embodiment of the present disclosure. As shown in FIG. 5, the shape memory alloy driving assembly 1-B170 includes a metal base 1-B171, metal wires 1-B172, and an insulating layer 1-B173. In the present embodiment, the metal base 1-B171 has a rectangular structure. The metal wires 1-B172 are disposed on four edges of the metal base 1-B171, and connected to the metal base 1-B171 via the insulating layer 1-B173 at each of the corners of the metal base 1-B171. The metal wires 1-B172 are made of shape memory alloys (SMA). Accordingly, the metal wires 1-B172 have certain plasticity. Therefore, each of the metal wires 1-B172 may individually deform along a horizontal direction (X-axis or Y-axis) according to electric signals. Therefore, the position of the holder 1-B130 (shown in FIG. 4), which is disposed on the shape memory alloy driving assembly 1-B170, may be controlled, and the optical image stabilization (OIS) function is performed.

Figure 6:
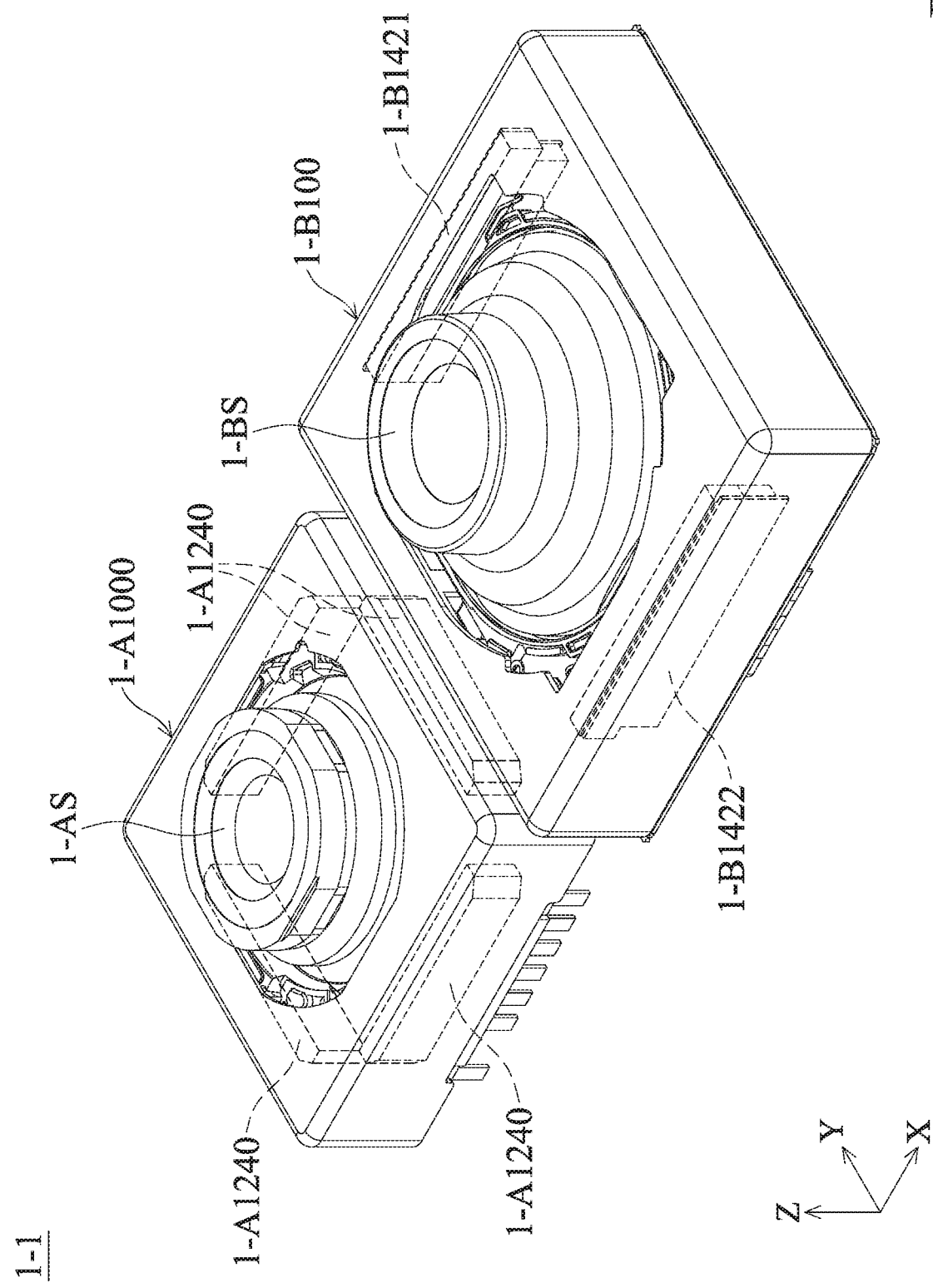
FIG. 6 is a schematic diagram showing the arrangement of the first lens driving mechanism and the second lens driving mechanism according to an embodiment of the present disclosure.

Please refer to FIG. 2 and FIG. 6. FIG. 6 is a schematic diagram showing the arrangement of the first lens driving mechanism 1-A1000 and the second lens driving mechanism 1-B100 according to an embodiment of the present disclosure. As shown in FIG. 2 and FIG. 6, the first lens driving mechanism 1-A1000 and the second lens driving mechanism 1-B100 are arranged in a first direction (for example, the X-axis), and the first driving magnetic member 1-B1421 has an long strip-shaped structure extending in the first direction.

It should be noted that, along the X-axis, there is no magnetic member of any second lens driving mechanism 1-B100 between the first optical component 1-AS and the second optical component 1-BS. For example, the first driving magnetic member 1-B1421 is not disposed between the first optical component 1-AS and the second optical component 1-BS. Based on the arrangement of the magnetic members described above, electromagnetic interference can be reduced, and the distance between the first optical component 1-AS and the second optical component 1-BS can be shortened, thereby improving the photographing quality.

Figure 7:
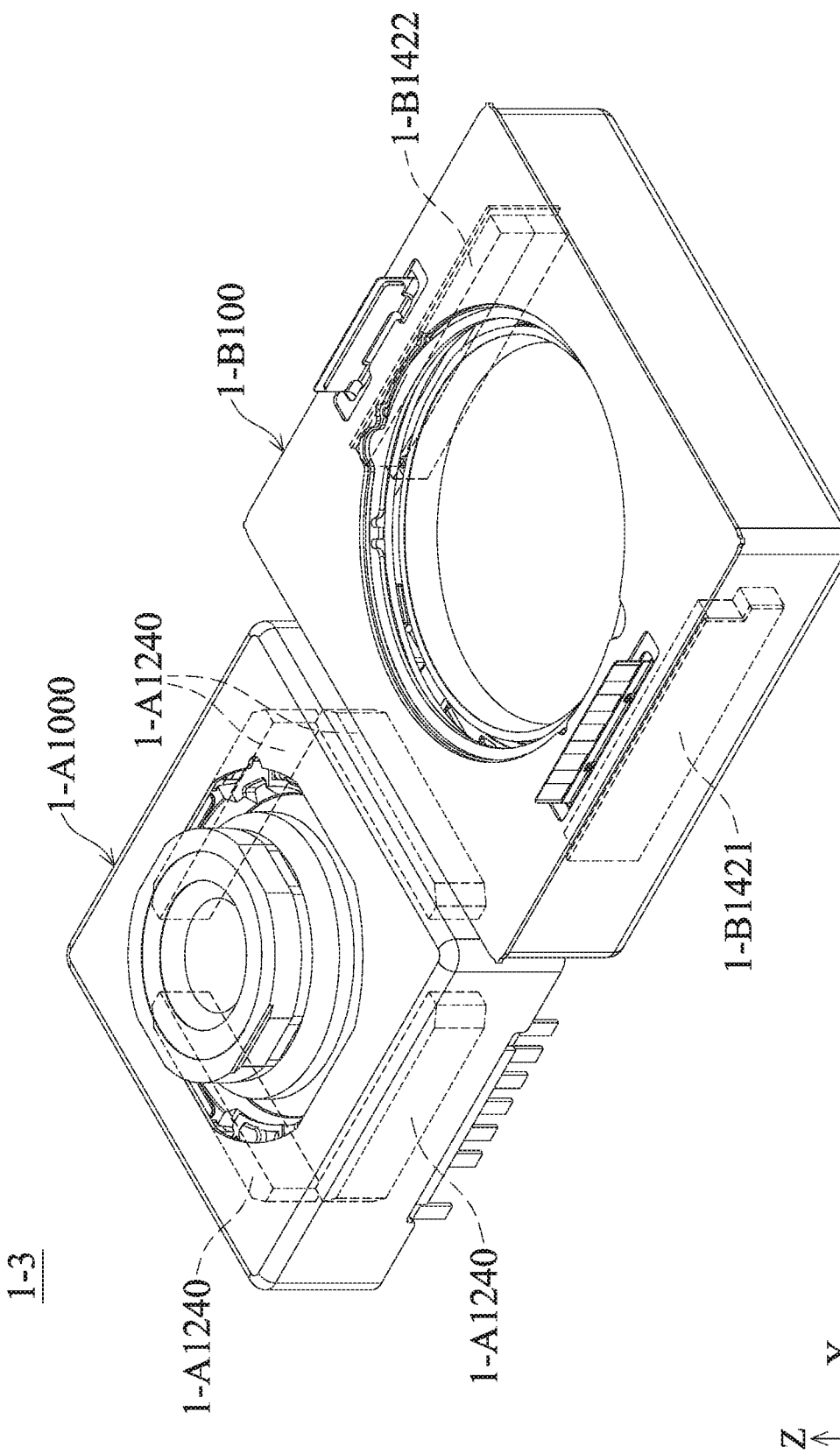
FIG. 7 is a schematic diagram of an optical camera system according to another embodiment of the present disclosure.

Please refer to FIG. 7, which is a schematic diagram of an optical camera system 1-3 according to another embodiment of the present disclosure. In this embodiment, the first lens driving mechanism 1-A1000 and the second lens driving mechanism 1-B100 are disposed in opposite directions. The light enters the first lens driving mechanism 1-A1000 along the −Z axis, and the light enters the second lens driving mechanism 1-B100 along the Z-axis.

Based on the above configuration, the optical camera system 1-3 can capture images in different angles, and the arrangement of the magnetic members is similar to that of FIG. 5, thereby reducing electromagnetic interference and greatly reducing the occupied volume so as to achieve the purpose of miniaturization.

Figure 8:
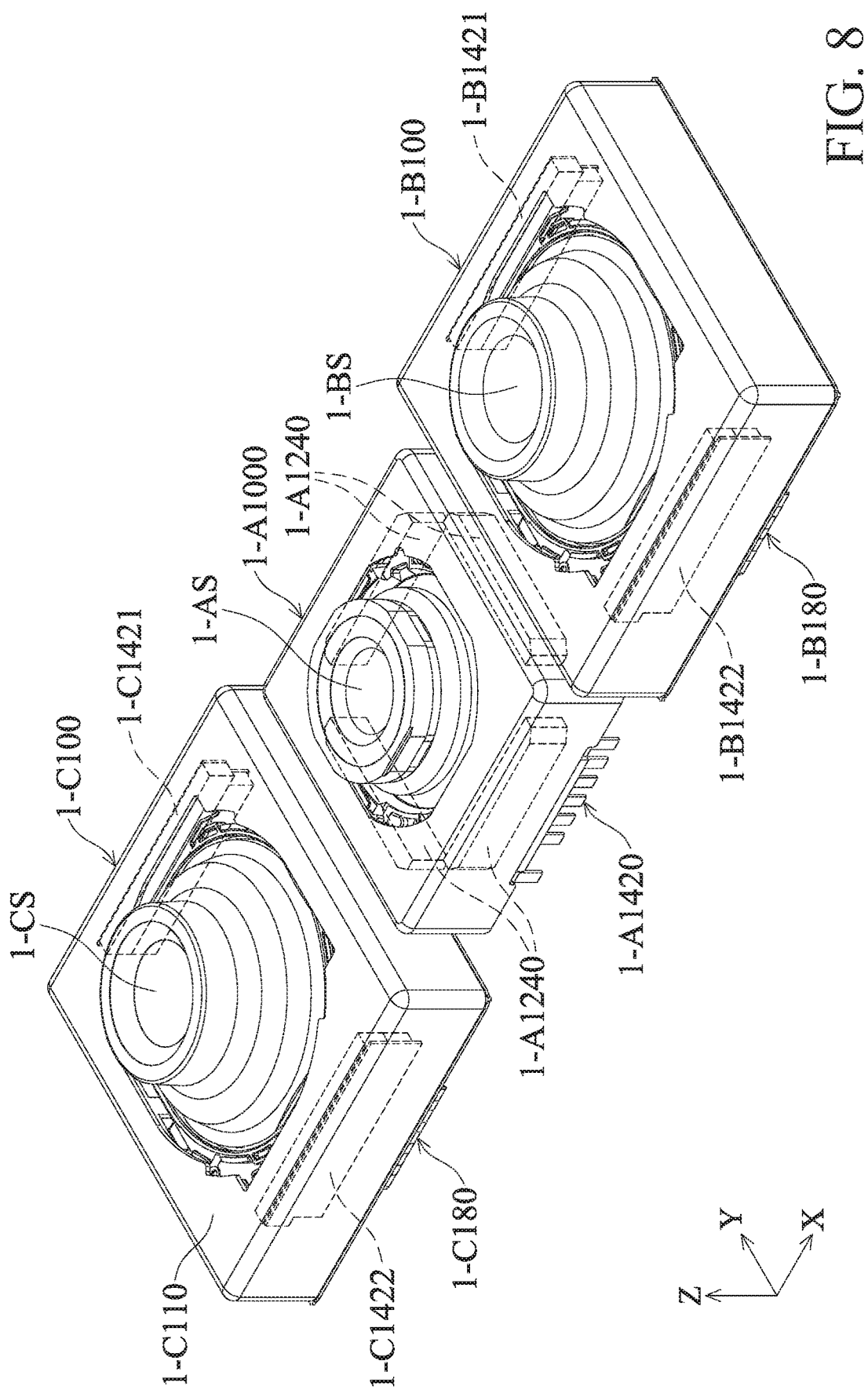
FIG. 8 is a schematic diagram of an optical camera system according to an embodiment of the present disclosure.

Please refer to FIG. 8, which is a schematic diagram of an optical camera system 1-4 according to an embodiment of the present disclosure. In this embodiment, the optical camera system 1-4 includes a first lens driving mechanism 1-A1000, a second lens driving mechanism 1-B100, and a third lens driving mechanism 1-C100 arranged in the first direction (the X-axis). The third lens driving mechanism 1-C100 has the same structure as the second lens driving mechanism 1-B100 and is configured to hold a third optical component 1-CS. The third lens driving mechanism 1-C100 also has a third outer frame 1-C110 and a third driving assembly (for example, including a first driving magnetic member 1-C1421 and a second driving magnetic member 1-C1422). The rest of the structure and the operation manner are the same as those of the second lens driving mechanism 1-B100, and details are omitted herein.

As shown in FIG. 8, the arrangement of the magnetic members in the optical camera system 1-4 is similar to that of FIG. 6, so that electromagnetic interference can also be reduced.

Figure 9:
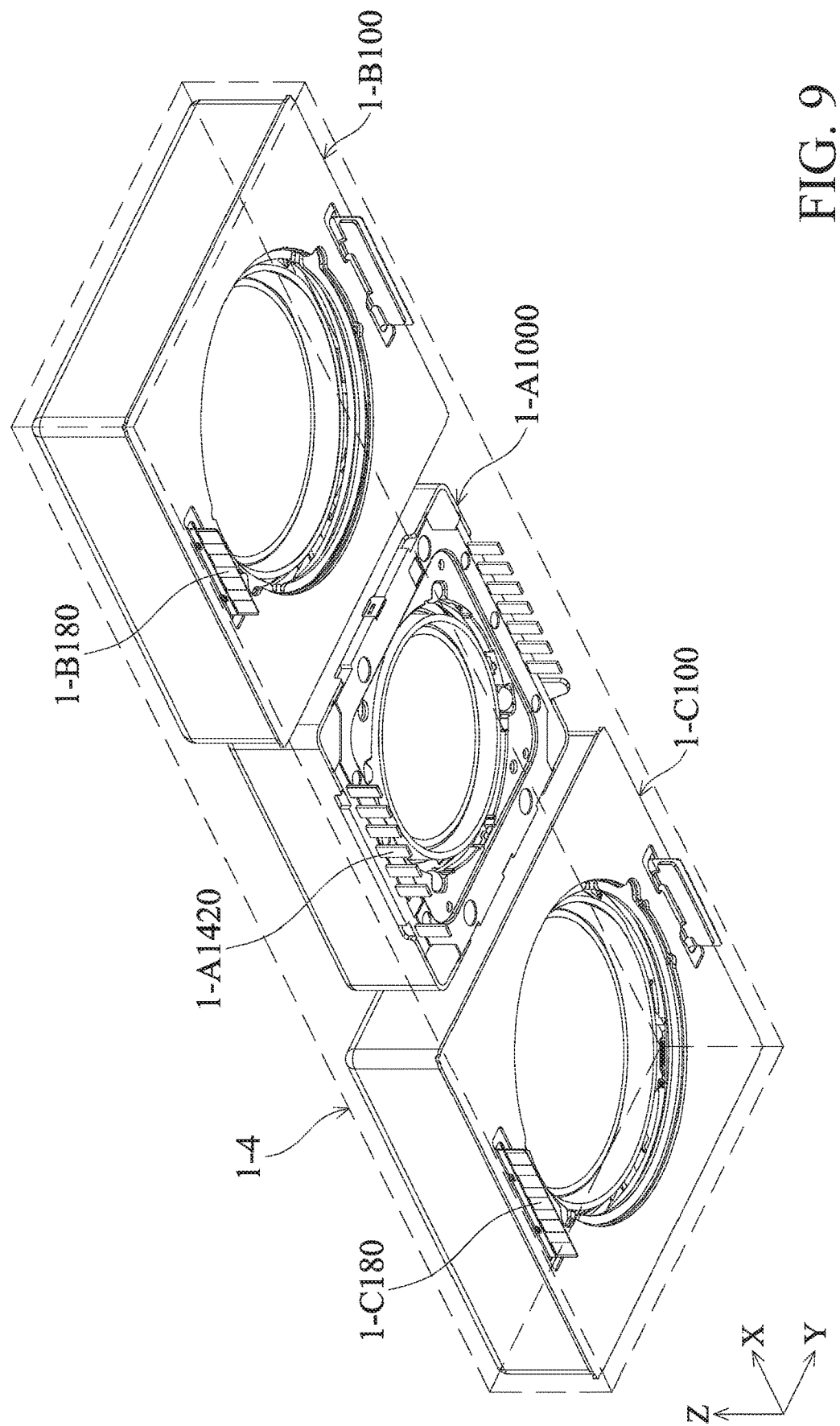
FIG. 9 is a schematic diagram of the optical camera system in another view according to an embodiment of the present disclosure.

Next, please refer to FIG. 9, which is a schematic diagram of the optical camera system 1-4 in another view according to an embodiment of the present disclosure. In this embodiment, a circuit pin 1-B180 of the second lens driving mechanism 1-B100, a circuit pin 1-C180 of the third lens driving mechanism 1-C100, and a circuit pin (the circuit member 1-A1420) of the first lens driving mechanism 1-A1000 are all disposed on the same side of the optical camera system 1-4.

The distance between the lens driving mechanisms in the X-axis can be shortened because there are no circuit pins (normally used for forming electrical connections to the outside circuit) disposed on the adjacent sides of the lens driving mechanisms. In addition, the circuit pins are disposed parallel to the arrangement direction (the X-axis) of those lens driving mechanisms, so that processing efficiency can be improved, thereby lowering manufacturing costs.

Figure 10:
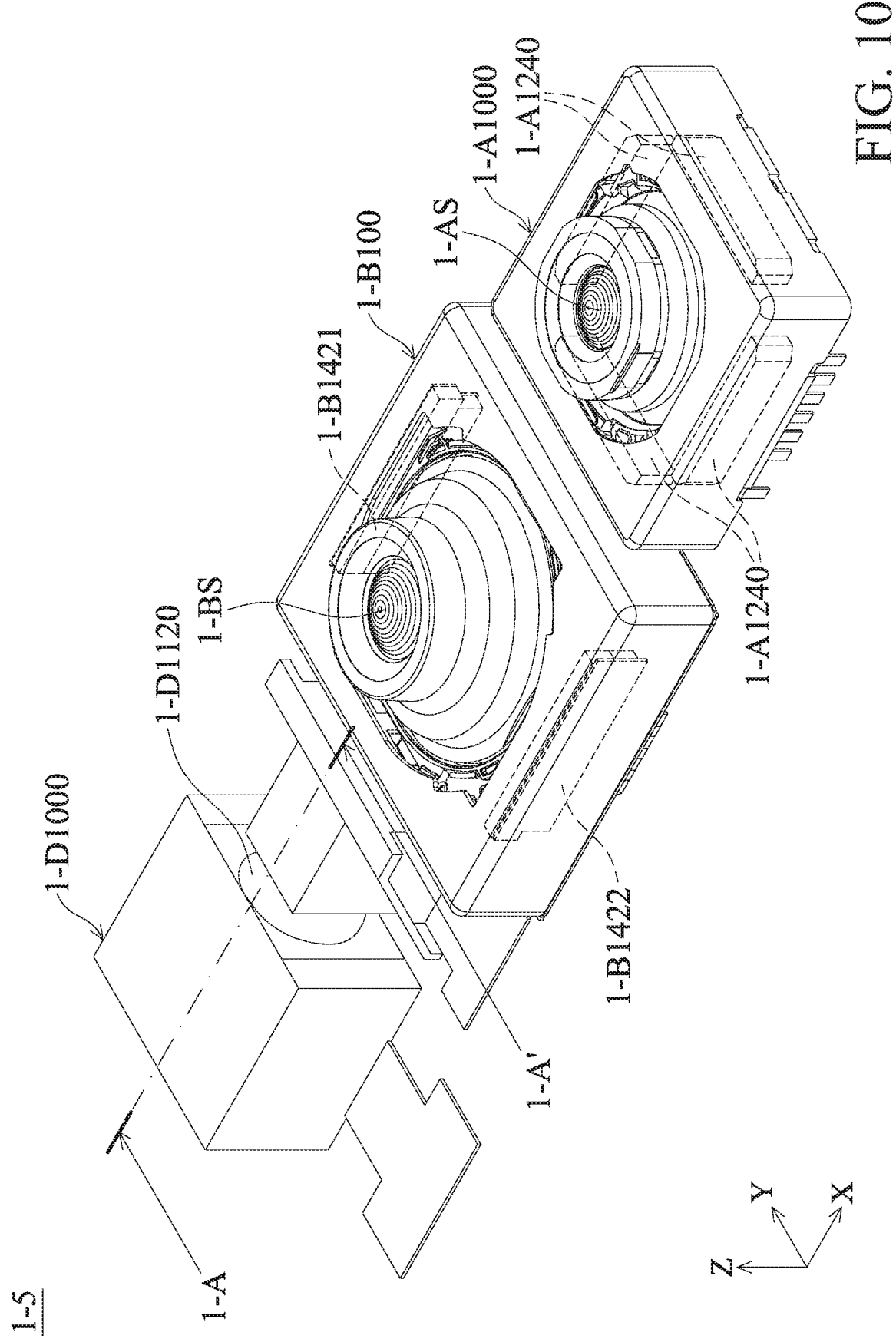
FIG. 10 is a schematic diagram of an optical camera system according to another embodiment of the present disclosure.

Please refer to FIG. 10, which is a schematic diagram of an optical camera system 1-5 according to another embodiment of the present disclosure. The optical camera system 1-5 is similar to the optical camera system 1-4, and the difference between them is that that one of the lens driving mechanisms of the optical camera system 1-5 employs a periscope lens driving mechanism (a fourth lens driving mechanism 1-D1000).

In this embodiment, the first optical component 1-AS of the first lens driving mechanism 1-A1000 is a wide-angle lens having a focal length with one times magnification (a first focal length), the second optical component 1-BS of the second lens driving mechanism 1-B100 is a lens having a focal length with two times magnification, and a fourth optical component (the lens 1-D1120) of the fourth lens driving mechanism 1-D1000 is a wide-angle lens having a focal length with three times magnification (a second focal length), so that the optical camera system 1-5 can achieve three-stage optical zoom.

Figure 11:
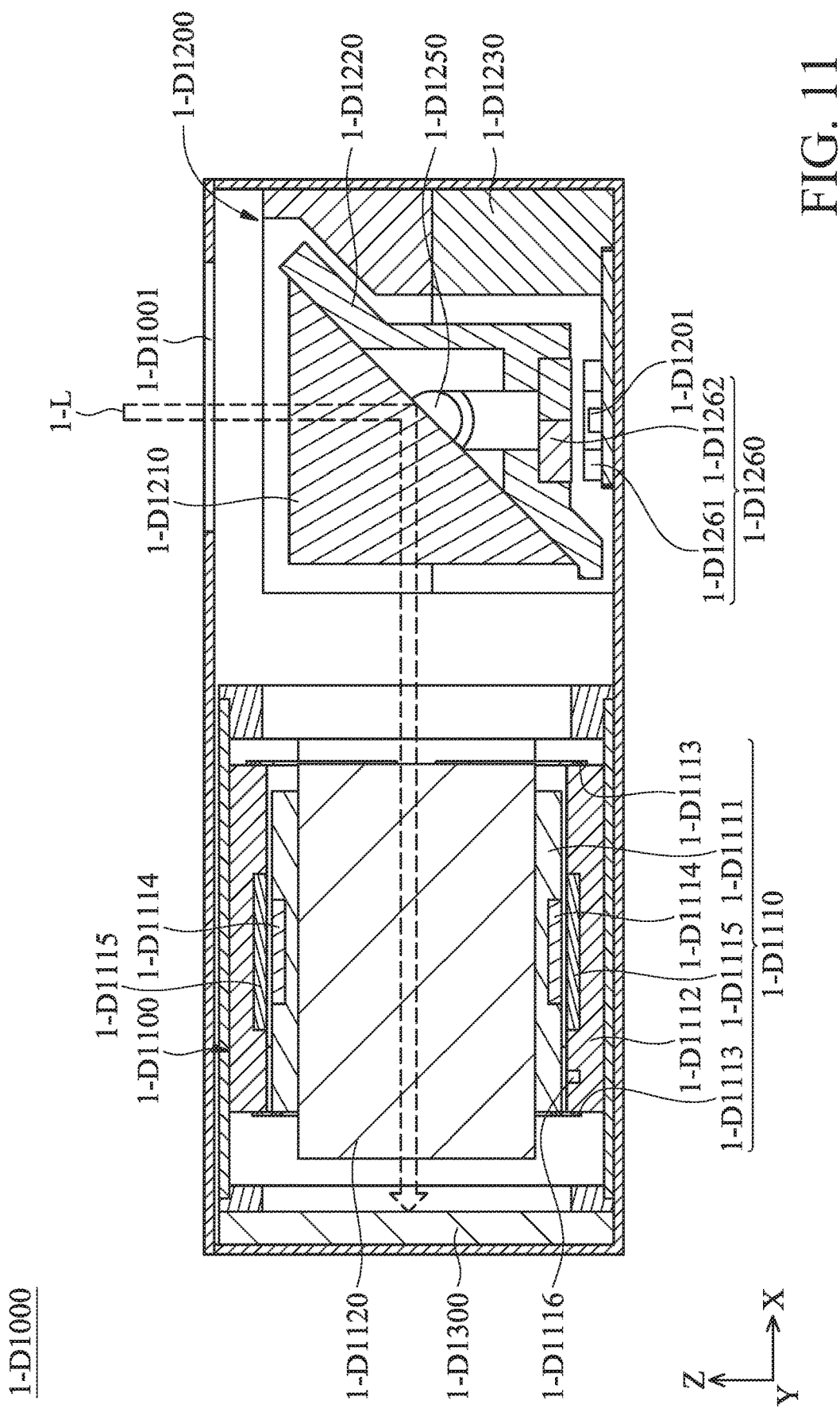
FIG. 11 is a cross-sectional view along line (1-A)-(1-A') in FIG. 10 according to an embodiment of the present disclosure.

Please refer to FIG. 11, which is a cross-sectional view along line (1-A)-(1-A') in FIG. 10 according to an embodiment of the present disclosure. As shown in FIG. 11, the fourth lens driving mechanism 1-D1000 includes a lens unit 1-D1100, a reflecting unit 1-D1200, and an image sensor 1-D1300. An external light (such as a light 1-L) can enter the fourth lens driving mechanism 1-D1000 through the first light-entering hole 1-D1001 and be reflected by the reflecting unit 1-D1200. After that, the external light can pass through the lens unit 1-D1100 and be received by the image sensor 1-D1300.

The specific structures of the lens unit 1-D1100 and the reflecting unit 1-D1200 in this embodiment are discussed below. As shown in FIG. 11, the lens unit 1-D1100 primarily comprises a lens driving module 1-D1110 and a lens 1-D1120, wherein the lens driving module 1-D1110 is used to drive the lens 1-D1120 to move relative to the image sensor 1-D1300. For example, the lens driving module 1-D1110 can comprise a lens holder 1-D1111, a frame 1-D1112, two spring sheets 1-D1113, at least one coil 1-D1114, and at least one magnetic member 1-D1115.

The lens 1-D1120 is affixed to the lens holder 1-D1111. Two spring sheets 1-D1113 are connected to the lens holder 1-D1111 and the frame 1-D1112, and respectively disposed on opposite sides of the lens holder 1-D1111. Thus, the lens holder 1-D1111 can be movably hung in the frame 1-D1112. The coil 1-D1114 and the magnetic member 1-D1115 are respectively disposed on the lens holder 1-D1111 and the frame 1-D1112, and correspond to each other. When current flows through the coil 1-D1114, an electromagnetic effect is generated between the coil 1-D1114 and the magnetic member 1-D1115, and the lens holder 1-D1111 and the lens 1-D1120 disposed thereon can be driven to move relative to the image sensor 1-D1300, such as moving in the X-axis or the Y-axis. In addition, the lens unit 1-D1100 can further include a position sensing component 1-D1116 configured to sense the movement of the lens holder 1-D1111 relative to the frame 1-D1112.

The reflecting unit 1-D1200 primarily comprises an optical member 1-D1210, an optical member holder 1-D1220, a frame 1-D1230, at least one first hinge 1-D1250, a first driving module 1-D1260, and a position detector 1-D1201.

The optical member holder 1-D1220 can be pivotally connected to the frame 1-D1230 via the first hinge 1-D1250. Since the optical member 1-D1210 is disposed on the optical member holder 1-D1220, when the optical member holder 1-D1220 rotates relative to the frame 1-D1230, the optical member 1-D1210 disposed thereon also rotates relative to the frame 1-D1230. The optical member 1-D1210 can be a prism or a reflecting mirror.

The first driving module 1-B1260 can comprise a first electromagnetic driving assembly 1-B1261 and a second electromagnetic driving assembly 1-B1262, respectively disposed on the frame 1-B1230 and the optical member holder 1-B1220 and corresponding to each other.

For example, the first electromagnetic driving assembly 1-B1261 can comprise a driving coil, and the second electromagnetic driving assembly 1-B1262 can comprise a magnet. When a current flows through the driving coil (the first electromagnetic driving assembly 1-B1261), an electromagnetic effect is generated between the driving coil and the magnet. Thus, the optical member holder 1-B1220 and the optical member 1-B1210 can be driven to rotate relative to the frame 1-B1230 around the first hinge 1-D1250 (extending along the Y-axis), so as to adjust the position of the external light 1-L on the image sensor 1-B1300.

It should be noted that the direction (for example, along the X-axis) of the incident light entering the fourth optical component (the lens 1-D1120) is different from the direction (for example, along the Z-axis) of the incident light entering the first optical component of the first lens driving mechanism 1-A1000.

The position detector 1-D1201 can be disposed on the frame 1-D1230 and correspond to the second electromagnetic driving assembly 1-D1262, so as to detect the position of the second electromagnetic driving assembly 1-D1262 to obtain the rotation angle of the optical member 1-D1210. For example, the position detectors 1700 can be Hall sensors, magnetoresistance effect sensors (MR sensor), giant magnetoresistance effect sensors (GMR sensor), tunneling magnetoresistance effect sensors (TMR sensor), or fluxgate sensors.

In some embodiments, the first electromagnetic driving assembly 1-D1261 comprises a magnet, and the second electromagnetic driving assembly comprises a driving coil. In these embodiments, the position detector 1-D1201 can be disposed on the optical member holder 1-D1220 and corresponds to the first electromagnetic driving assembly 1-D1261.

In addition, it should be noted that the arrangement of the lens driving mechanisms in the optical camera system 1-5 can also achieve the purpose of reducing electromagnetic interference.

Figure 12:
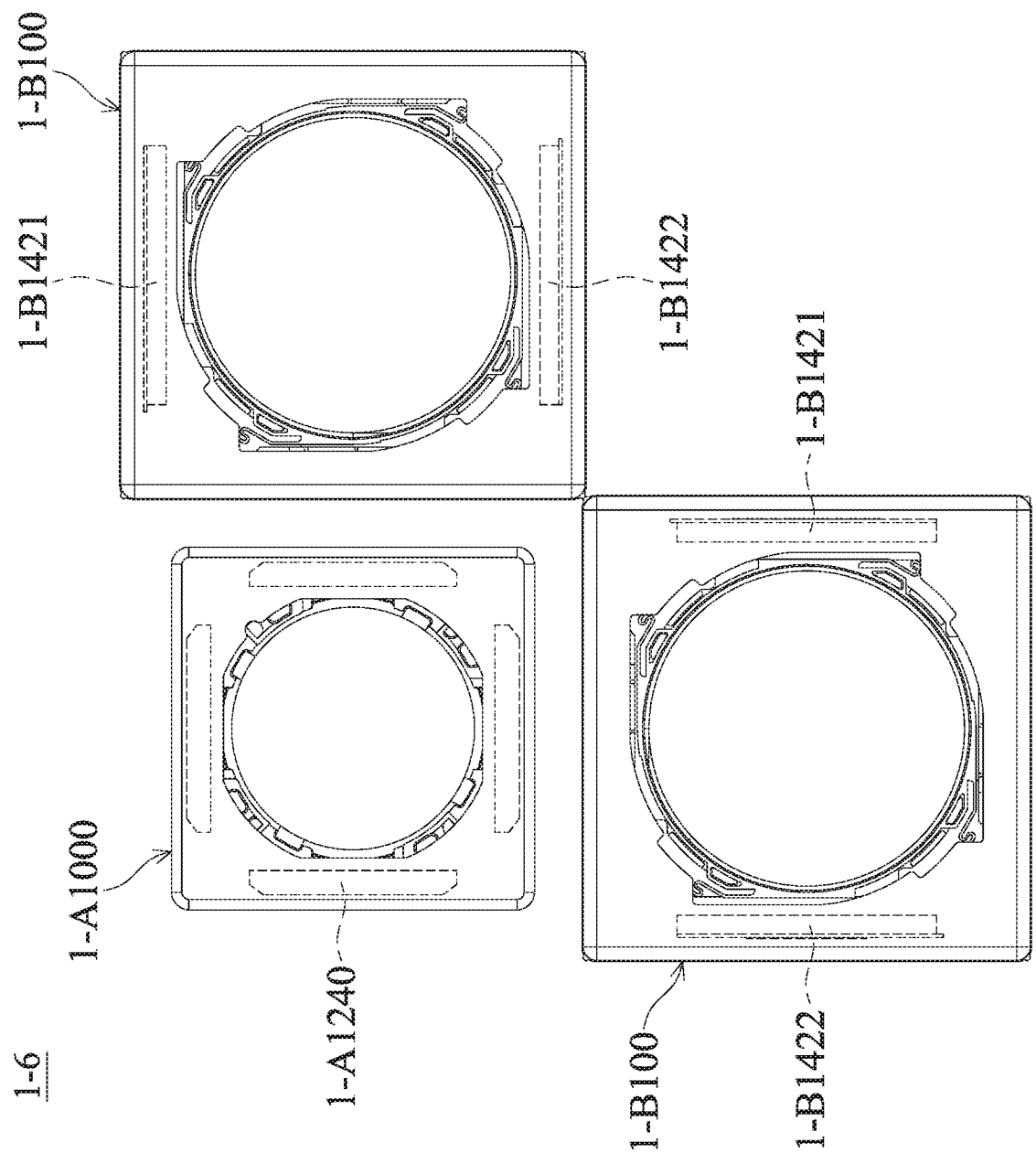
FIG. 12 is a schematic diagram of an optical camera system according to an embodiment of the present disclosure.

Please refer to FIG. 12, which is a schematic diagram of an optical camera system 1-6 according to an embodiment of the present disclosure. In order to improve space utilization, in this embodiment, the lens driving mechanisms are arranged in an L-shaped manner. Furthermore, as shown in FIG. 12, the magnetic member (the first driving magnetic member 1-B1421 or the second driving magnetic member 1-B1422) is not disposed on the adjacent side of the second lens driving mechanism 1-B100 and the first lens driving mechanism 1-A1000, and therefore the problem of electromagnetic interference can be reduced.

In addition, in other embodiments, one second lens driving mechanisms 1-B100 of the optical camera system 1-6 may also be replaced by the fourth lens driving mechanism 1-D1000 to obtain different photography effects.

Figure 13:
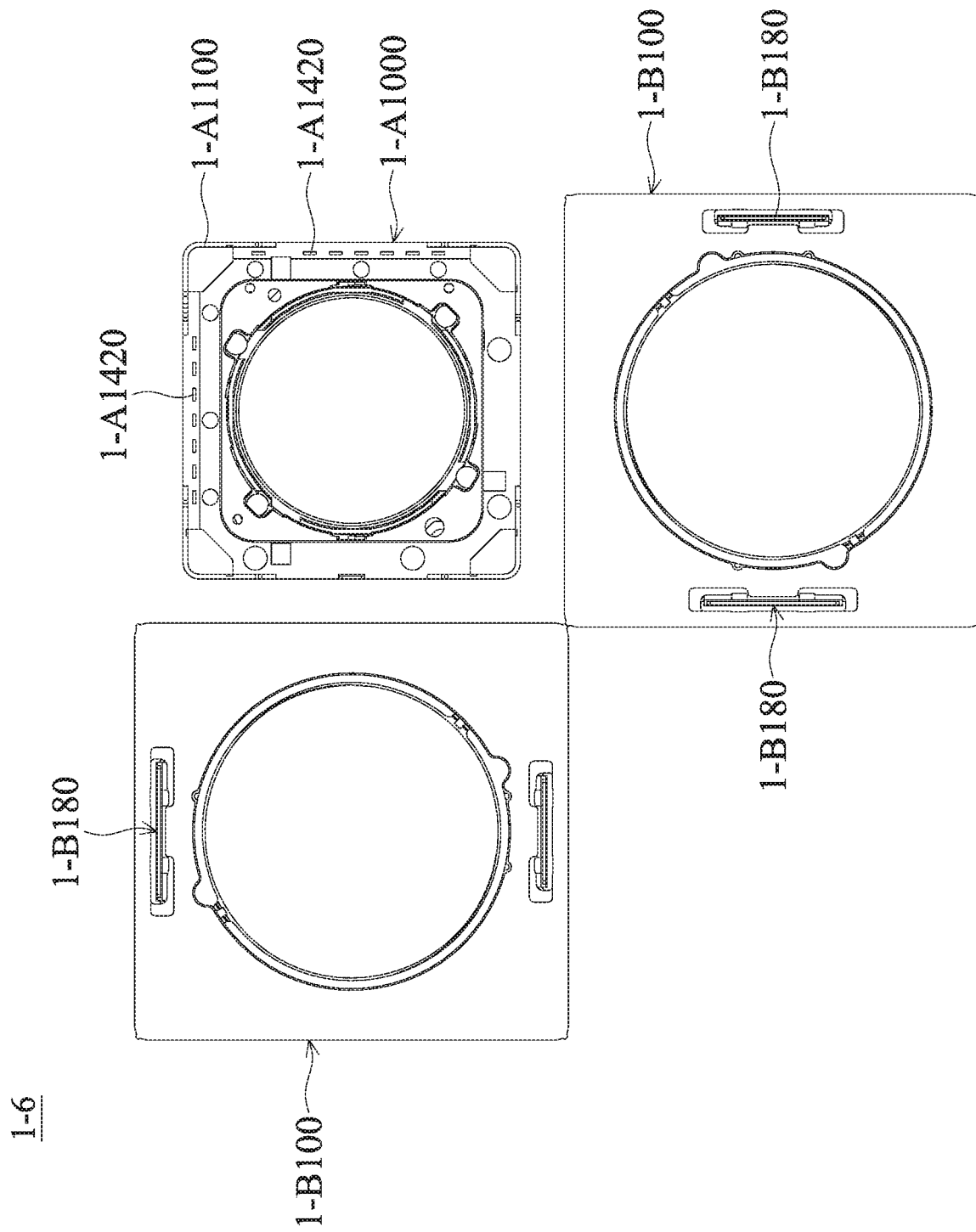
FIG. 13 is a bottom view of an optical camera system according to an embodiment of the present disclosure.

Please refer to FIG. 13, which is a bottom view of an optical camera system 1-6 according to an embodiment of the present disclosure. As shown in FIG. 13, the circuit pins (the circuit member 1-A1420) of the first lens driving mechanism 1-A1000 are disposed on two adjacent sides of the first outer frame 1-A1100 so as to make it easier for the operator to solder the optical camera system 1-6 on the main circuit board of the electronic device 1-0. In addition, as shown in FIG. 13, the circuit pins are not disposed on two adjacent sides of the two lens driving mechanisms.

Figure 14:
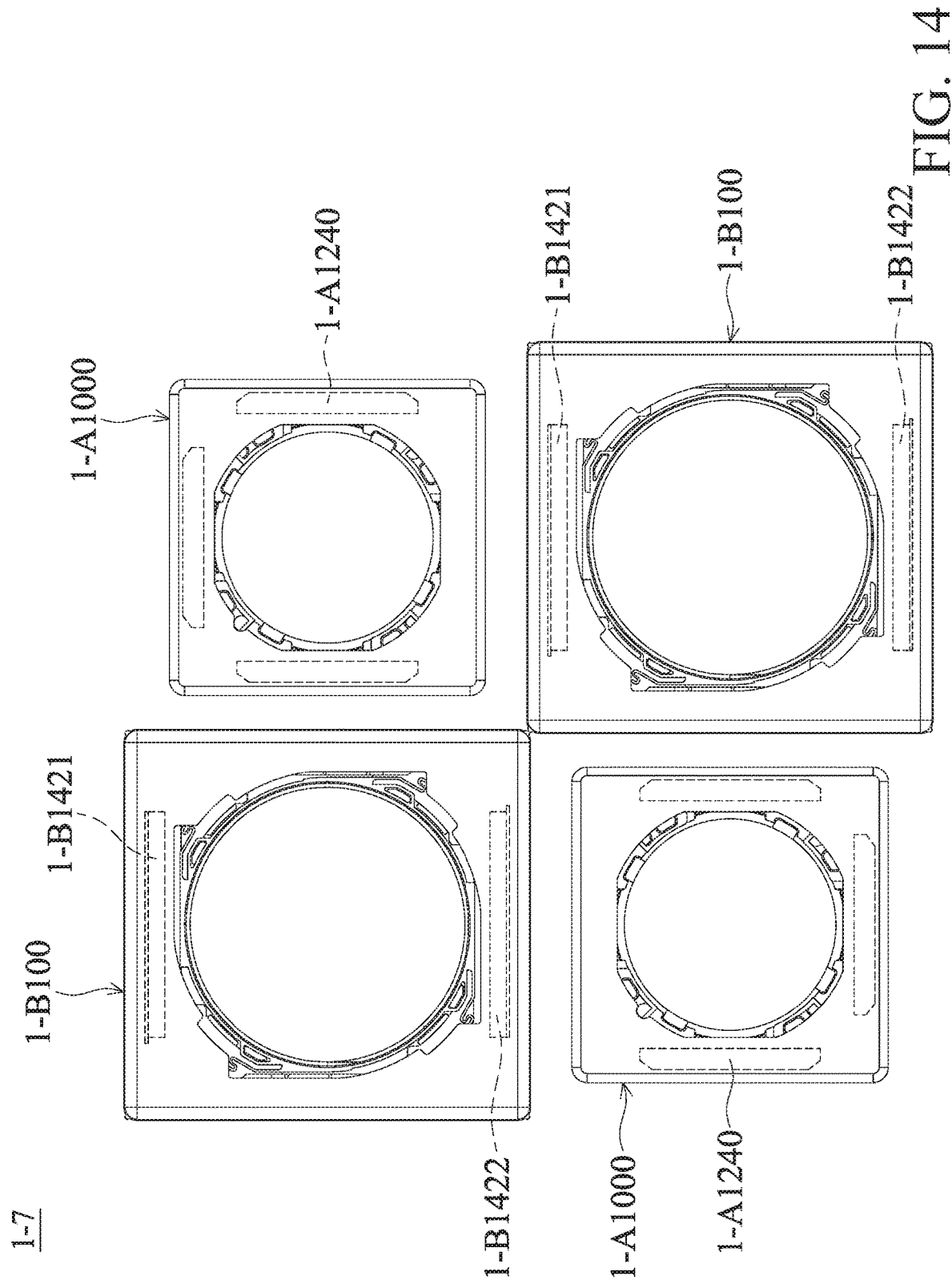
FIG. 14 is a schematic diagram of an optical camera system according to an embodiment of the present disclosure.

Please refer to FIG. 14, which is a schematic diagram of an optical camera system 1-7 according to an embodiment of the present disclosure. In this embodiment, the optical camera system 1-7 includes two first lens driving mechanisms 1-A1000 and two second lens driving mechanisms 1-B100. Furthermore, based on the configuration of the driving magnetic members in this embodiment, the problem of electromagnetic interference can also be reduced.

Image processing can be performed by the processing circuit 1-X for the plurality of optical camera systems provided in the present disclosure to obtain better shooting quality. For example, when the electronic device 1-0 is equipped with an optical camera system having three lens driving mechanisms (for example, the optical camera system 1-4), the first lens driving mechanism 1-A1000, the second lens driving mechanism 1-B100 and the third lens driving mechanism 1-C100 can respectively obtain a first image, a second image, and a third image. When the light source is insufficient, the image captured by single lens driving mechanism may not be clear enough, and the processing circuit 1-X can composite the first, second, and third images to obtain a clear composite image. This image processing method can shorten the exposure time of the optical camera system and reduce the chance of being disturbed (the external influence such as shake, instantaneous strong light, etc.).

In another embodiment, when the first lens driving mechanism 1-A1000, the second lens driving mechanism 1-B100, and the third lens driving mechanism 1-C100 all photograph the same object or scene, the processing circuit 1-X can be configured to compare the first image, the second image, and the third image. When a graph is included in the first image but is not included in the second image and the third image, the processing circuit 1-X determines that the graph is a noise, and removes the graph in the composite image.

In another embodiment, the aforementioned lens driving mechanism can capture a monochrome image. For example, the first image, the second image, and the third image respectively include red light information, blue light information, and green light information. Then, the processing circuit 1-X composites the first image, the second image, and the third image into a color image.

In another embodiment, at least one of the first image, the second image, and the third image is a color image, and at least one of the first image, the second image, and the third image is a black and white image. Then, the processing circuit 1-X composites the first image, the second image, and the third image into a color image. This composite color image is clearer than a color image captured by one single lens driving mechanism.

Figure 15:
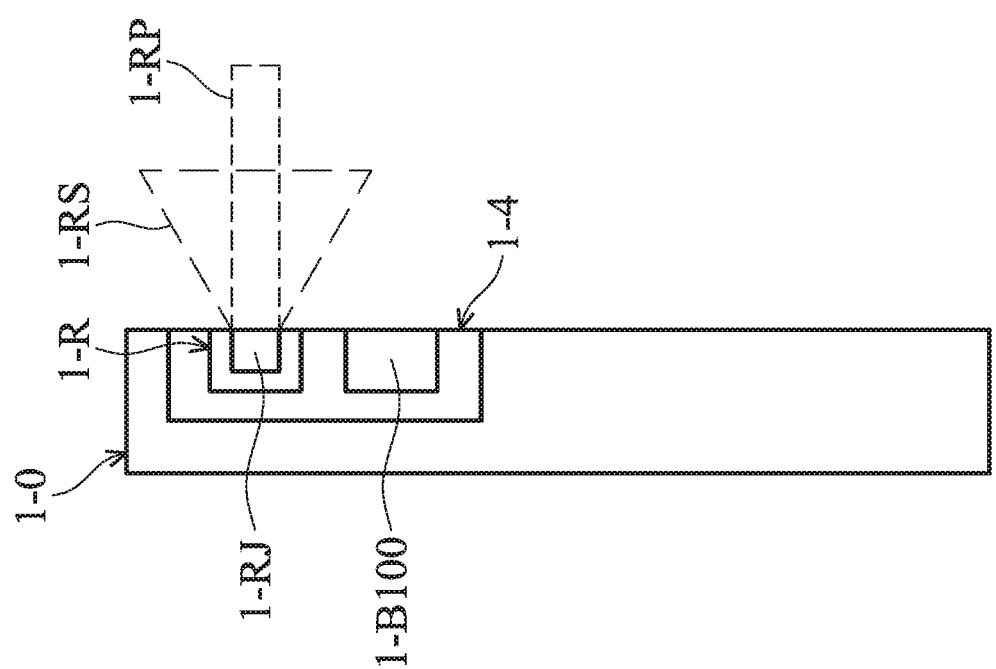
FIG. 15 is a side view of the electronic device according to another embodiment of the present disclosure.

Referring to FIG. 15, which is a side view of the electronic device 1-0 according to another embodiment of the present disclosure. In this embodiment, the optical camera system 1-4 may further include an infrared light source 1-R configured to emit infrared light. The infrared light source 1-R can emit a diffused light 1-RS to serve as a light source for photographing. In addition, the infrared light source 1-R may also include an adjustment component 1-RJ, so that the infrared light source 1-R can emit a parallel beam 1-RP for depth sensing.

In this embodiment, at least one of the first image, the second image, and the third image captured by the optical camera system 1-4 may include infrared light information. In the situation of insufficient light source, the composite image can be clearer by compositing the infrared image.

In addition, infrared light can also be used for depth sensing, and the processing circuit 1-X processes the composite image according to the software calculation so as to enhance the image effect.

Figure 16:
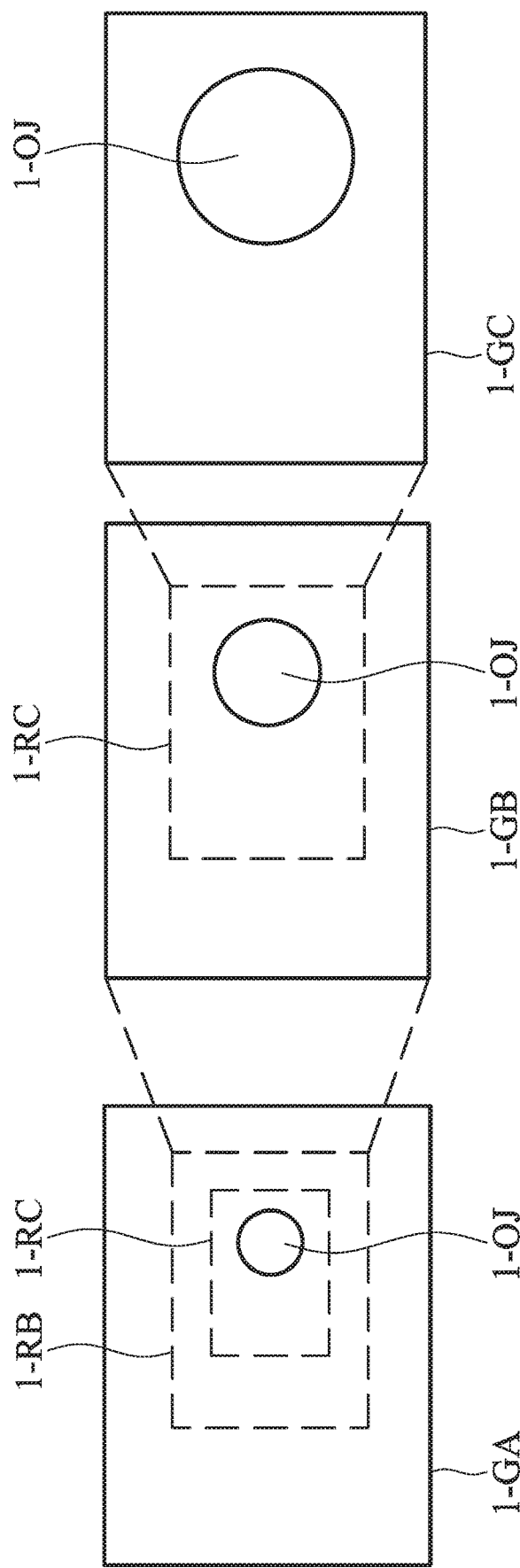
FIG. 16 is a diagram of a first image, a second image, and a third image according to an embodiment of the present disclosure.

Next, please refer to FIG. 16, which is a diagram of a first image 1-GA, a second image 1-GB, and a third image 1-GC according to an embodiment of the present disclosure. The diagram on the left side in FIG. 16 shows the first image 1-GA, the middle diagram shows the second image 1-GB, and the diagram on the right side shows the third image 1-GC. The first lens driving mechanism 1-A1000 having a focal length (the first focal length) with one times magnification photographs the object 1-OJ to generate the first image 1-GA, and the second lens driving mechanism 1-B100 having a focal length (second focal length) with two times magnification photographs the object 1-OJ to generate the second image 1-GB, and the fourth lens driving mechanism 1-D1000 having a focal length (the third focal length) with more than three times magnification photographs the object 1-OJ to generate the third image 1-GC.

The third image 1-GC corresponds to one region 1-RC of the second image 1-GB or of the first image 1-GA, and the second image 1-GB corresponds to one region 1-RB of the first image 1-GA. The processing circuit 1-X can composite the three images according to the third image 1-GC. For example, the processing circuit 1-X composites the region 1-RC in the first image 1-GA, the region 1-RC in the second image 1-GB, and the third image 1-GC, thereby increasing the local details of the composite image.

In addition, in some embodiments of the present disclosure, because there is a distance between two lens driving mechanisms of the optical camera system, the two images which are captured have parallax, and therefore the processing circuit 1-X can composite the two images into a 3D stereo image.

The present disclosure provides an optical camera system disposed in an electronic device, and the optical camera system has a plurality of lens driving mechanisms that can be arranged in different manners so as to obtain different photography effects. In an embodiment, the first lens driving mechanism and the second lens driving mechanism are arranged in the first direction and there is no magnetic member of the second lens driving mechanism disposed between the first optical component and the second optical component. Thus, the problem of electromagnetic interference can be avoided.

In addition, in another embodiment, the plurality of lens driving mechanisms may have different focal lengths, and they can photograph the same object to obtain a plurality of images. Then, the images are composited by the processing circuit to obtain a clearer composite image.

Second Group of Embodiments

Figure 17:
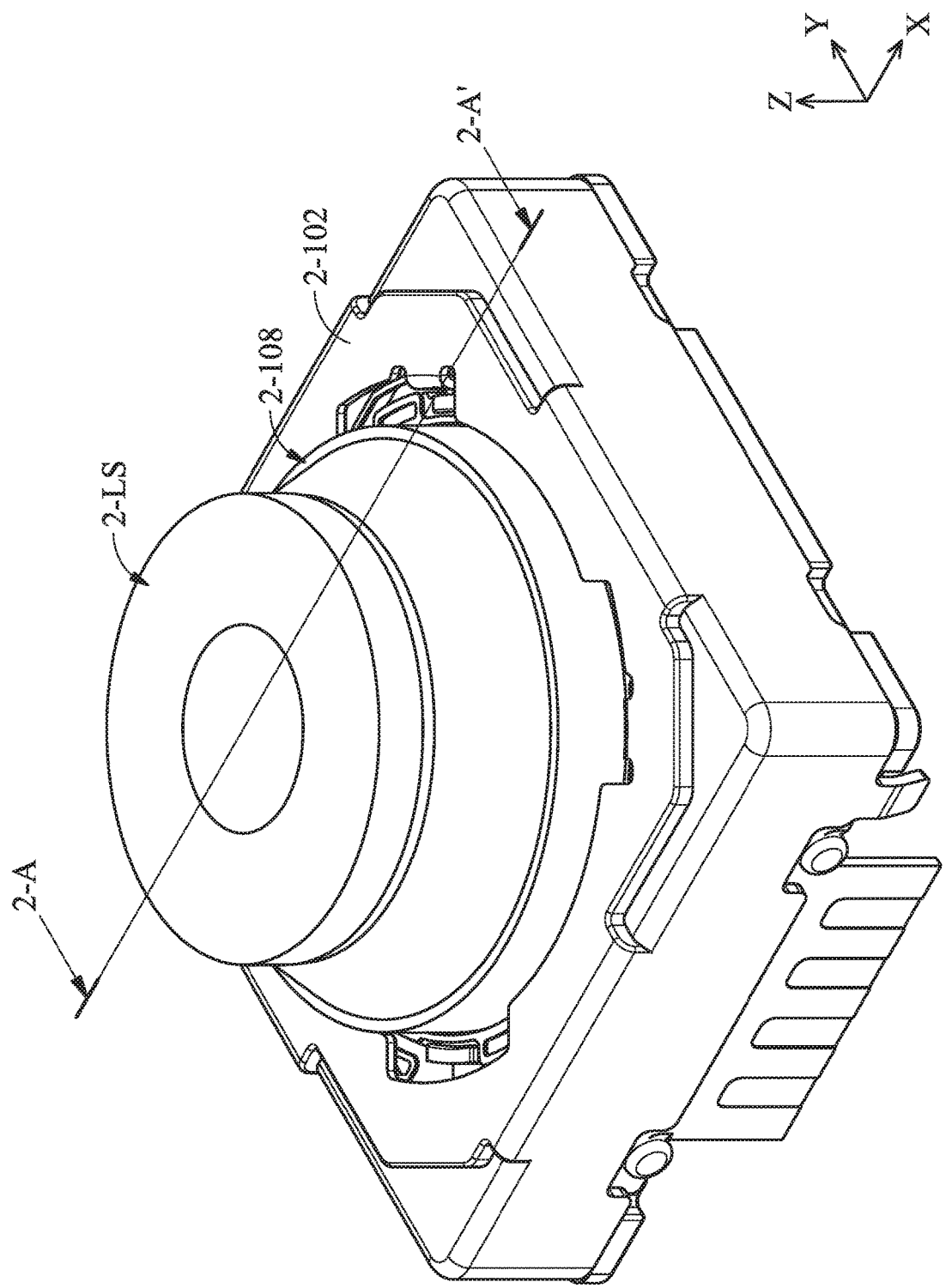
FIG. 17 shows a schematic diagram of an optical component driving mechanism according to an embodiment of the present disclosure.
Figure 18:
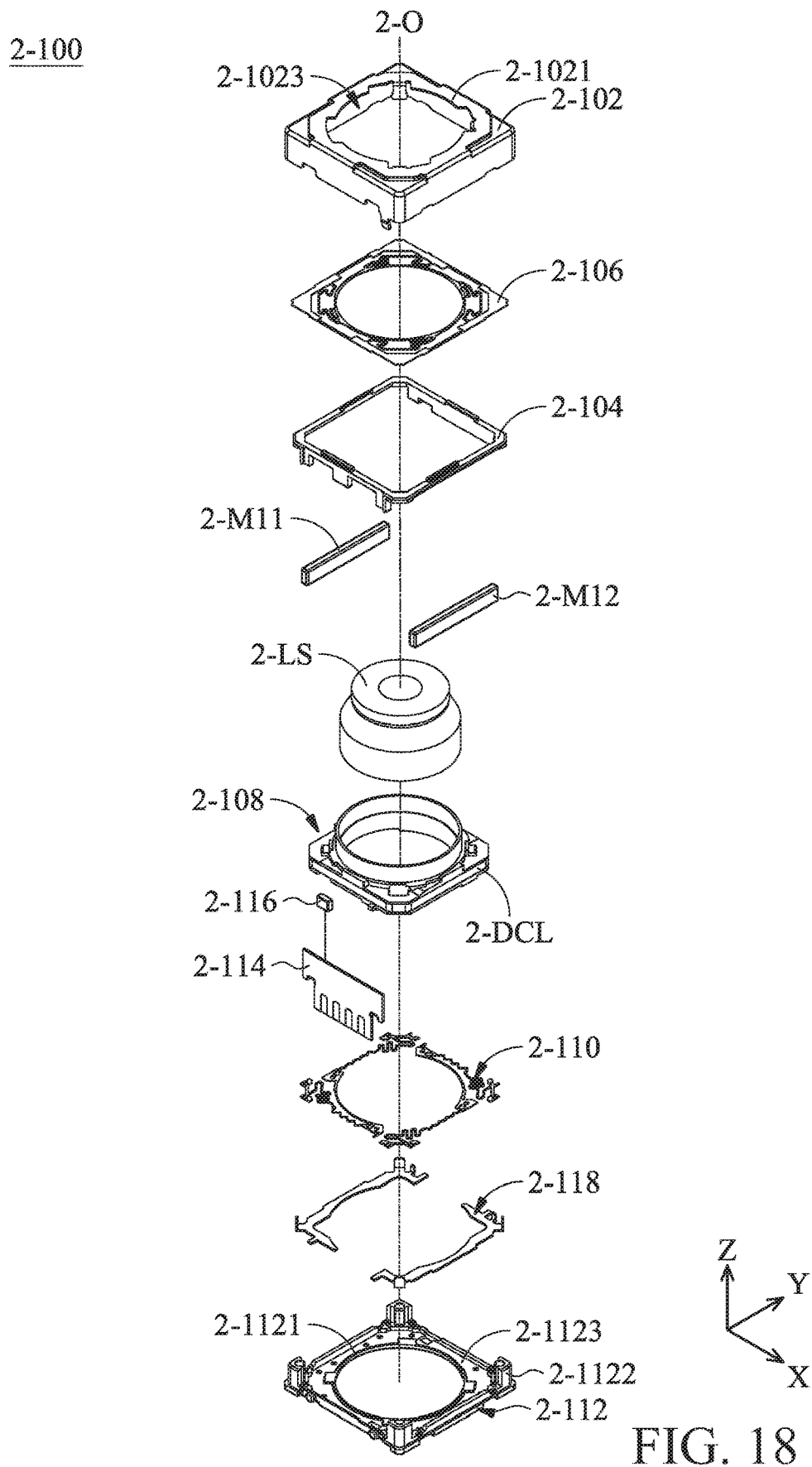
FIG. 18 shows an exploded diagram of the optical component driving mechanism according to the embodiment of the present disclosure.
Figure 19:
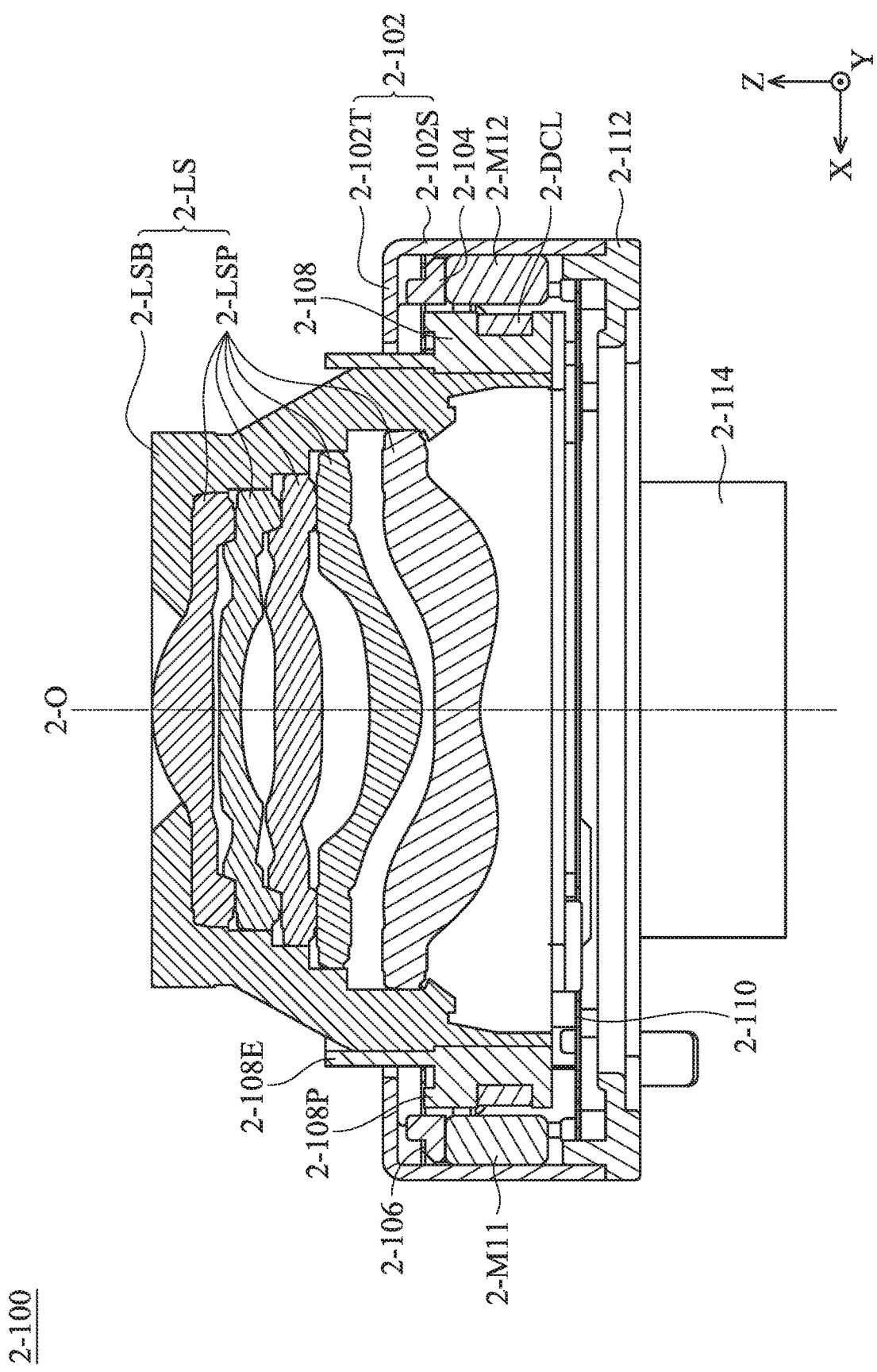
FIG. 19 shows a cross-sectional view along line A-A' in FIG. 17 according to the embodiment of the present disclosure.

Please refer to FIG. 17 to FIG. 19. FIG. 17 shows a schematic diagram of an optical component driving mechanism 2-100 according to an embodiment of the present disclosure, FIG. 18 shows an exploded diagram of the optical component driving mechanism 2-100 according to the embodiment of the present disclosure, and FIG. 19 shows a cross-sectional view along line A-A' in FIG. 17 according to the embodiment of the present disclosure. The optical component driving mechanism 2-100 can be an optical camera system and can be configured to hold and drive an optical component 2-LS. The optical component driving mechanism 2-100 can be installed in different electronic devices or portable electronic devices, such as a smartphone or a tablet computer, for allowing a user to perform the image capturing function. In this embodiment, the optical component driving mechanism 2-100 can be a voice coil motor (VCM) with an auto-focusing (AF) function, but it is not limited thereto. In other embodiments, the optical component driving mechanism 2-100 can also perform the functions of auto-focusing and optical image stabilization (OIS).

As shown in FIG. 17 to FIG. 19, in the present embodiment, the optical component driving mechanism 2-100 mainly includes a fixed assembly (may include a casing 2-102, a frame 2-104 and a base 2-112), a first elastic member 2-106, a movable assembly (may include a holder 2-108), and a driving assembly (may include a first magnet 2-M11, a second magnet 2-M12, and a driving coil 2-DCL), a second elastic member 2-110, a circuit unit 2-114 and a magnetic sensing unit 2-116 and a circuit member 2-118. The holder 2-108 can move relative to the fixed assembly, and the holder 2-108 is configured to hold the optical component 2-LS. It should be noted that in other embodiments, the members in the fixed assembly can also be adjusted to be movable (that is, they can be included in the movable assembly) according to practical requirements. For example, the frame 2-104 can be designed to be movable in other embodiments.

In this embodiment, as shown in FIG. 19, the optical component 2-LS can be a camera lens, and the optical component 2-LS defines an optical axis 2-O. Furthermore, the optical component 2-LS can have a body 2-LSB and a plurality of lenses 2-LSP, and the lenses 2-LSP are fixed in the body 2-LSB.

As shown in FIG. 18, the casing 2-102 has a hollow structure, and a casing opening 2-1021 is formed on the casing 2-102. A base opening 2-1121 is formed on the base 2-112. The center of the casing opening 2-1021 corresponds to the optical axis 2-O of a plurality of lenses 2-LSP which is held by the body 2-LSB. The base opening 2-1121 corresponds to an image sensing element (now shown in the figures) disposed below the base 2-112. External light can enter the casing 2-102 through the casing opening 2-1021, and then to be received by the image sensing element (not shown) after passing through the optical component 2-LS and the base opening 2-1121, so as to generate a digital image signal.

In addition, the casing 2-102 may include an accommodating space 2-1023 for accommodating the frame 2-104, the holder 2-108, the first elastic member 2-106, the first magnet 2-M11, the second magnet 2-M12, the driving coil 2-DCL, the circuit unit 2-114, and so on. In this embodiment, the circuit unit 2-114 may be a circuit board, and the driving assembly is electrically connected to the circuit unit 2-114 and can drive the holder 2-108 to move relative to the fixed assembly (for example, to move relative to the base 2-112). The magnetic sensing unit 2-116 is disposed on the circuit unit 2-114 and configured to sense a magnetic component (not shown) disposed on the holder 2-108 so as to obtain a position of the holder 2-108 relative to the base 2-112.

In this embodiment, the optical component driving mechanism 2-100 includes two magnets, and the shape of the first magnet 2-M11 and of the second magnet 2-M12 may be a long strip-shaped structure, but the number of magnets and their shape are not limited to the above. For example, they may be shaped differently in other embodiments. In addition, the first magnet 2-M11 or the second magnet 2-M12 can be a multi-pole magnet.

As shown in FIG. 18 and FIG. 19, the frame 2-104 is securely disposed on an inner wall surface of the casing 2-102, and the first magnet 2-M11 and the second magnet 2-M12 can also be securely disposed on the frame 2-104 and the inner wall surface of the casing 2-102. As shown in FIG. 18 and FIG. 19, in this embodiment, the driving coil 2-DCL can be a winding coil and is disposed surround the holder 2-108. In addition, the driving coil 2-DCL corresponds to the first magnet 2-M11 and the second magnet 2-M12. When the driving coil 2-DCL is provided with electricity, the driving coil 2-DCL acts with the first magnet 2-M11 and the second magnet 2-M12 to generate an electromagnetic driving force, to drive the holder 2-108 and the optical component 2-LS to move along a direction of the optical axis 2-O (the Z-axis) relative to the base 2-112.

Furthermore, as shown in FIG. 18, four protruding columns 2-1122 and a receiving groove 2-1123 are formed on the base 2-112, and the protruding columns 2-1122 are extended in the direction of the optical axis 2-O. In this embodiment, the first elastic member 2-106 is disposed between the casing 2-102 (a portion of the fixed assembly) and the frame 2-104, and the outer portion of the first elastic member 2-106 is fixed to the frame 2-104 so that the holder 2-108 to be movably connected to the frame 2-104 through the first elastic member 2-106.

Similarly, the outer portion of the second elastic member 2-110 is fixed to the receiving groove 2-1123. In addition, the inner portions of the first elastic member 2-106 and the second elastic member 2-110 are respectively connected to the upper side and the lower side of the holder 2-108, so that the holder 2-108 can be suspended in the frame 2-104 (as shown in FIG. 19). Therefore, the driving assembly can drive the holder 2-108 to move relative to the frame 2-104.

As shown in FIG. 18, the circuit member 2-118 is disposed inside the base 2-112. For example, the base 2-112 is made of a plastic material, and the circuit member 2-118 is formed in the base 2-112 by the technology of Molded Interconnect Device (MID). In one embodiment, the circuit unit 2-114 can be electrically connected to the second elastic member 2-110 through the circuit member 2-118.

As shown in FIG. 19, when viewed along a direction perpendicular to the optical axis 2-O (such as along the X-axis), the holder 2-108 partially overlaps the fixed assembly. Specifically, the casing 2-102 in the fixed assembly has a top wall 2-102T and a plurality of side walls 2-102S extending from the top wall 2-102T in the direction of the optical axis 2-O, and when viewed along a direction perpendicular to optical axis 2-O, the top wall 2-102T partially overlaps the holder 2-108.

In this embodiment, the holder 2-108 has an extending portion 2-108E extending in the direction of the optical axis 2-O and when viewed along the direction perpendicular to the optical axis 2-O (such as along the X-axis in FIG. 19), the top wall 2-102T partially overlaps the extending portion 2-108E. That is, the extending portion 2-108E protrudes out of the top wall 2-102T along the Z-axis.

Figure 20:
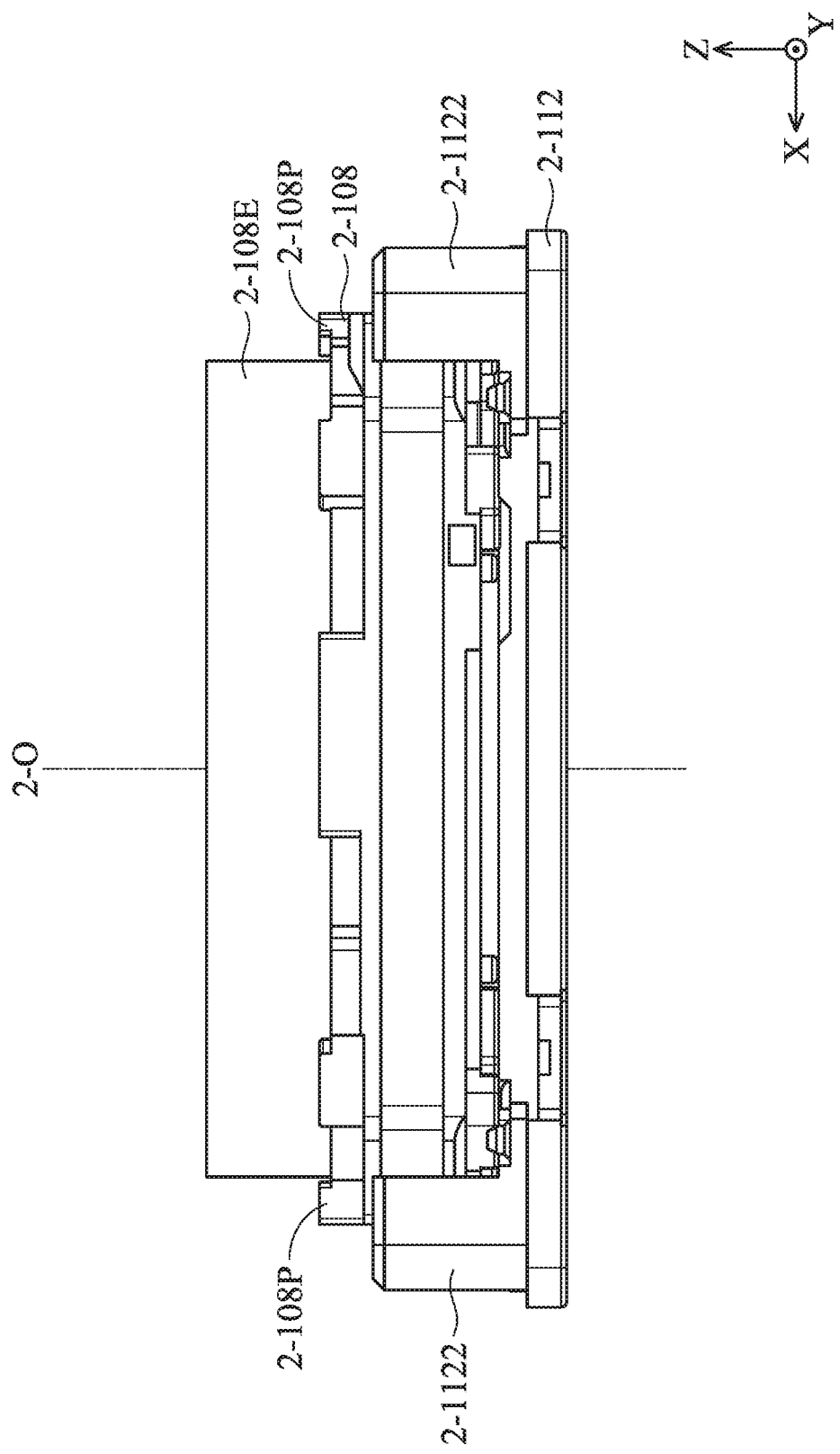
FIG. 20 is a schematic diagram of the base and the holder according to an embodiment of the present disclosure.

Please refer to FIG. 20, which is a schematic diagram of the base 2-112 and the holder 2-108 according to an embodiment of the present disclosure. As shown in FIG. 20, when viewed in a direction perpendicular to the optical axis 2-O (such as the Y-axis), the protruding columns 2-1122 of the base 2-112 partially overlap the holder 2-108.

Furthermore, as shown in FIG. 19 and FIG. 20, the holder 2-108 may further have a stop member 2-108P, such as a protruding block. The stop member 2-108P faces the top wall 2-102T of the casing 2-102 and extends in the direction of the optical axis 2-O. The stop member 2-108P is configured to limit the range of motion of the holder 2-108 in the Z-axis.

Figure 21:
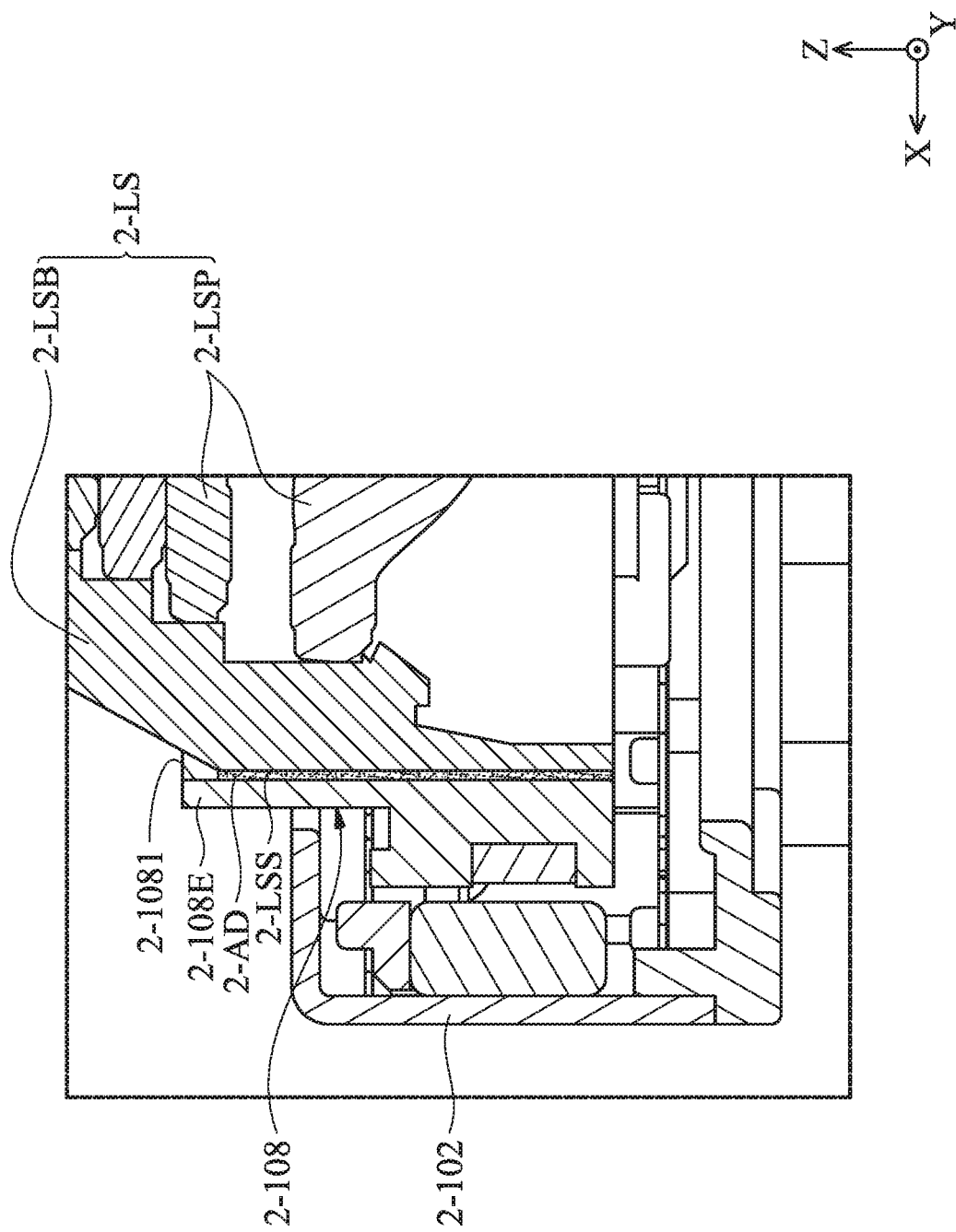
FIG. 21 is an enlarged diagram of the holder and the optical component according to an embodiment of the present disclosure.

Next, please refer to FIG. 21, which is an enlarged diagram of the holder 2-108 and the optical component 2-LS according to an embodiment of the present disclosure. The extending portion 2-108E has an inner wall surface 2-1081 facing the optical component 2-LS, and the body 2-LSB of the optical component 2-LS has an outer wall surface 2-LSS which faces the inner wall surface 2-1081. Furthermore, the optical component driving mechanism 2-100 may further include an adhesive member 2-AD, such as glue, disposed between the outer wall surface 2-LSS and the inner wall surface 2-1081 for fixing the optical component 2-LS to the holder 2-108 (the camera lens).

Figure 22:
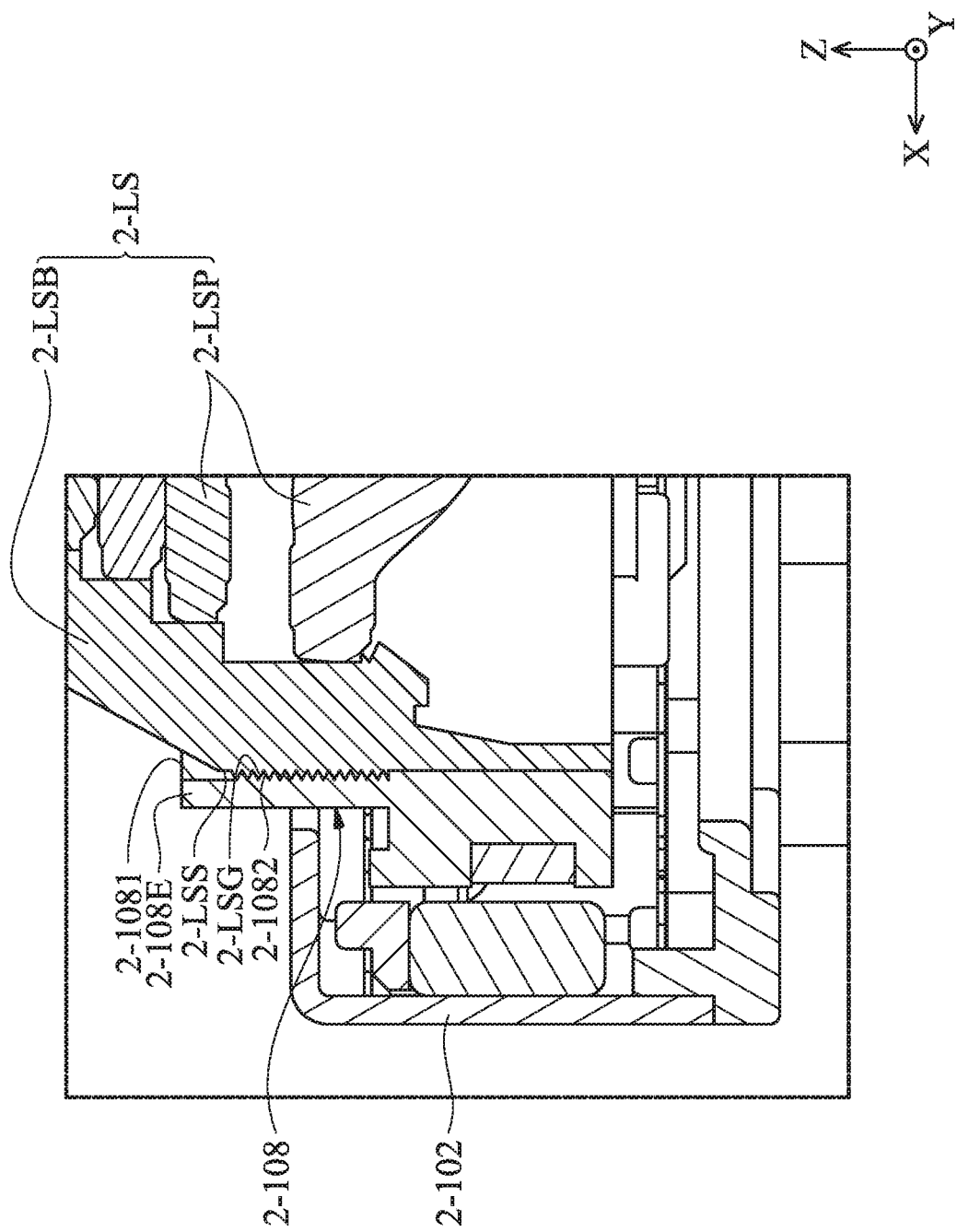
FIG. 22 is an enlarged diagram of the holder and the optical component according to another embodiment of the present disclosure.

Next, please refer to FIG. 22, which is an enlarged diagram of the holder 2-108 and the optical component 2-LS according to another embodiment of the present disclosure. In this embodiment, the inner wall surface 2-1081 may have an engaging portion 2-1082, and the outer wall surface 2-LSS may have a fitting portion 2-LSG. The fitting portion 2-LSG is configured to be coupled to the engaging portion 2-1082 so as to prevent the optical component 2-LS from being detached from the holder 2-108. In one embodiment, the engaging portion 2-1082 can be an internal thread, and the fitting portion 2-LSG can be an external thread, but they are not limited thereto.

In addition, in other embodiments, the engaging portion 2-1082 and the fitting portion 2-LSG may not be in contact with each other, and an adhesive member 2-AD is disposed between the engaging portion 2-1082 and the fitting portion 2-LSG so that the optical component 2-LS is fixed to the holder 2-108. Based on this configuration, the adhesion area of the adhesive member 2-AD to the inner wall surface 2-1081 and the outer wall surface 2-LSS can be increased, thereby improving the adhesion strength.

Figure 23:
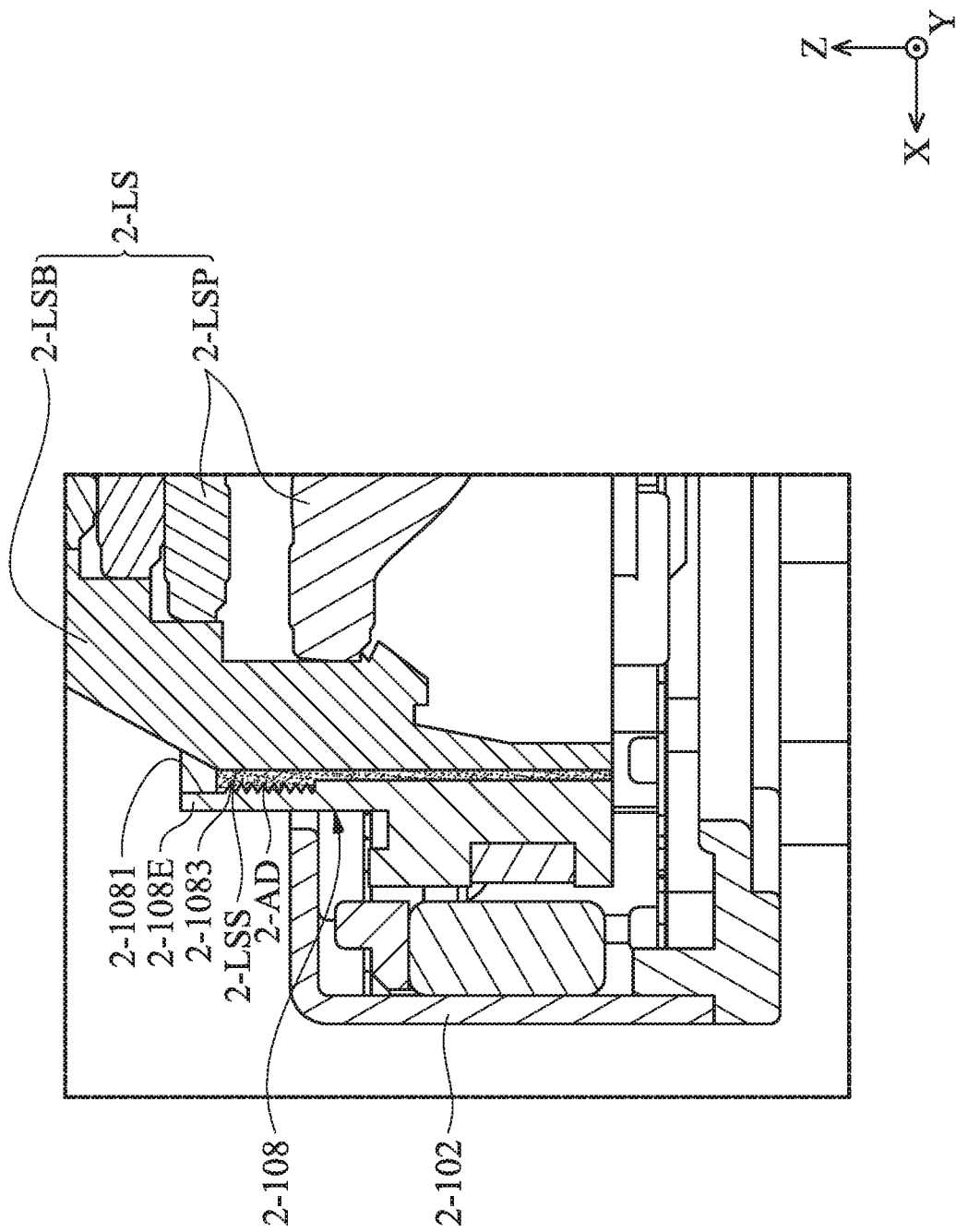
FIG. 23 is an enlarged diagram of the holder and the optical component according to another embodiment of the present disclosure.

Next, please refer to FIG. 23, which is an enlarged diagram of the holder 2-108 and the optical component 2-LS according to another embodiment of the present disclosure. In this embodiment, a thread structure 2-1083 is formed on a portion of the inner wall surface 2-1081, and then the adhesive member 2-AD is disposed between the inner wall surface 2-1081 and the outer wall surface 2-LSS, so that the optical component 2-LS is fixed to the holder 2-108. Based on this configuration, the adhesion area of the adhesive member 2-AD to the inner wall surface 2-1081 and the outer wall surface 2-LSS can be increased, thereby improving the adhesion strength.

It should be noted that the holder 2-108 does not overlap the optical component 2-LS when viewed in the direction of the optical axis 2-O (the Z-axis).

Figure 24:
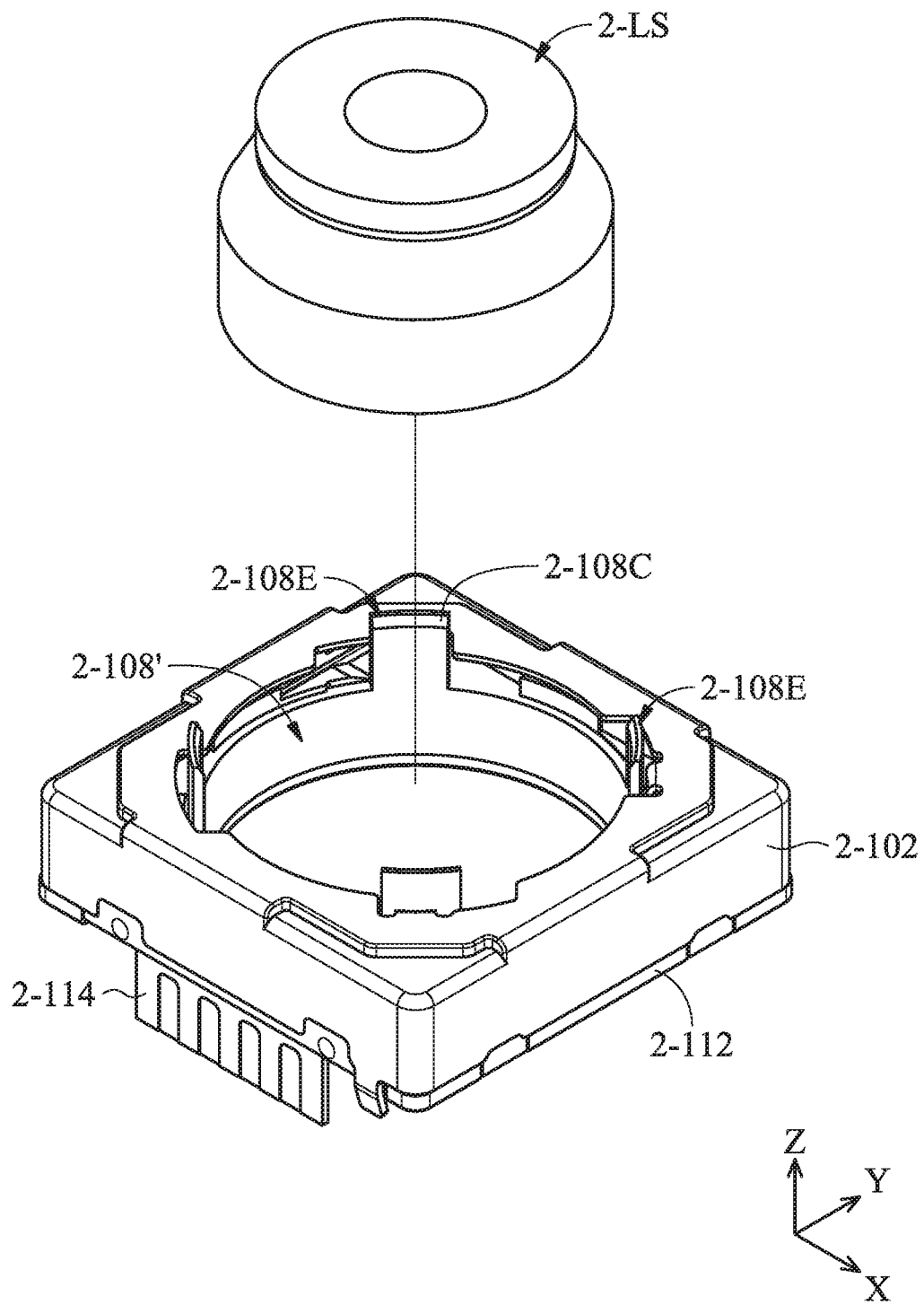
FIG. 24 is a schematic diagram of an optical component driving mechanism according to another embodiment of the present disclosure.

Please refer to FIG. 24, which is a schematic diagram of an optical component driving mechanism 2-200 according to another embodiment of the present disclosure. In this embodiment, the holder 2-108' may have four plate-shaped extending portions 2-108E, disposed respectively corresponding to the four corners of the casing 2-102. As shown in FIG. 24, a guiding slope 2-108C may be formed on one end of each of the extending portions 2-108E and the guiding slope 2-108C is configured to guide the optical component 2-LS when the optical component 2-LS (the camera lens) is installed in the holder 2-108 so as to improve convenience of assembly.

It should be noted that the number of extending portions 2-108E is not limited thereto. In other embodiments, the holder 2-108 may only include two extending portions 2-108E that correspond to the diagonal corners of the fixed assembly.

Figure 25:
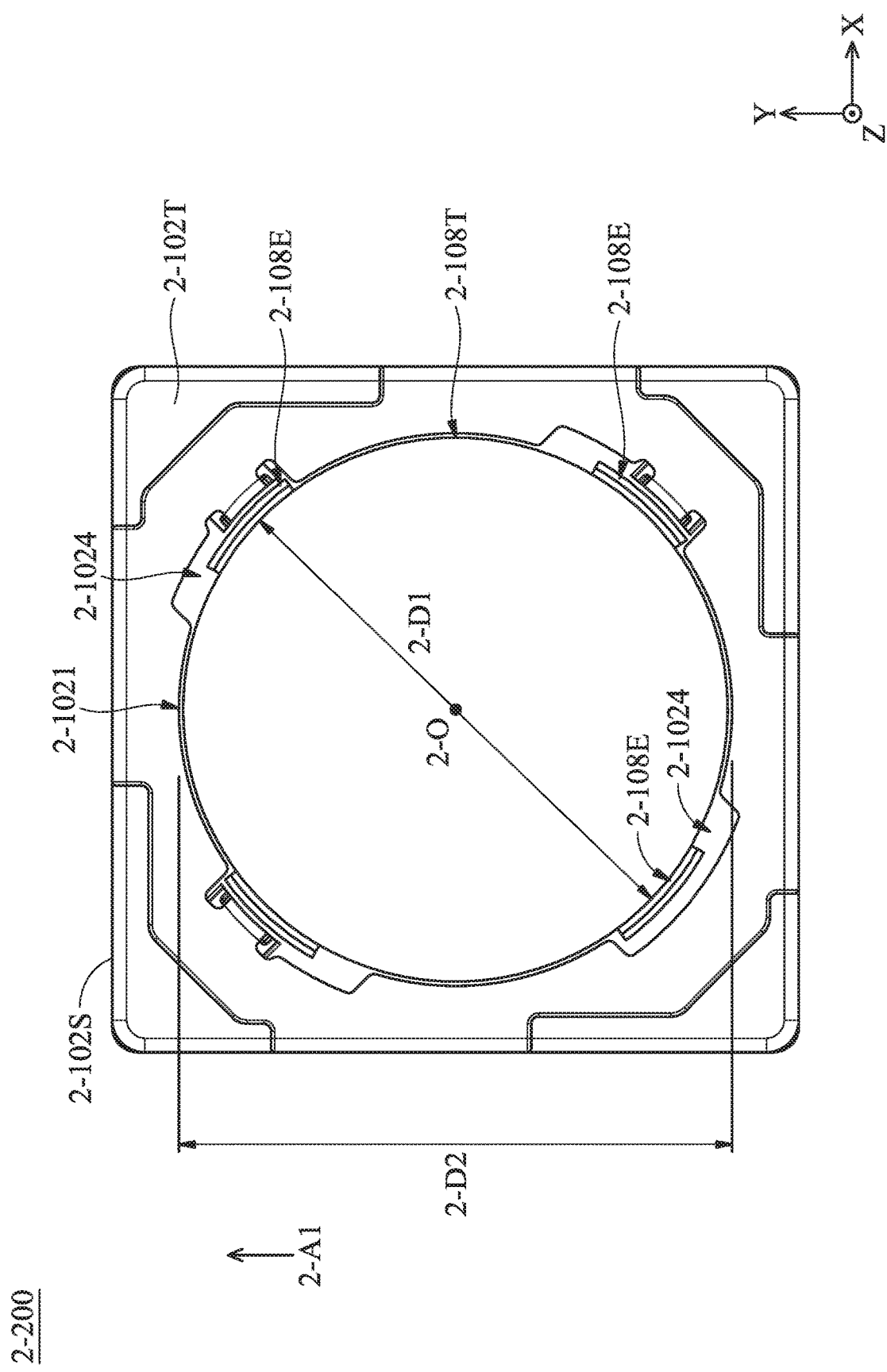
FIG. 25 is a top view of the optical component driving mechanism according to another embodiment of the present disclosure.

Please refer to FIG. 25, which is a top view of the optical component driving mechanism 2-200 according to another embodiment of the present disclosure. As shown in FIG. 25, when viewed in the direction of the optical axis 2-O, a distance 2-D1 between the two opposite extending portions 2-108E is slightly smaller than a diameter 2-D2 of the casing opening 2-1021 along a first direction 2-A1 (for example, the Y-axis), and the first direction 2-A1 is substantially perpendicular to one of the side walls 2-102S.

In addition, the top wall 2-102T further has four notches 2-1024 communicating with the casing opening 2-1021, and the extending portions 2-108E are respectively disposed in the notches 2-1024. Based on this structural design, the optical component driving mechanism 2-200 can hold a camera lens of a larger size, and the overall structural strength of the optical component driving mechanism 2-200 can be maintained at the same time.

The present disclosure provides an optical component driving mechanism having a holder 2-108 configured to hold an optical component 2-LS (the camera lens). One or more extending portions 2-108E may be formed on the holder 2-108 to increase the contact area between the glue and the holder 2-108 and between the glue and the optical component 2-LS, thereby improving the strength of the bonding. Therefore, when a heavier lens (such as a glass lens) is disposed in the optical component 2-LS, the holder 2-108 can still stably hold the optical component 2-LS, so that the optical component 2-LS is not separated from the holder 2-108 when the optical component driving mechanism is impacted.

Third Group of Embodiments

Figure 26:
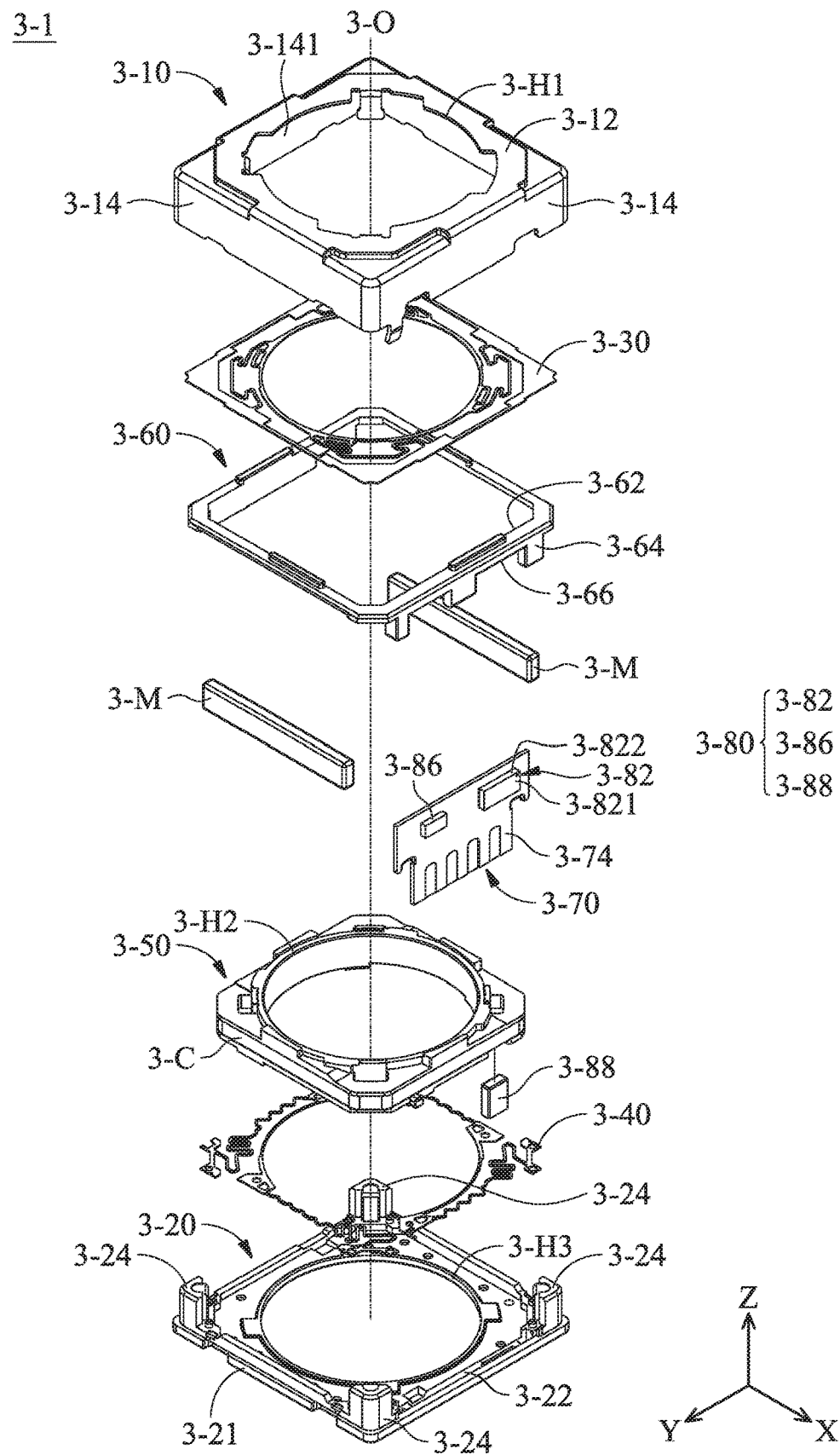
FIG. 26 shows an exploded diagram of a driving mechanism 3-1 according to an embodiment of the present disclosure.
Figure 27:
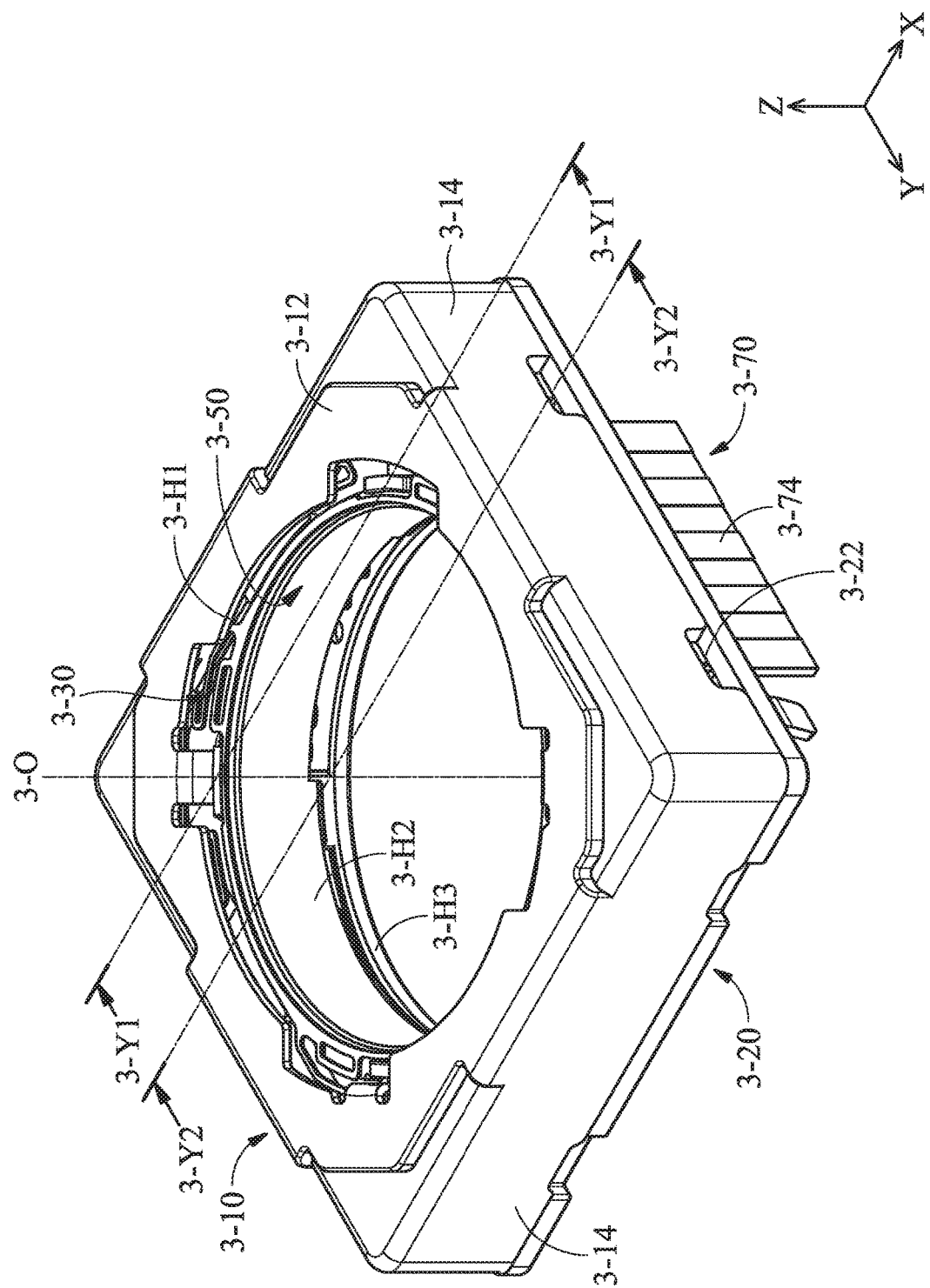
FIG. 27 shows a combination diagram of the driving mechanism 3-1 in FIG. 26.
Figure 28:
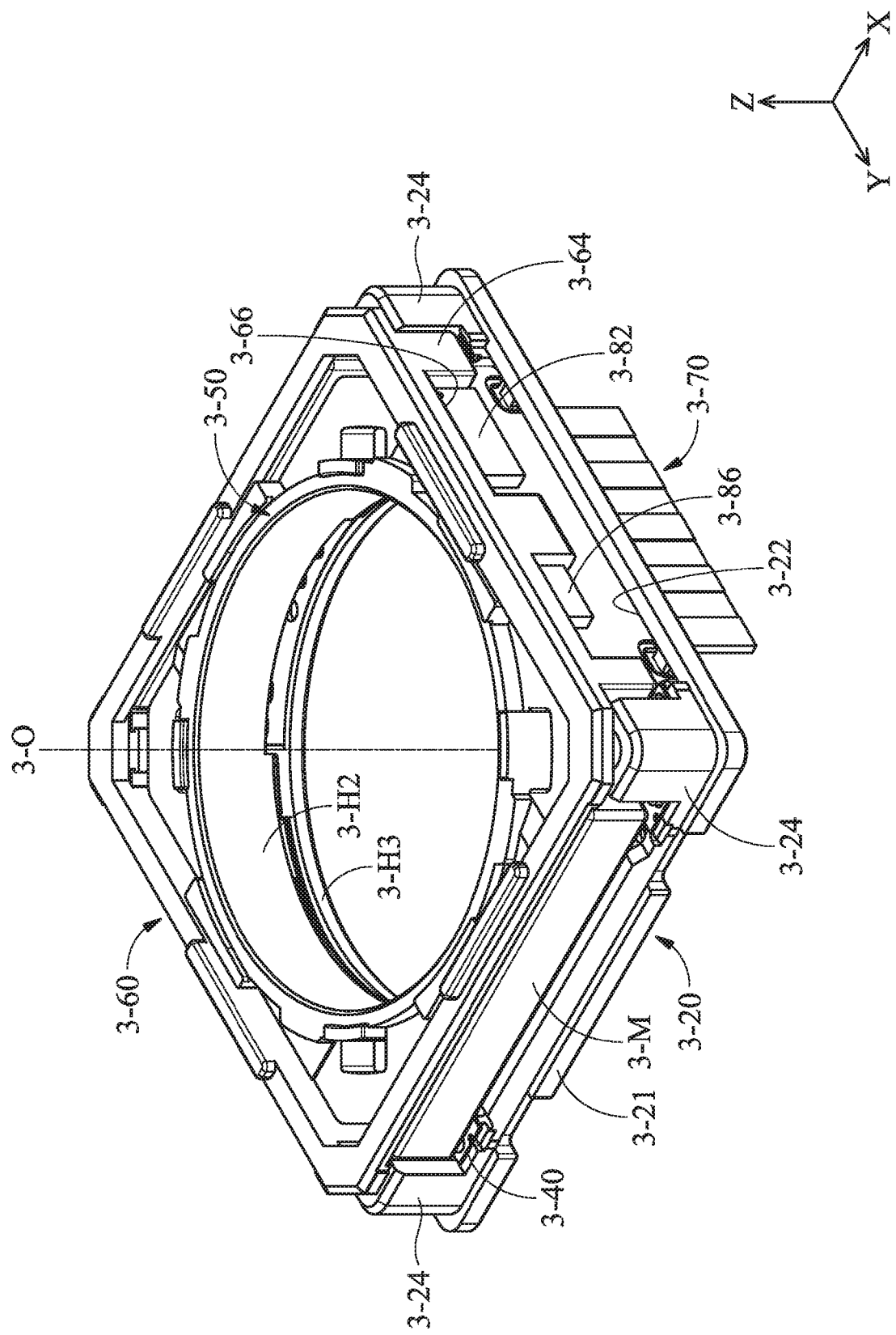
FIG. 28 shows a schematic diagram of the driving mechanism 3-1 in FIG. 27 after removing a casing 3-10 and a first elastic member 3-30.
Figure 29:
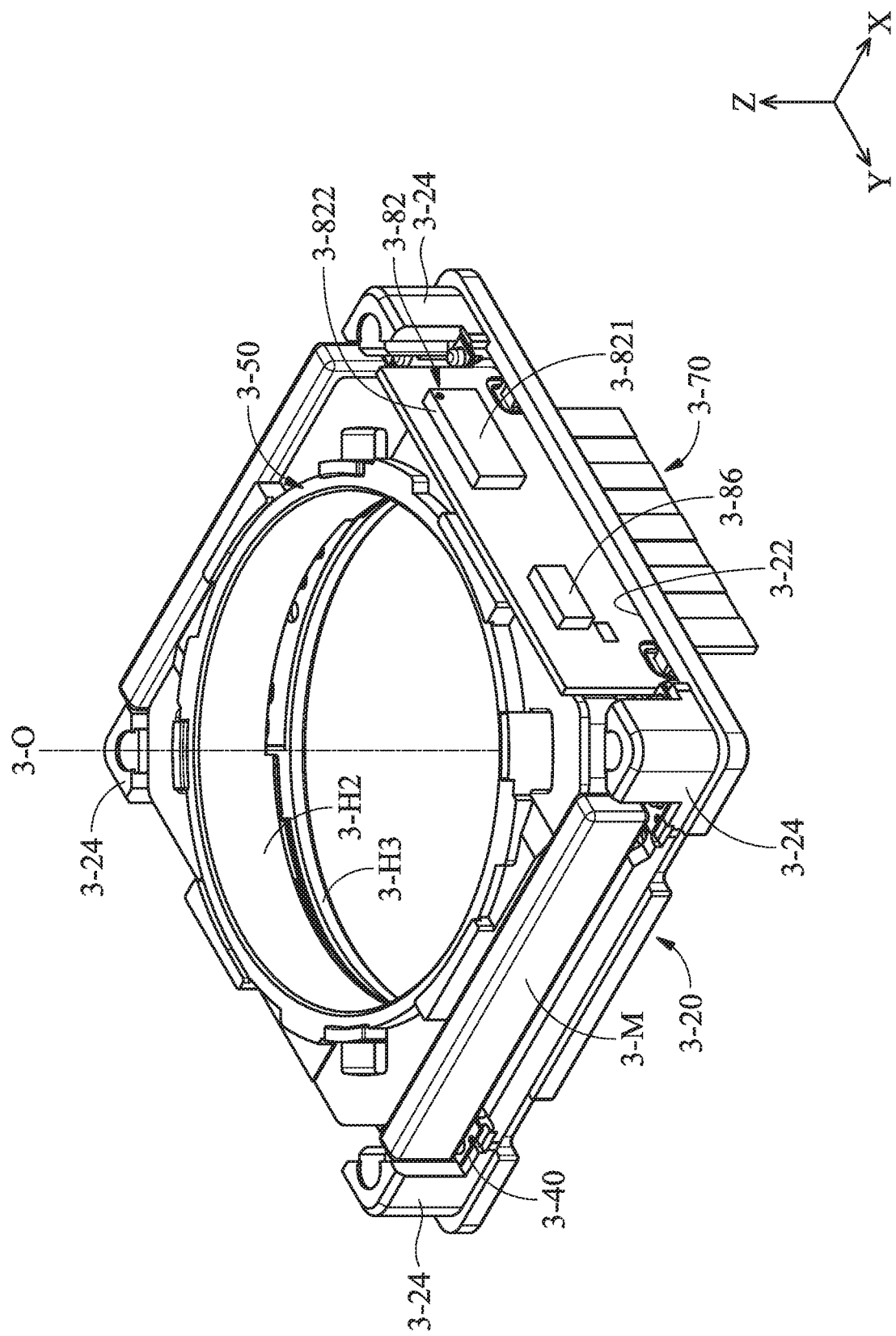
FIG. 29 shows a schematic diagram of the driving mechanism 3-1 in FIG. 27 after removing the casing 3-10, the first elastic member 3-30, and a frame 3-60.

First, please refer to FIG. 26 to FIG. 29. FIG. 26 shows an exploded diagram of a driving mechanism 3-1 according to an embodiment of the present disclosure, FIG. 27 shows a combination diagram of the driving mechanism 3-1 in FIG. 26, FIG. 28 shows a schematic diagram of the driving mechanism 3-1 in FIG. 27 after removing a casing 3-10 and a first elastic member 3-30, and FIG. 29 shows a schematic diagram of the driving mechanism 3-1 in FIG. 27 after removing the casing 3-10, the first elastic member 3-30, and a frame 3-60.

As shown in FIG. 26 to FIG. 29, the driving mechanism 3-1 of this embodiment is, for example, a voice coil motor (VCM), which can be installed in a mobile phone or other portable electronic device for driving an optical element (such as an optical lens) to move, so as to achieve functions such as auto focusing (AF) or optical image stabilization (OIS).

The driving mechanism 3-1 has a rectangular structure, and mainly includes a casing 3-10, a base 3-20, at least one first elastic member 3-30, and at least a second elastic member 3-40, a holder 3-50, a frame 3-60, a circuit board 3-70 and at least one magnetic component 3-M. The frame 3-60 is fixed to the inner surface of the casing 3-10, and the circuit board 3-70 is fixed to the frame 3-60 and passed through the groove hole 3-22 of the base 3-20 to be protruded from the bottom side of the base 3-20.

The foregoing holder 3-50 can be used to hold an optical element (such as an optical lens), and can form a movable module of the driving mechanism 3-1. The casing 3-10, the base 3-20, the frame 3-60 and the circuit board 3-70 are fixed to each other to form a fixed module of the driving mechanism 3-1. In the embodiment, the first elastic member 3-30 is connected to the holder 3-50 and the frame 3-60, the second elastic member 3-40 is connected to the holder 3-50 and the base 3-20, such that the holder 3-50 and the optical element disposed therein can be suspended inside the casing 3-10 and can move in the Z-axis with respect to the base 3-20, the frame 3-60, and the circuit board 3-70.

It should be understood that at least one magnetic component 3-M fixed on the frame 3-60 and a coil 3-C disposed around the holder 3-50 may constitute a driving assembly. When a current flows to the aforementioned coil 3-C through the circuit board 3-70, the magnetic component 3-M and the coil 3-C can generate an electromagnetic driving force to drive the holder 3-50 with the optical element disposed therein to move in the Z-axis with respect to the base 3-20, the frame 3-60 and the circuit board 3-70, so as to achieve the auto focusing (AF) function.

Alternatively, instead of using the aforementioned coil 3-C, two elliptical coils (not shown) may be respectively disposed on opposite sides of the rectangular holder 3-50 and adjacent to the aforementioned magnetic member 3-M, so that an electromagnetic driving force can also be generated between the magnet and the coils so as to drive the movable module to move relative to the fixed module. It should be noted that, at this time, the circuit board 3-70 is located on one side of the holder 3-50 without the driving assembly (the magnets and the coils).

In addition, in this embodiment, one sensing element 3-82 on the circuit board 3-70 can further be used to sense a sensed object 3-88 on the holder 3-50, so that the relative movement between the holder 3-50 and the frame 3-60 can be obtained, so as to perform the closed-loop control of the driving mechanism 3-1 to improve the control accuracy and overall performance of the driving mechanism 3-1.

As shown in FIG. 26, an electronic component 3-86 is further disposed on the outer surface 3-74 of the circuit board 3-70, the sensing element 3-82 and the electronic component 3-86 can be electrically connected to each other through a plurality of electrical contacts (not shown) on the outer surface 3-74, and the sensing element 3-82, the electronic component 3-86, and the sensed object 3-88 may constitute a position sensing assembly 3-80. For example, the sensing element 3-82 may be a Hall effect sensor, a MR sensor, a Fluxgate and so on, to sense the position of the sensed object 3-88 (e.g., the magnet) so that the relative position change between the holder 3-50 and the frame 3-60 in the Z-axis can be obtained.

As shown in FIG. 26 and FIG. 27, the casing 3-10 has a top portion 3-12, at least one side wall 3-14, and a through hole 3-H1. The through hole 3-H1 is formed through the top portion 3-12 along an optical axis 3-O of the optical element, and the aforementioned optical axis 3-O is parallel to the Z-axis. It should be understood that the foregoing side walls 3-14 extend from the edge of the top portion 3-12 along the −Z-axis direction toward the base 3-20 and are connected with the base 3-20. In addition, the foregoing casing 3-10 further forms an inner circumferential surface 3-141 surrounding the foregoing through hole 3-H1, and the inner circumferential surface 3-141 is substantially parallel to the Z-axis.

The base 3-20 includes a body 3-21, a long strip-shaped groove hole 3-22, four protruding portions 3-24 and an opening 3-H3. The opening 3-H3 and the groove hole 3-22 are formed through the body 3-21, and a longitudinal axis of the groove hole 3-22 extends in the Y-axis. Moreover, the aforementioned protruding portions 3-24 are located at four corners of the body 3-21 and are extended toward the top portion 3-12 of the casing 3-10.

As shown in FIG. 26 to FIG. 29, the holder 3-50 has an opening 3-H2, the opening 3-H2 is formed through the holder 3-50 in the Z-axis for holding the optical element, and the optical axis 3-O of the optical element passes through the through hole 3-H1 of the casing 3-10, the opening 3-H2 of the holder 3-50 and the opening 3-H3 of the base 3-20 in order. It should be understood that the optical element can be used to direct light to pass through the driving mechanism 3-1 to arrive at an image sensor (not shown) located below the driving mechanism 3-1 so as to form a digital image. In the embodiment, two magnetic components 3-M and one coil 3-C are disposed in the driving mechanism 3-1. The two magnetic components 3-M are fixed on the frame 3-60 and are respectively located on opposite sides of the holder 3-50. The aforementioned coil 3-C is disposed on the holder 3-50 and surrounds the holder 3-50.

Figure 30:
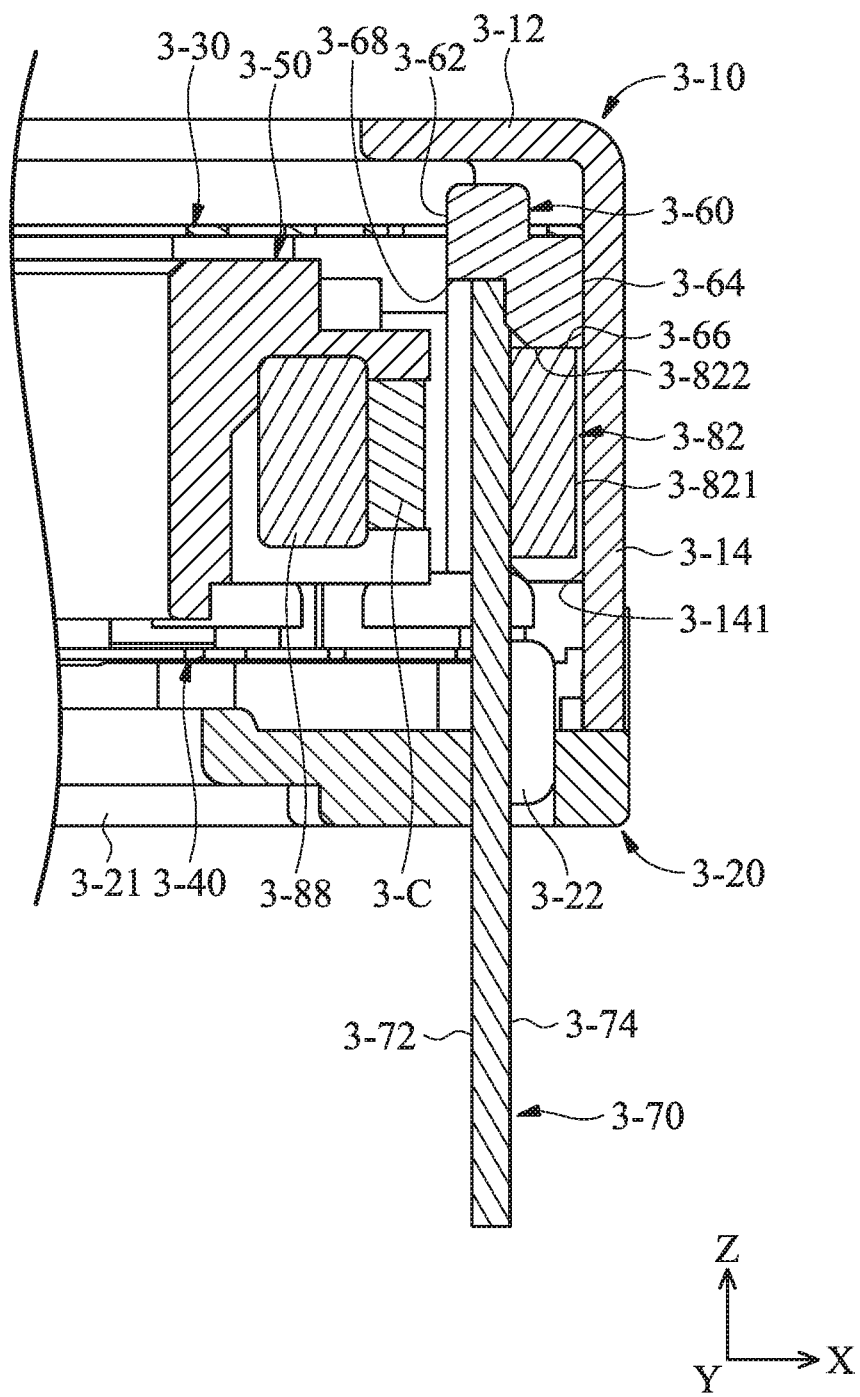
FIG. 30 shows a partial cross-sectional view along line (3-Y1)-(3-Y1) in FIG. 27.

Next, please refer to FIG. 26 to FIG. 30 together. FIG. 30 shows a partial cross-sectional view along line (3-Y1)-(3-Y1) in FIG. 27. As shown in FIG. 26 and FIG. 30, the frame 3-60 has an inner side surface 3-62, an outer side surface 3-64, an abutting surface 3-66 and a contacting surface 3-68 (FIG. 30). The inner side surface 3-62 and the outer side surface 3-64 are located on opposite sides of the frame 3-60 and are parallel to the Z-axis, and the outer side surface 3-64 is in contact with the inner circumferential surface 3-141 of the casing 3-10.

It should be noted that the abutting surface 3-66 and the contacting surface 3-68 face toward the base 3-20 and are located between the inner side surface 3-62 and the outer side surface 3-64. The abutting surface 3-66 is closer to the outer side surface 3-64 than the contacting surface 3-68, and the contacting surface 3-68 is closer to the inner side surface 3-62 than the abutting surface 3-66. In this embodiment, the four protruding portions 3-24 on the base 3-20 are in contact with four corners of the bottom side of the rectangular frame 3-60 after assembly.

Figure 31:
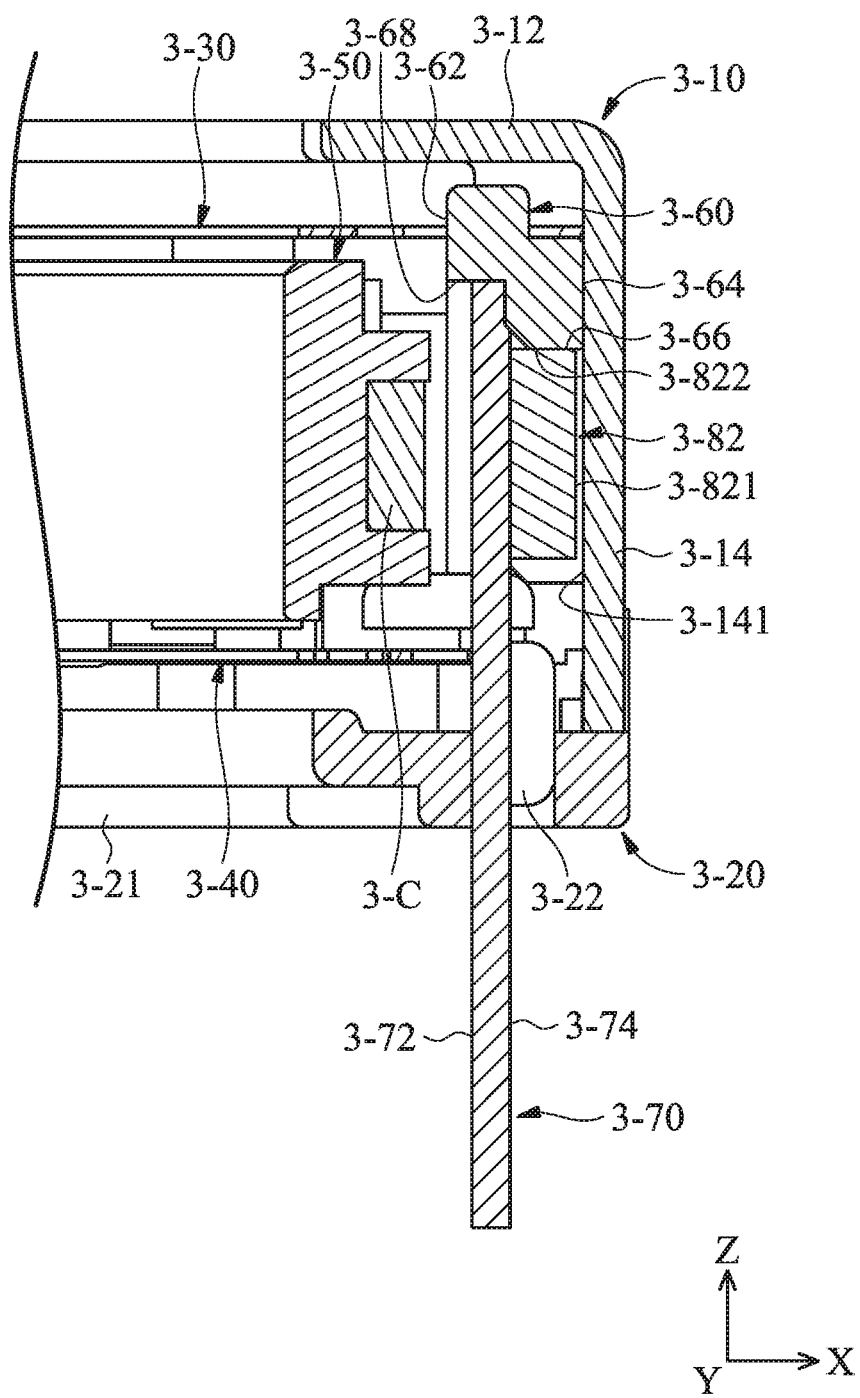
FIG. 31 is a cross-sectional view along line (3-Y2)-(3-Y2) in FIG. 27.

Please refer to FIG. 26 to FIG. 31 together. FIG. 31 is a cross-sectional view along line (3-Y2)-(3-Y2) in FIG. 27. As shown in FIG. 26 to FIG. 31, the above-mentioned circuit board 3-70 passes through the groove hole 3-22 of the base 3-20, and an adhesive (for example, glue) can be applied to the groove hole 3-22 during assembly for connecting the circuit board 3-70 and the base 3-20. The top surface of the circuit board 3-70 can be in contact with the contacting surface 3-68 of the frame 3-60, thereby improving the positioning accuracy of the circuit board 3-70 and enhancing the overall structural strength of the driving mechanism 3-1. In addition, the frame 3-60 at least partially overlaps the circuit board 3-70 when viewed in the Z-axis.

Furthermore, as shown in FIG. 31, the aforementioned circuit board 3-70 has an inner surface 3-72 and an outer surface 3-74, the inner surface 3-72 faces the holder 3-50, and the outer surface 3-74 faces the inner circumferential surface 3-141 of the casing 3-10. It should be understood that the inner side surface 3-62 of the frame 3-60 is closer to the holder 3-50 than the inner surface 3-72 of the circuit board 3-70.

Please continue to refer to FIG. 26 and FIG. 31. The sensing element 3-82 and the electronic component 3-86 in this embodiment are disposed on the outer surface 3-74 of the circuit board 3-70. A top surface 3-822 of the sensing element 3-82 faces the top portion 3-12 of the casing 3-10 and is in contact with the abutting surface 3-66 of the frame 3-60, thereby achieve a well positioning effect between the sensing element 3-82 and the frame 3-60. For example, the aforementioned electronic component 3-86 can be a capacitor or a filter component.

As shown in FIG. 30, an outer wall surface 3-821 of the sensing element 3-82 faces the inner circumferential surface 3-141 of the casing 3-10, and a distance is formed between the outer wall surface 3-821 and the outer side surface 3-64 of the frame 3-60 in the X-axis. For example, the aforementioned sensed object 3-88 may be a magnetic component (such as a magnet) fixed to the holder 3-50 and corresponding to the sensing element 3-82. When viewed along the X-axis, the sensed object 3-88 at least partially overlaps the sensing element 3-82. It should be understood that because the sensed object 3-88 moves along with the holder 3-50, the positional change of the aforementioned sensed object 3-88 can be sensed by the sensing element 3-82 to obtain the position of the holder 3-50 with respect to the fixed module.

In this embodiment, by providing the sensing element 3-82 and the electronic component 3-86 on the outer surface 3-74 of the circuit board 3-70, the sensing element 3-82 and the electronic component 3-86 can be effectively prevented from colliding with the holder 3-50, thereby ensuring that the sensing element 3-82 or the electronic component 3-86 is not damaged by collision with other components when the driving mechanism 3-1 operates, so as to enhance reliability and stability of the driving mechanism 3-1.

On the other hand, because the inner side surface 3-62 of the frame 3-60 is closer to the holder 3-50 than the circuit board 3-70, the circuit board 3-70 can be prevented from being damaged by collision with the holder 3-50. The outer side surface 3-64 of the frame 3-60 is closer to the side wall 3-14 of the casing 3-10 than the sensing element 3-82, so that a gap is formed between the sensing element 3-82 and the inner circumferential surface 3-141 of the casing 3-10, so as to ensure that the sensing element 3-82 is not damaged by collision with the casing 3-10, thereby greatly improving the structural strength and the service life of the driving mechanism 3-1.

Figure 32:
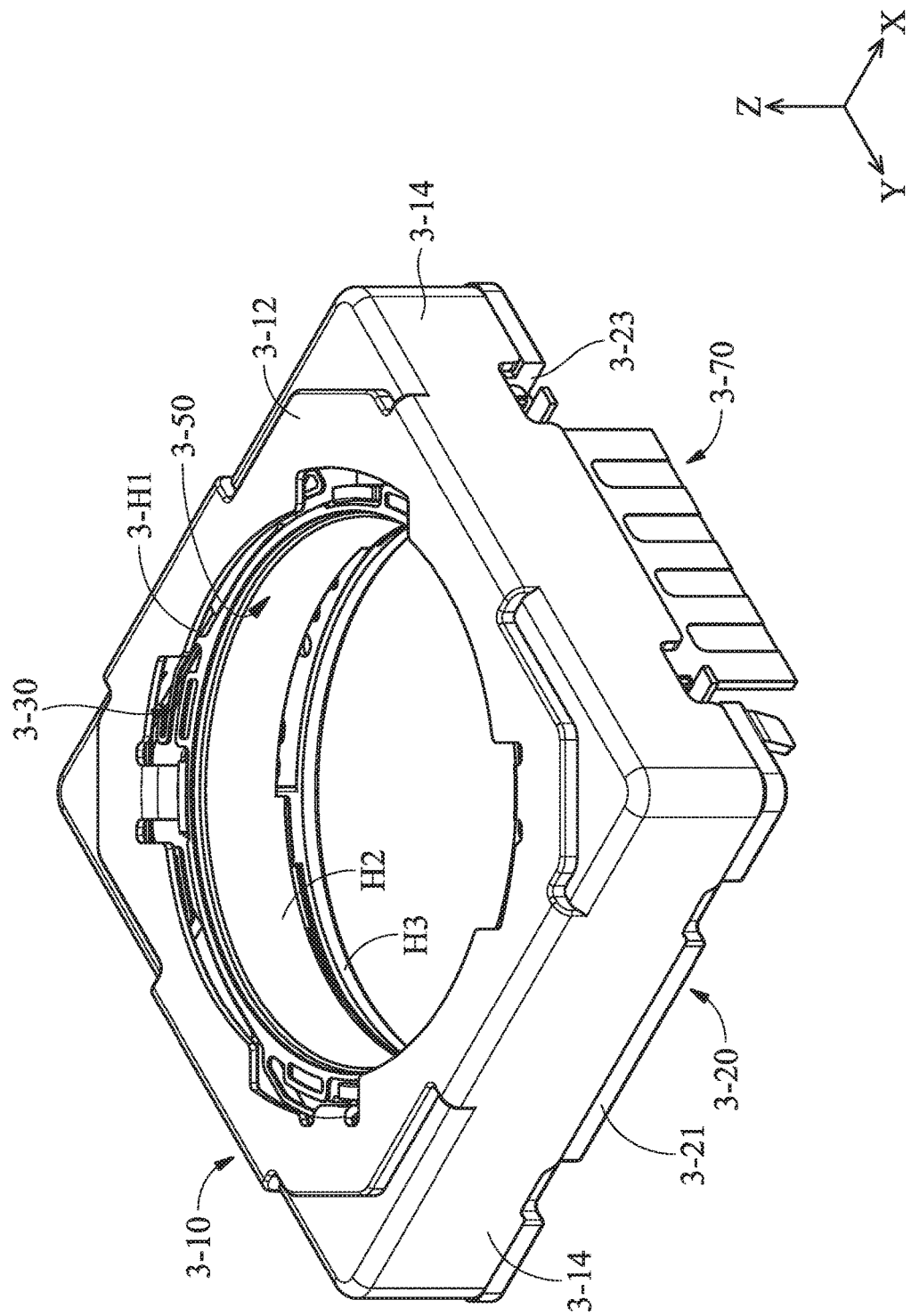
FIG. 32 is a schematic diagram of the driving mechanism 3-1 according to another embodiment of the present disclosure.
Figure 33:
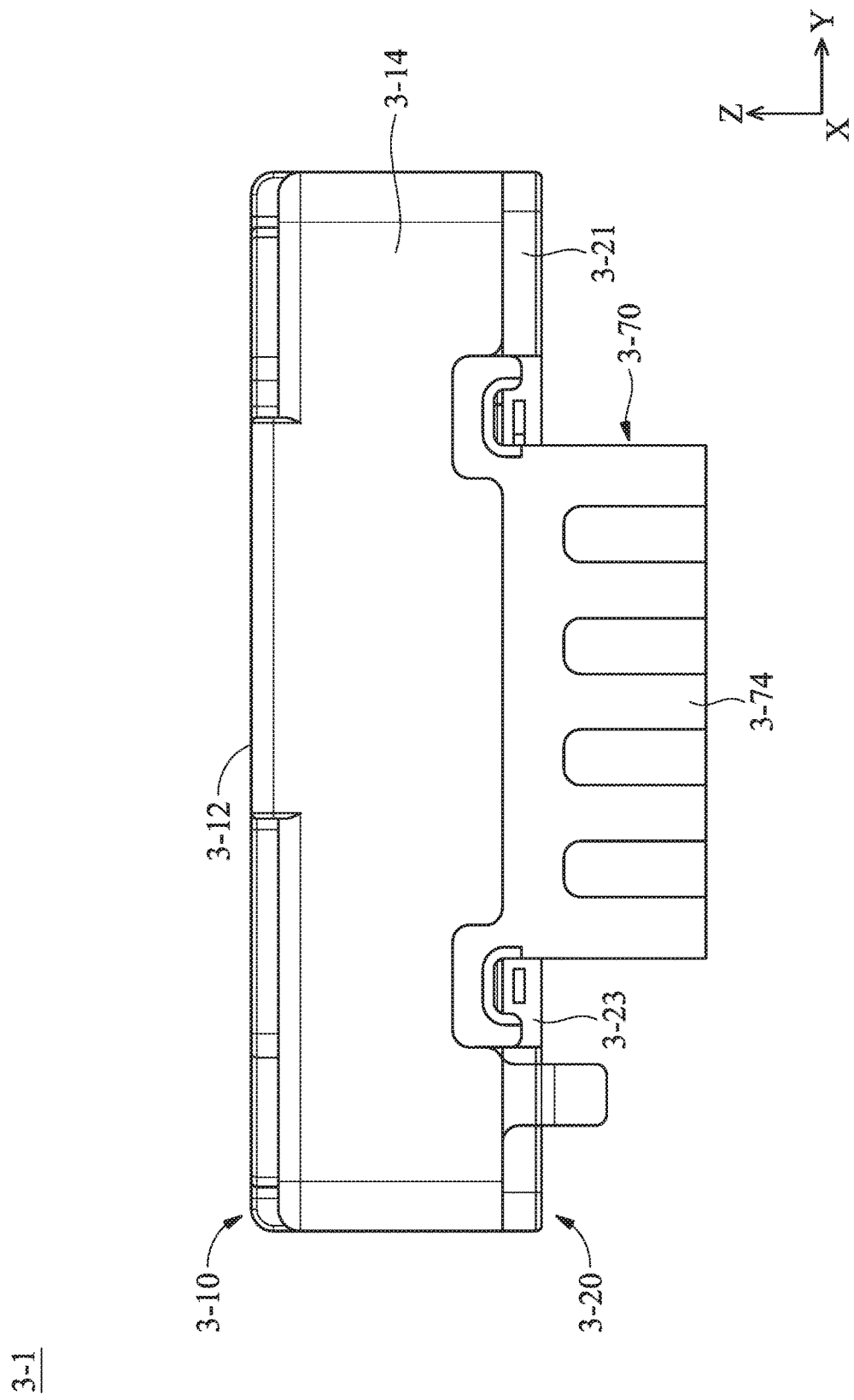
FIG. 33 is a side view of the driving mechanism 3-1 in FIG. 32.
Figure 34:
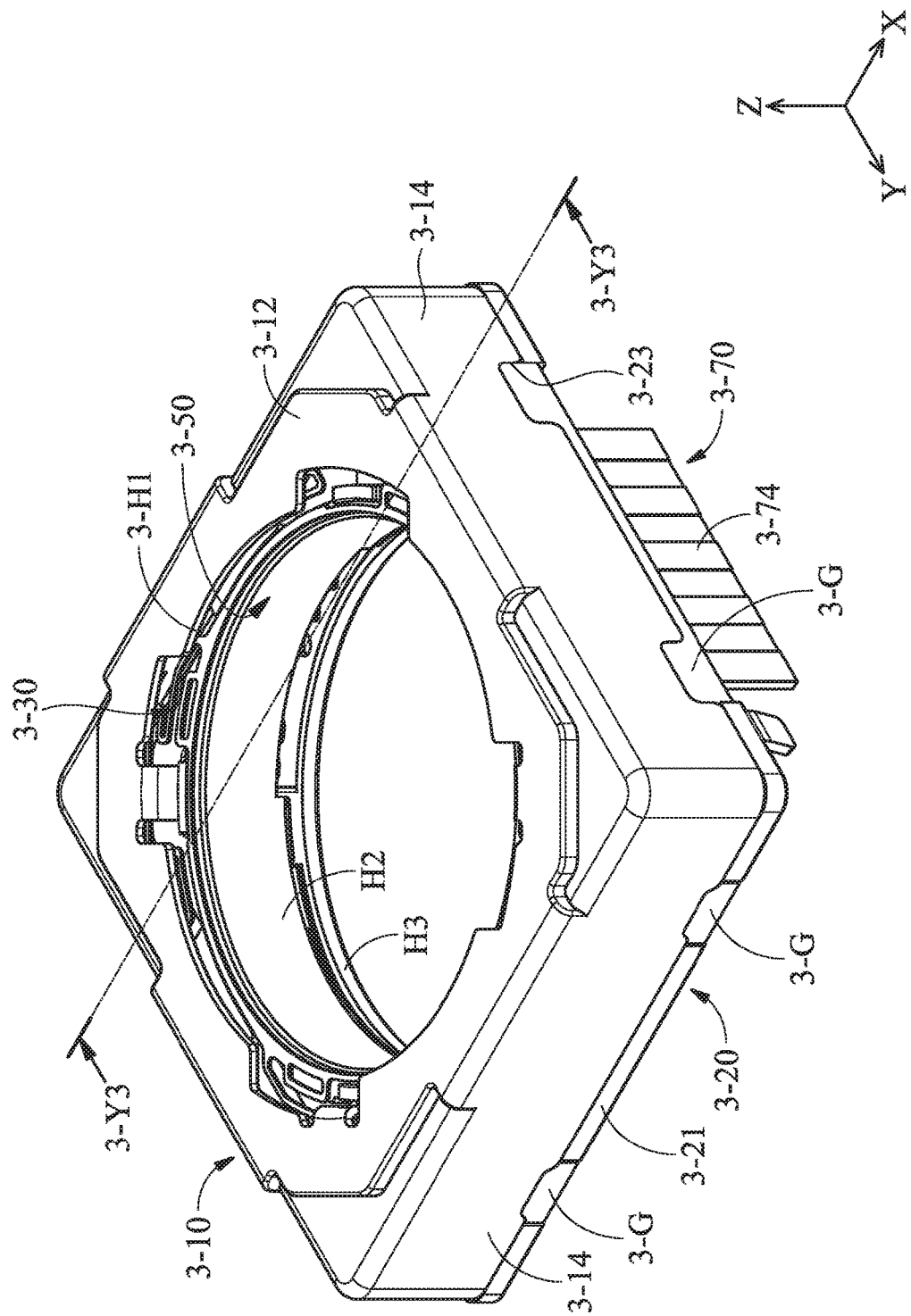
FIG. 34 is a schematic diagram of the driving mechanism 3-1 in FIG. 32 after adding an adhesive.
Figure 35:
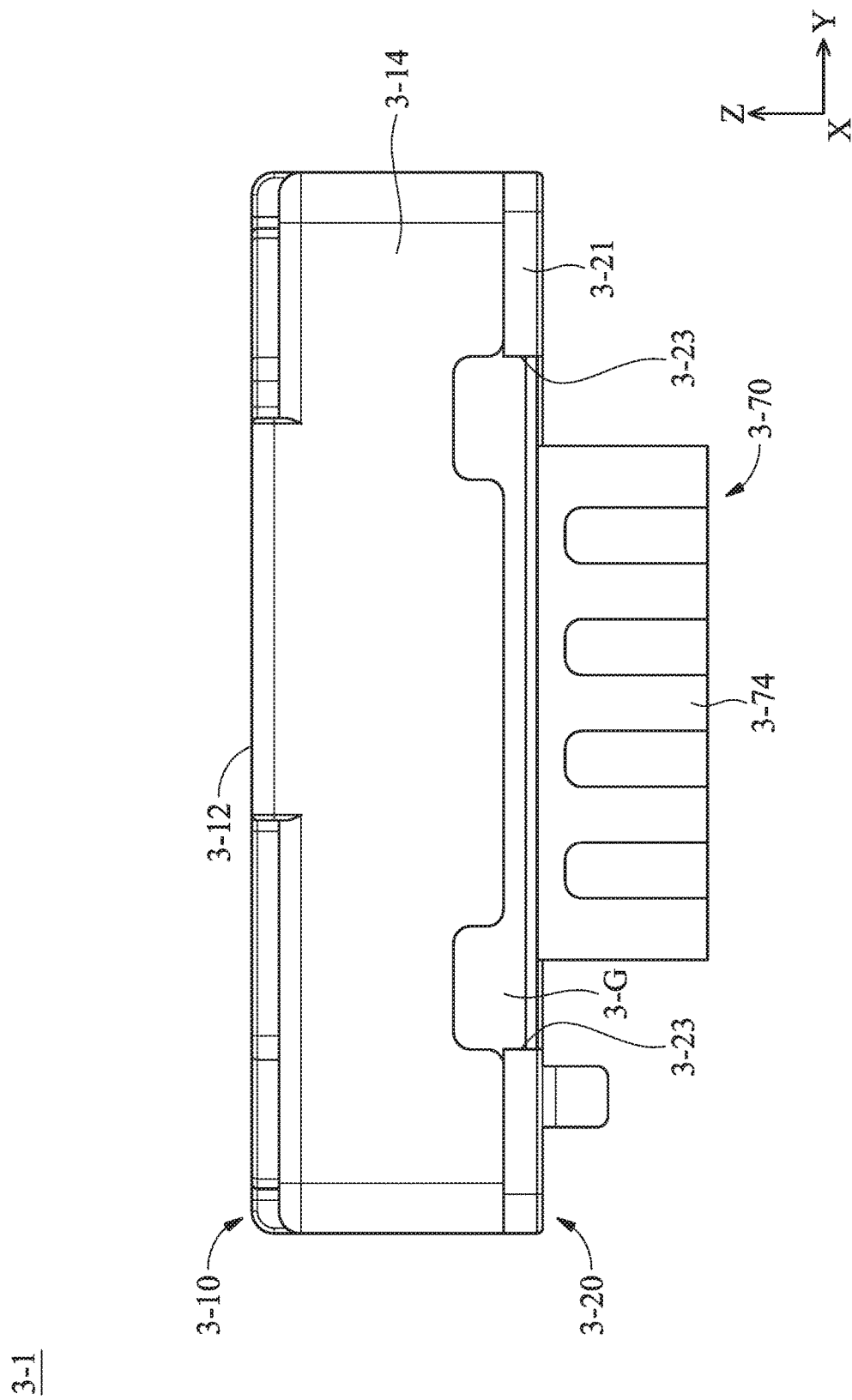
FIG. 35 is a side view of the driving mechanism 3-1 in FIG. 34.
Figure 36:
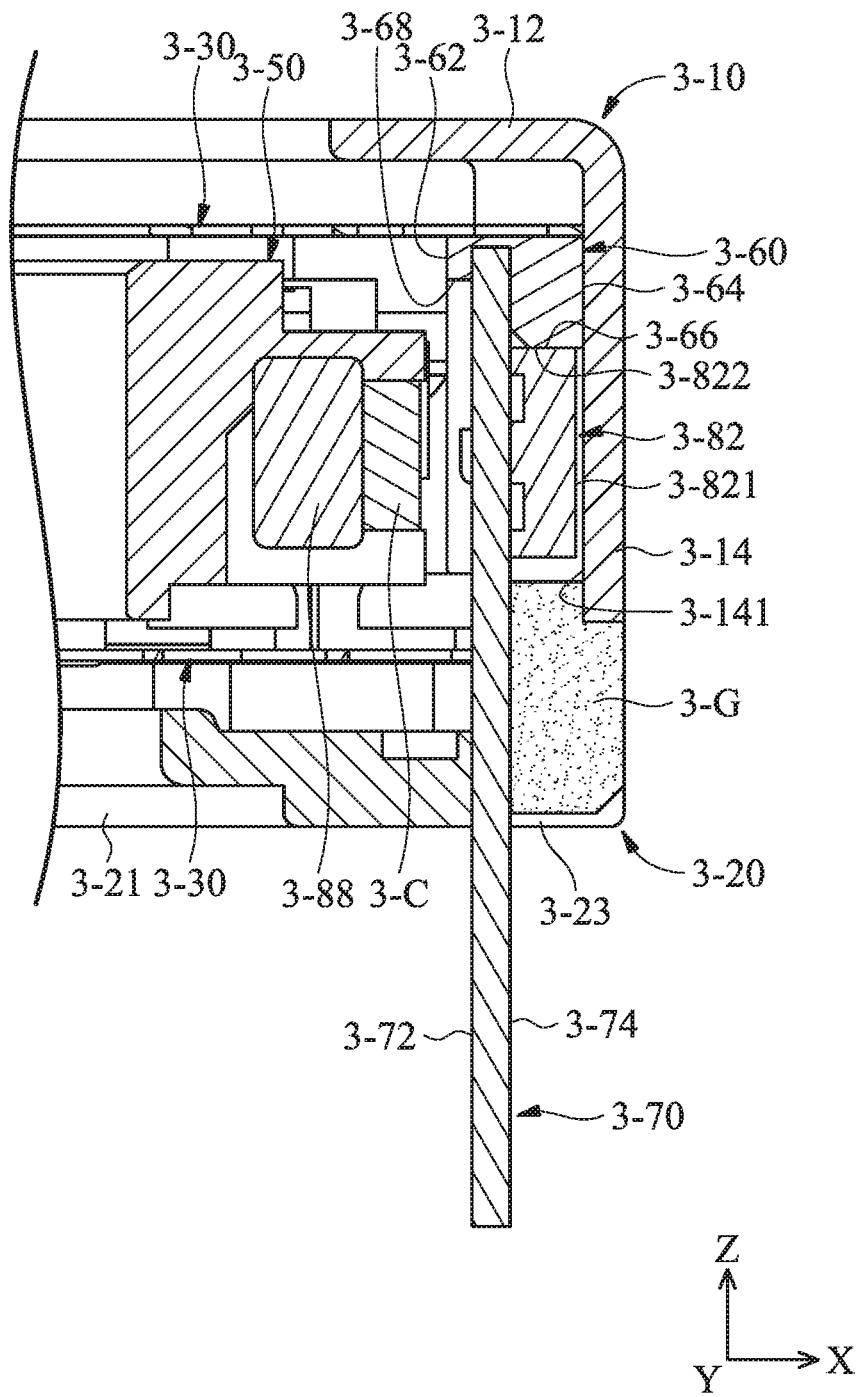
FIG. 36 is a cross-sectional view along line (3-Y3)-(3-Y3) in FIG. 34.

Next, please refer to FIG. 32 to FIG. 36. FIG. 32 is a schematic diagram of the driving mechanism 3-1 according to another embodiment of the present disclosure, FIG. 33 is a side view of the driving mechanism 3-1 in FIG. 32. FIG. 34 is a schematic diagram of the driving mechanism 3-1 in FIG. 32 after adding an adhesive, FIG. 35 is a side view of the driving mechanism 3-1 in FIG. 34, and FIG. 36 is a cross-sectional view along line (3-Y3)-(3-Y3) in FIG. 34.

The difference between the embodiment of FIG. 32 to FIG. 36 and the embodiment of FIG. 26 to FIG. 31 is mainly that a long strip-shaped recess 3-23 is formed one side of the base 3-20 of the driving mechanism 3-1 shown in FIG. 32 to FIG. 36. The recess 3-23 extends in the Y-axis, and the circuit board 3-70 is received in the recess 3-23. The adhesive 3-G can be applied into the recess 3-23 during assembly, so as to firmly connect the casing 3-10 and the circuit board 3-70 (as shown in FIG. 34 to FIG. 36).

Figure 37:
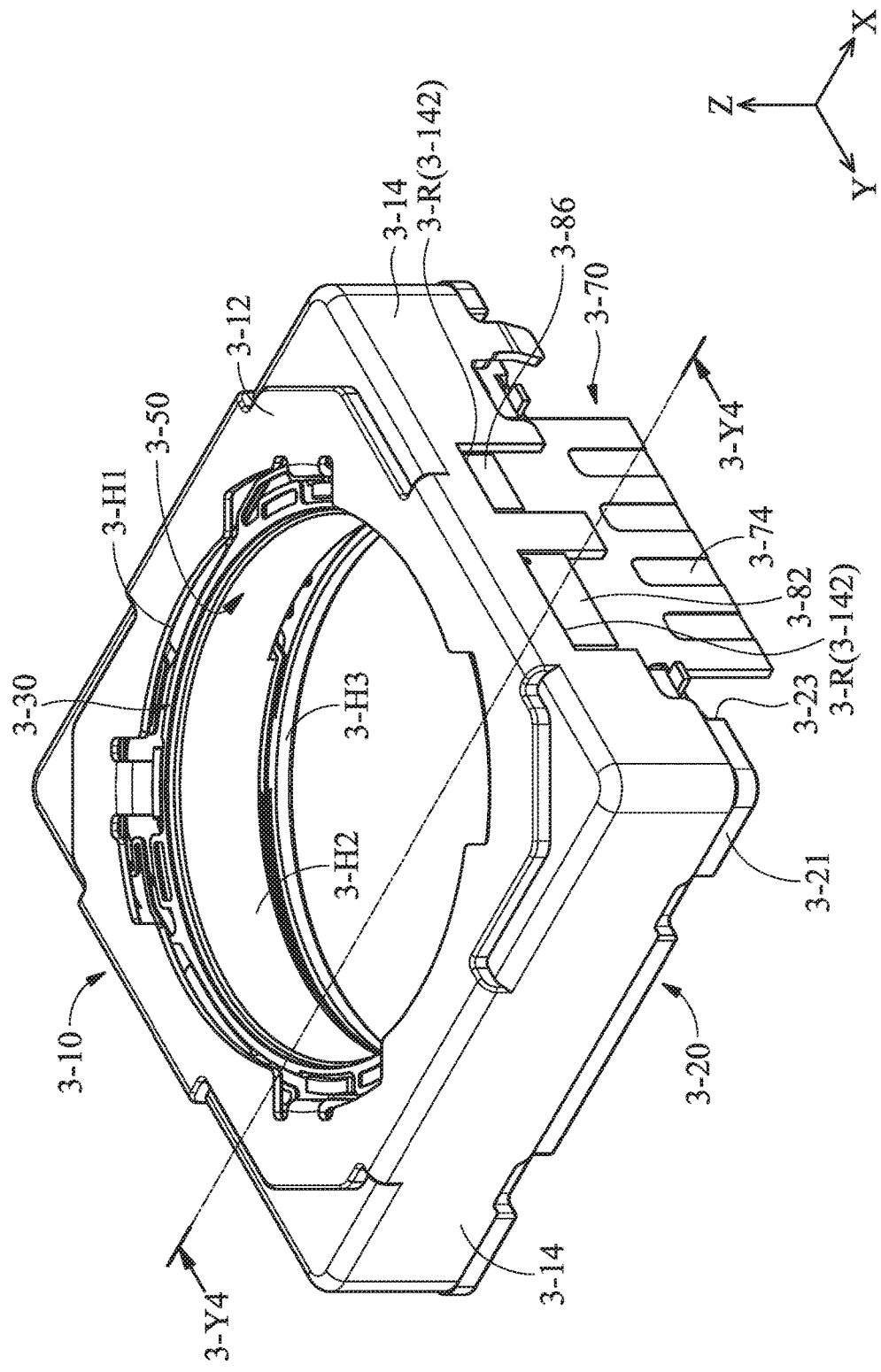
FIG. 37 is a schematic diagram of the driving mechanism 3-1 according to another embodiment of the present disclosure.
Figure 38:
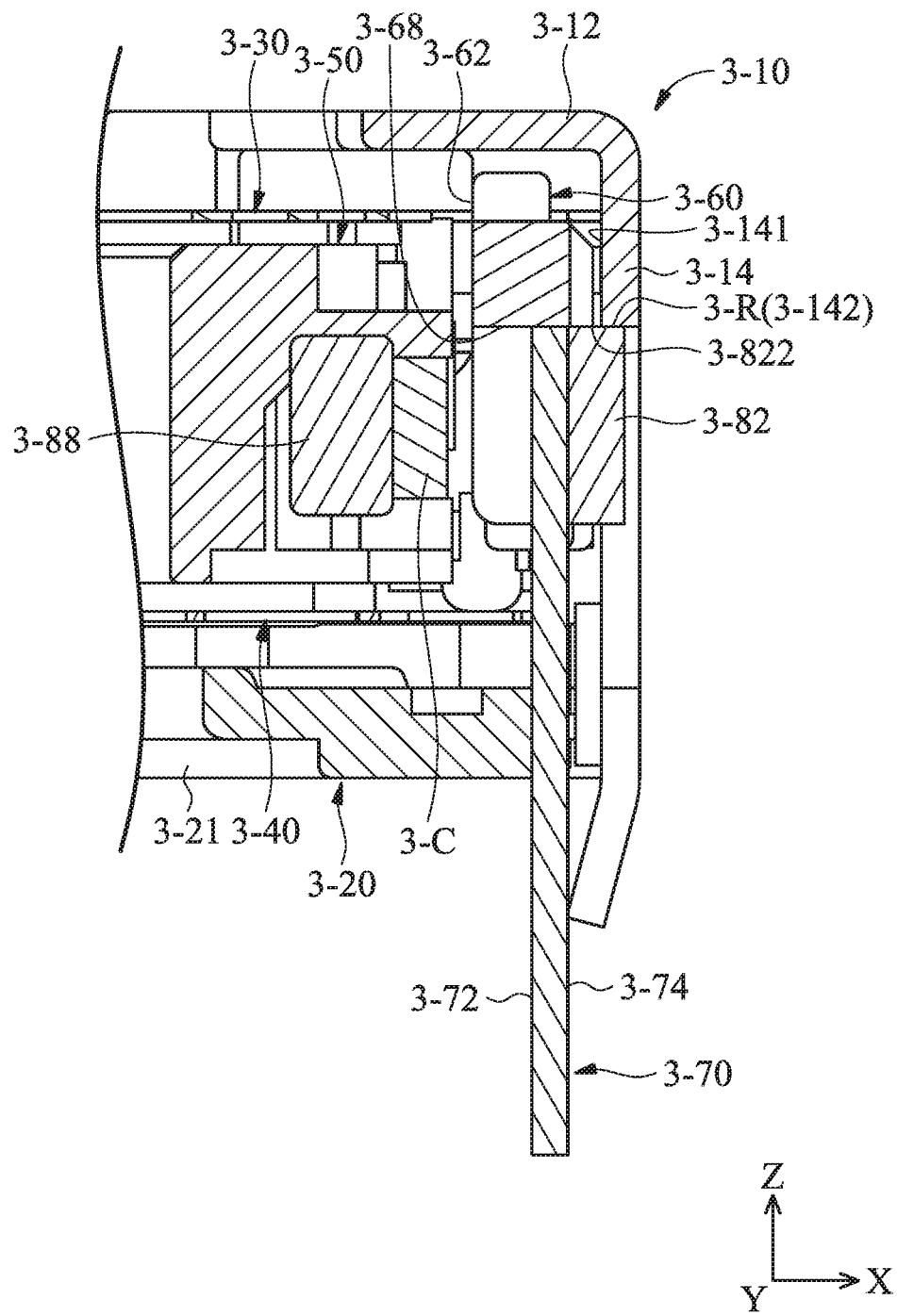
FIG. 38 is a cross-sectional view along line (3-Y4)-(3-Y4) in FIG. 37.

Please refer to FIG. 37 to FIG. 38. FIG. 37 is a schematic diagram of the driving mechanism 3-1 according to another embodiment of the present disclosure, and FIG. 38 is a cross-sectional view along line (3-Y4)-(3-Y4) in FIG. 37. The difference between the embodiment of FIG. 37 to FIG. 38 and the embodiment of FIG. 32 to FIG. 36 is mainly that at least one notch portion 3-R is further formed on the casing 3-10. In the present embodiment, two notch portions 3-R arranged along the Y-axis are formed on the side wall 3-14 of the casing 3-10 for respectively accommodating the aforementioned sensing element 3-82 and the electronic component 3-86 on the circuit board 3-70.

As shown in FIG. 37 and FIG. 38, the sensing element 3-82 and the electronic component 3-86 after assembly can be accommodated in the notch portions 3-R respectively, and they are not protruded from the outer surface of the side wall 3-14 (FIG. 38). Therefore, the sensing element 3-82 and the electronic component 3-86 can be prevented from being damaged by collision with an external object, and the size of the driving mechanism 3-1 in the X-axis can also be effectively reduced at the same time, thereby achieving the purpose of miniaturization of the mechanism.

It should be noted that the a positioning surface 3-142 is formed on the top side of each of the two notch portions 3-R. The sensing element 3-82 and the electronic component 3-86 can respectively be in contact with the positioning surfaces 3-142 of the two notch portions 3-R to improve the positioning accuracy between the circuit board 3-70 and the casing 3-10 and greatly improve the assembly efficiency.

Figure 39:
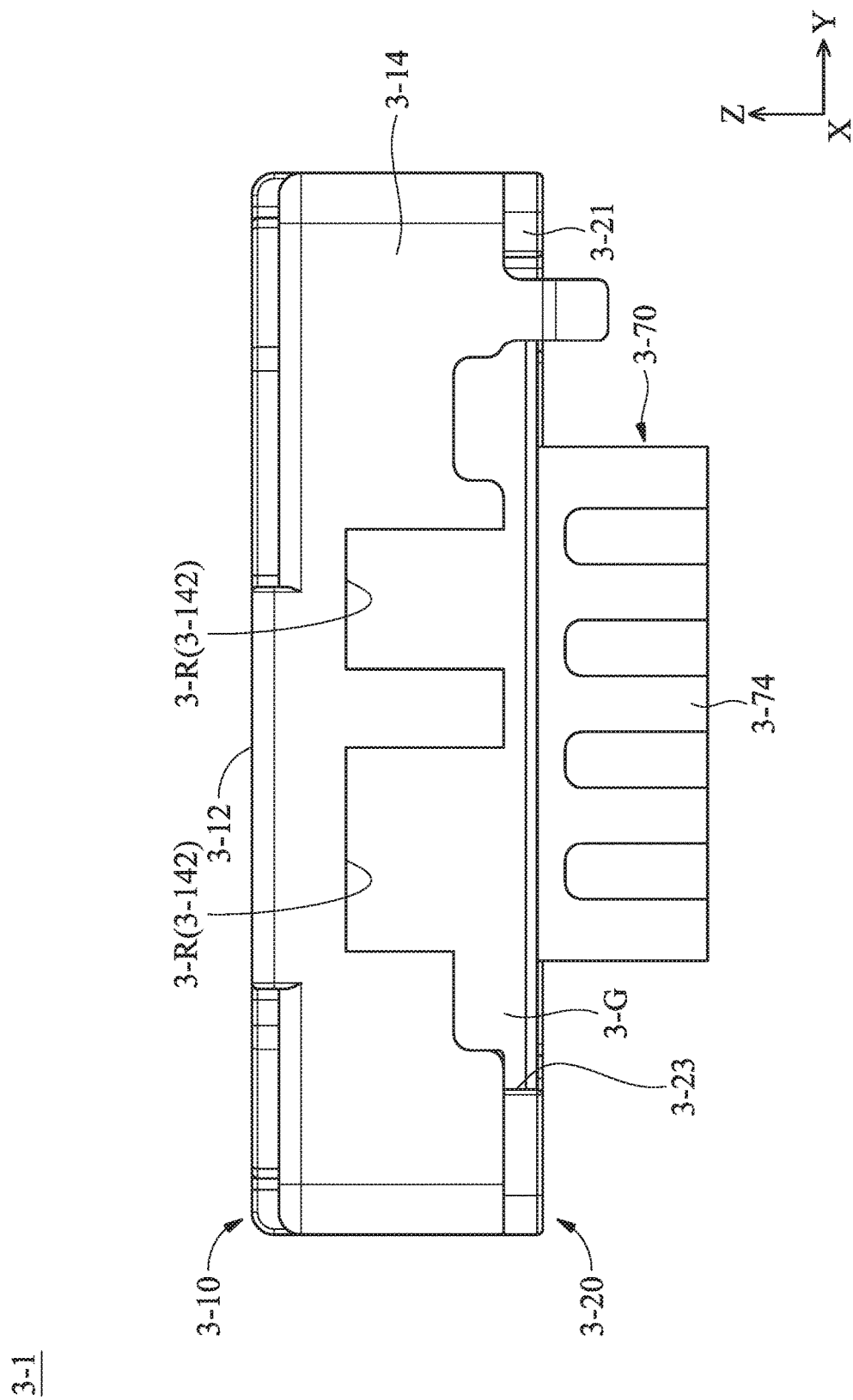
FIG. 39 is a diagram showing the notch portions 3-R in FIG. 37 filled with the adhesive 3-G.

Please refer to FIG. 39, which is a diagram showing the notch portions 3-R in FIG. 37 filled with the adhesive 3-G. As shown in FIG. 39, the adhesive 3-G can be applied to the notch portions 3-R during assembly, and the adhesive 3-G covers the sensing element 3-82 and the electronic component 3-86 so as to ensure the sensing element 3-82 and the electronic component 3-86 do not directly collide with external objects and to improve the overall structural strength and operational safety of the circuit board 3-70 as well at the same time.

Figure 40:
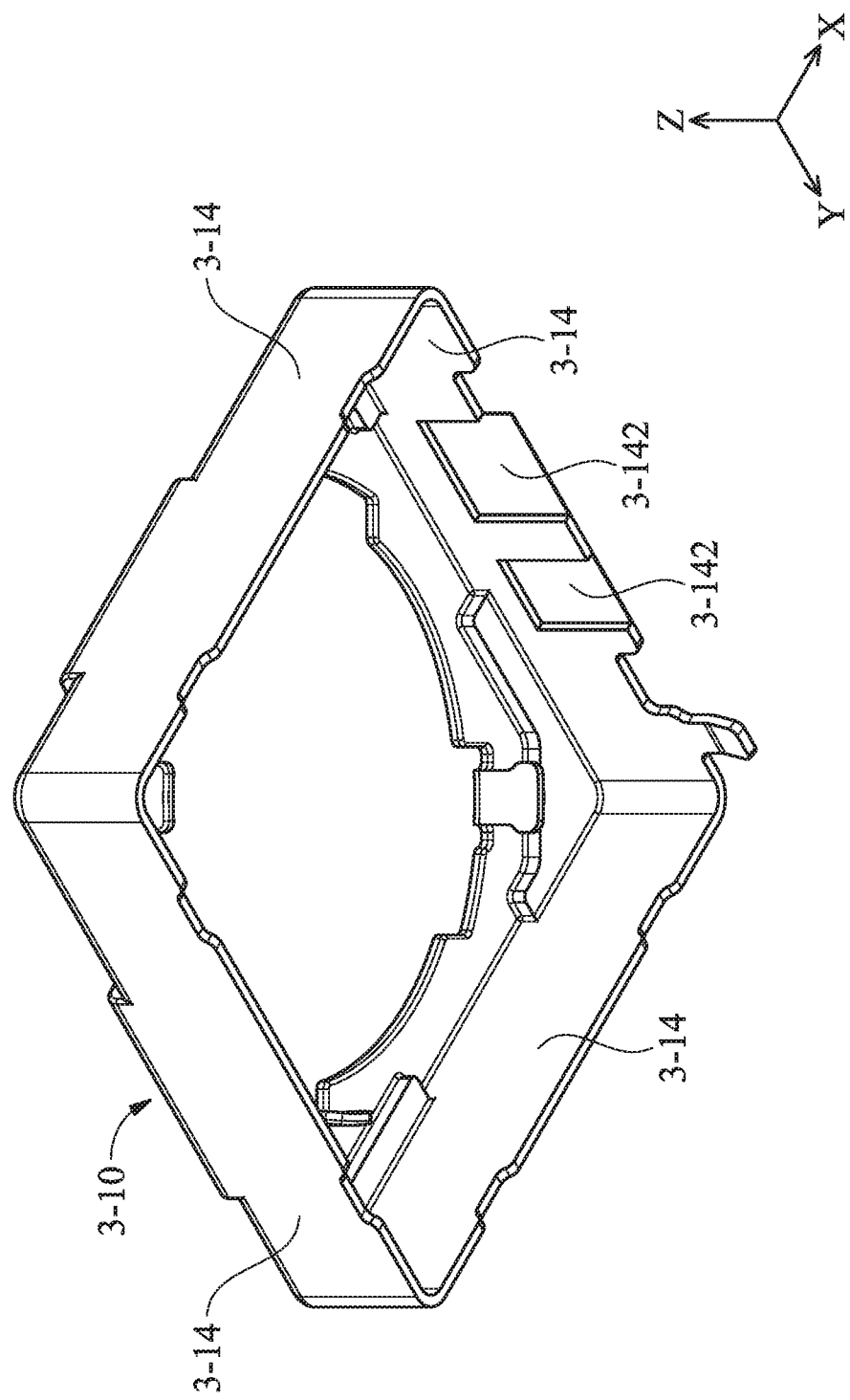
FIG. 40 is a schematic diagram of the casing 3-10 of the driving mechanism 3-1 according to another embodiment of the present disclosure.
Figure 41:
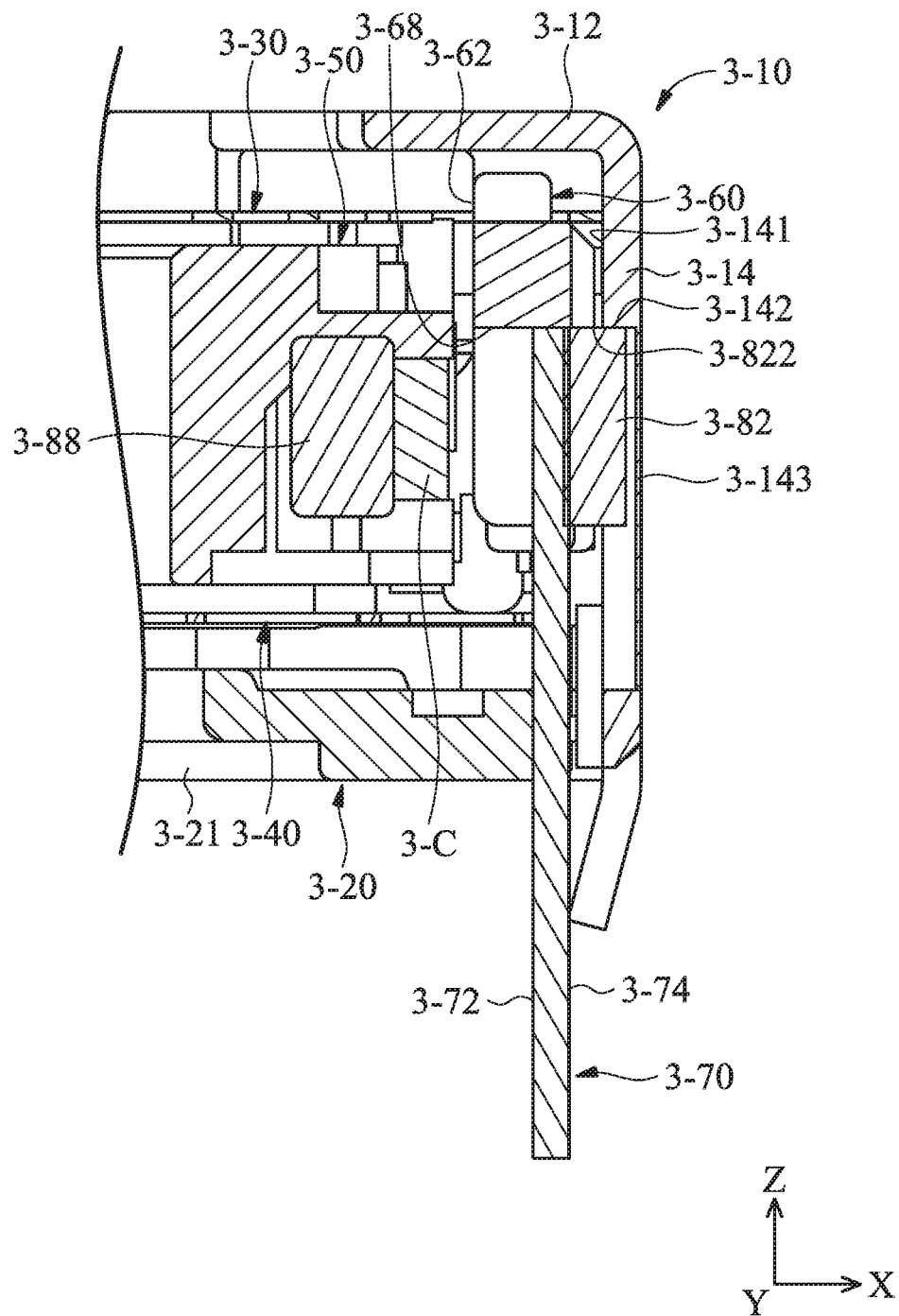
FIG. 41 is a diagram showing that a shielding portion 3-143 of the casing 3-10 in FIG. 40 shields the sensing element 3-82 on the circuit board 3-70.

Next, please refer to FIG. 40 and FIG. 41 together. FIG. 40 is a schematic diagram of the casing 3-10 of the driving mechanism 3-1 according to another embodiment of the present disclosure, and FIG. 41 is a diagram showing that a shielding portion 3-143 of the casing 3-10 in FIG. 40 shields the sensing element 3-82 on the circuit board 3-70.

The difference between the embodiment of FIG. 40 and FIG. 41 and the embodiment of FIG. 37 to FIG. 39 is mainly that at least one thin shielding portion 3-143 is formed on the side wall 3-14 of the casing 3-10 for shielding the sensing element 3-82 and/or the electronic component 3-86, and the shielding portion 3-143 is spaced apart from the sensing element 3-82 and/or the electronic component 3-86 by a distance. Thus, the shielding portion 3-143 on the casing 3-10 can shield and ensure that the sensing element 3-82 and the electronic component 3-86 do not collide with external objects, thereby enhancing safety of the sensing element 3-82 and the electronic component 3-86 in use.

Figure 42:
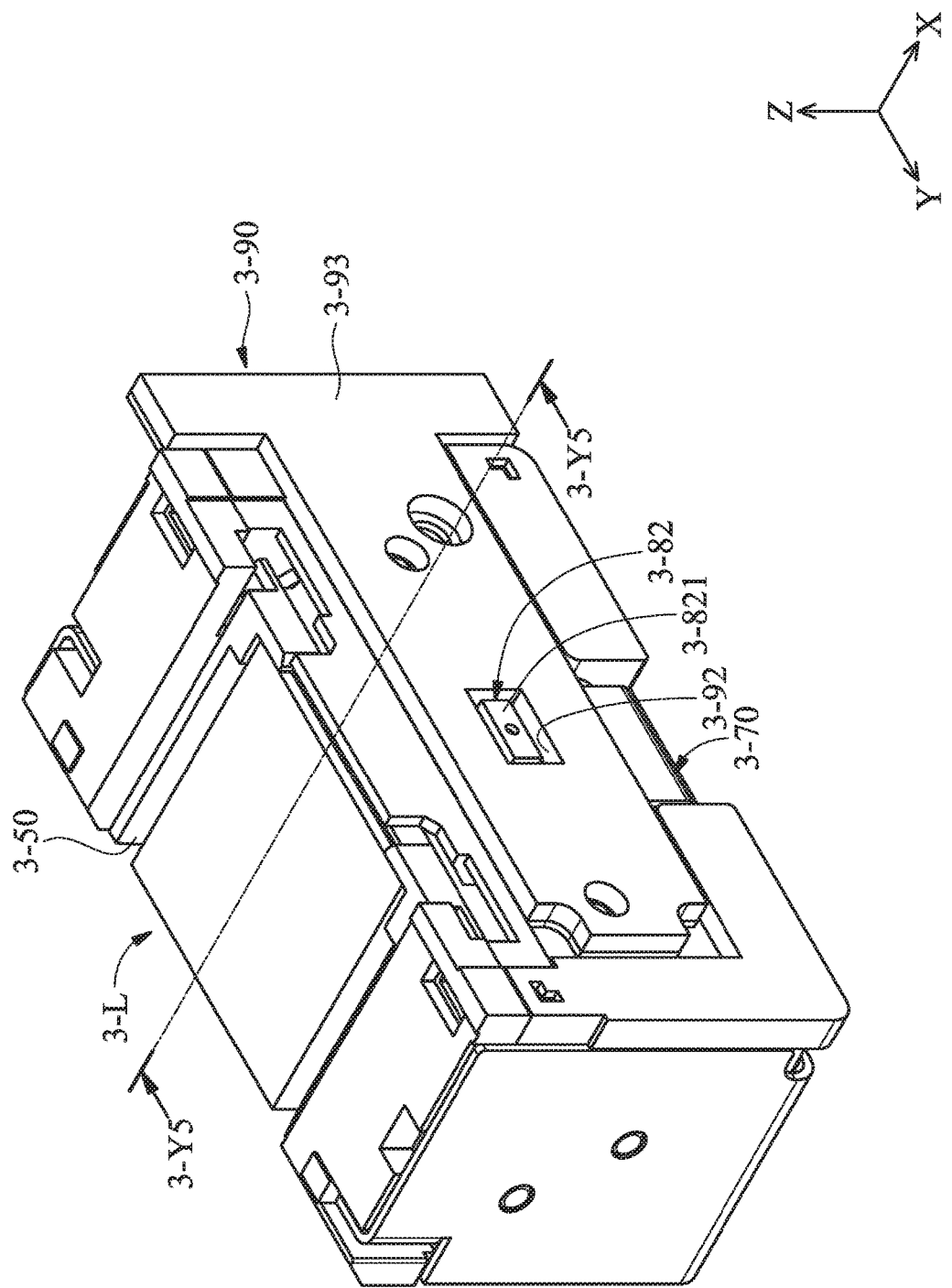
FIG. 42 is a schematic diagram of the driving mechanism 3-1 according to another embodiment of the present disclosure.
Figure 43:
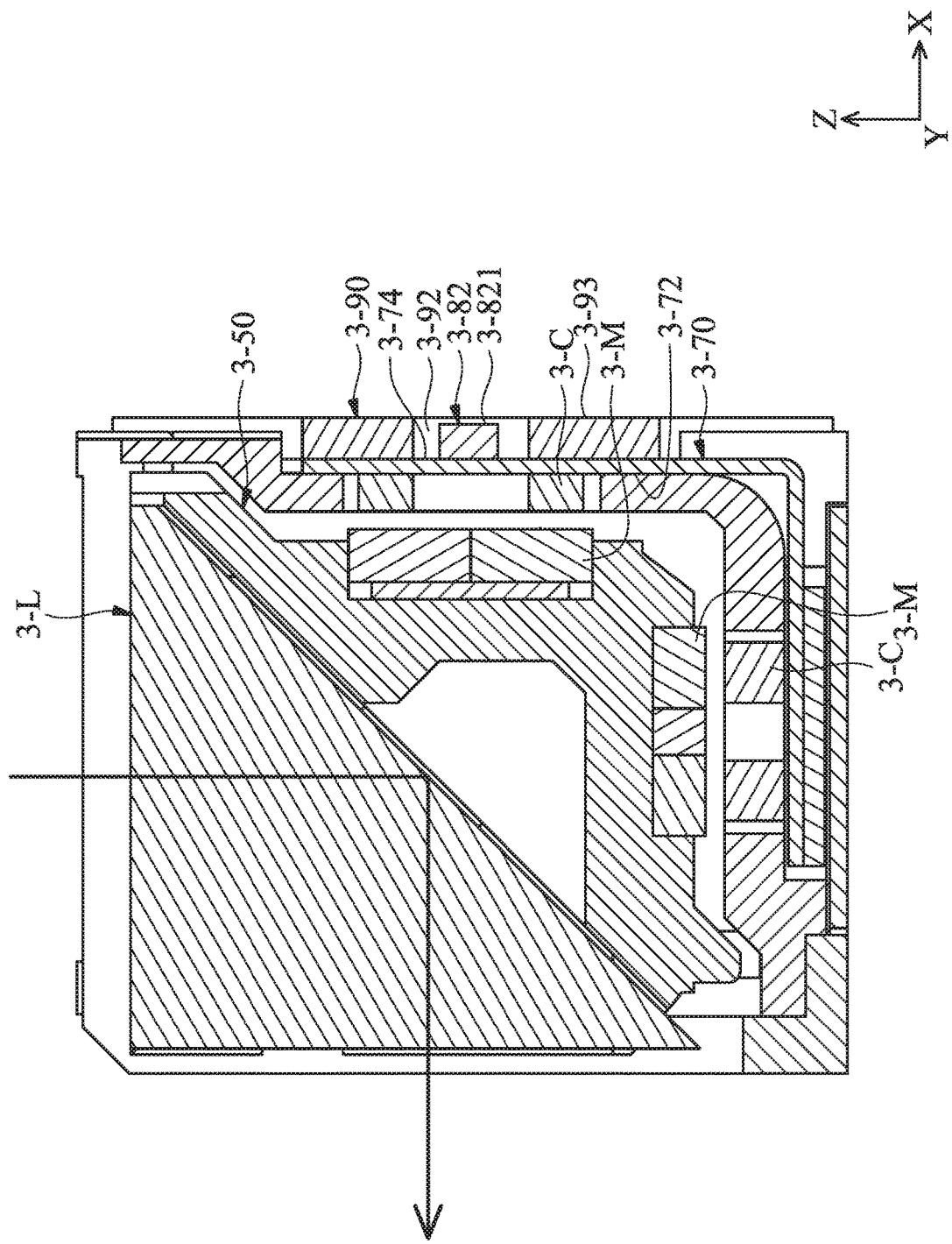
FIG. 43 is a cross-sectional view along line (3-Y5)-(3-Y5) in FIG. 42.

Next, please refer to FIG. 42 to FIG. 43. FIG. 42 is a schematic diagram of the driving mechanism 3-1 according to another embodiment of the present disclosure, and FIG. 43 is a cross-sectional view along line (3-Y5)-(3-Y5) in FIG. 42. As shown in FIG. 42 to FIG. 43, the driving mechanism 3-1 of this embodiment mainly includes an optical element 3-L (for example, a prism or a mirror), a holder 3-50, at least one coil 3-C, at least one magnetic component 3-M, a circuit board 3-70 and a casing 3-90. The optical element 3-L reflects an incident light traveling in the −Z-axis direction to a exiting light traveling in the −X-axis direction (as indicated by the direction of the arrow in FIG. 43).

It should be understood that the holder 3-50 is equipped with the optical element 3-L, and can constitute a movable module of the driving mechanism 3-1. The circuit board 3-70 is fixed to the casing 3-90, and they can constitute a fixed module of the driving mechanism 3-1. The movable module and the fixed module are connected to each other through at least one elastic member (not shown), so that the movable module can be suspended inside the fixed module. In addition, the magnetic component 3-M and the coil 3-C are respectively disposed on the holder 3-50 and the circuit board 3-70, and they can form a driving assembly to drive the movable module to move or rotate relative to the fixed module.

When a current is transmitted to the coil 3-C via the circuit board 3-70, an electromagnetic driving force can be generated between the magnetic component 3-M and the coil 3-C to drive the holder 3-50 to move relative to the circuit board. 3-70 and the casing 3-90. The magnetic field change of the magnetic component 3-M or the coil 3-C can be sensed by the sensing element 3-82 disposed on the circuit board 3-70, so as to obtain the relative movement between the movable module and the fixed module, so that motion of the optical element 3-L can be rapidly and efficiently controlled by the driving mechanism 3-1. The sensing element 3-82 with the magnetic component 3-M or the coil 3-C can form a position sensing assembly.

In the present embodiment, the sensing element 3-82 and the casing 3-90 are both disposed on the outer surface 3-74 of the circuit board 3-70. The casing 3-90 has a through hole 3-92, the sensing element 3-82 is disposed in the through hole 3-92, and its outer wall surface 3-821 is closer to the circuit board 3-70 than an outer side surface 3-93 of the casing 3-90, so that the sensing element 3-82 does not protrude from the circuit board 3-70 so as to prevent the sensing element 3-82 from being damaged by collision with external objects.

Figure 44:
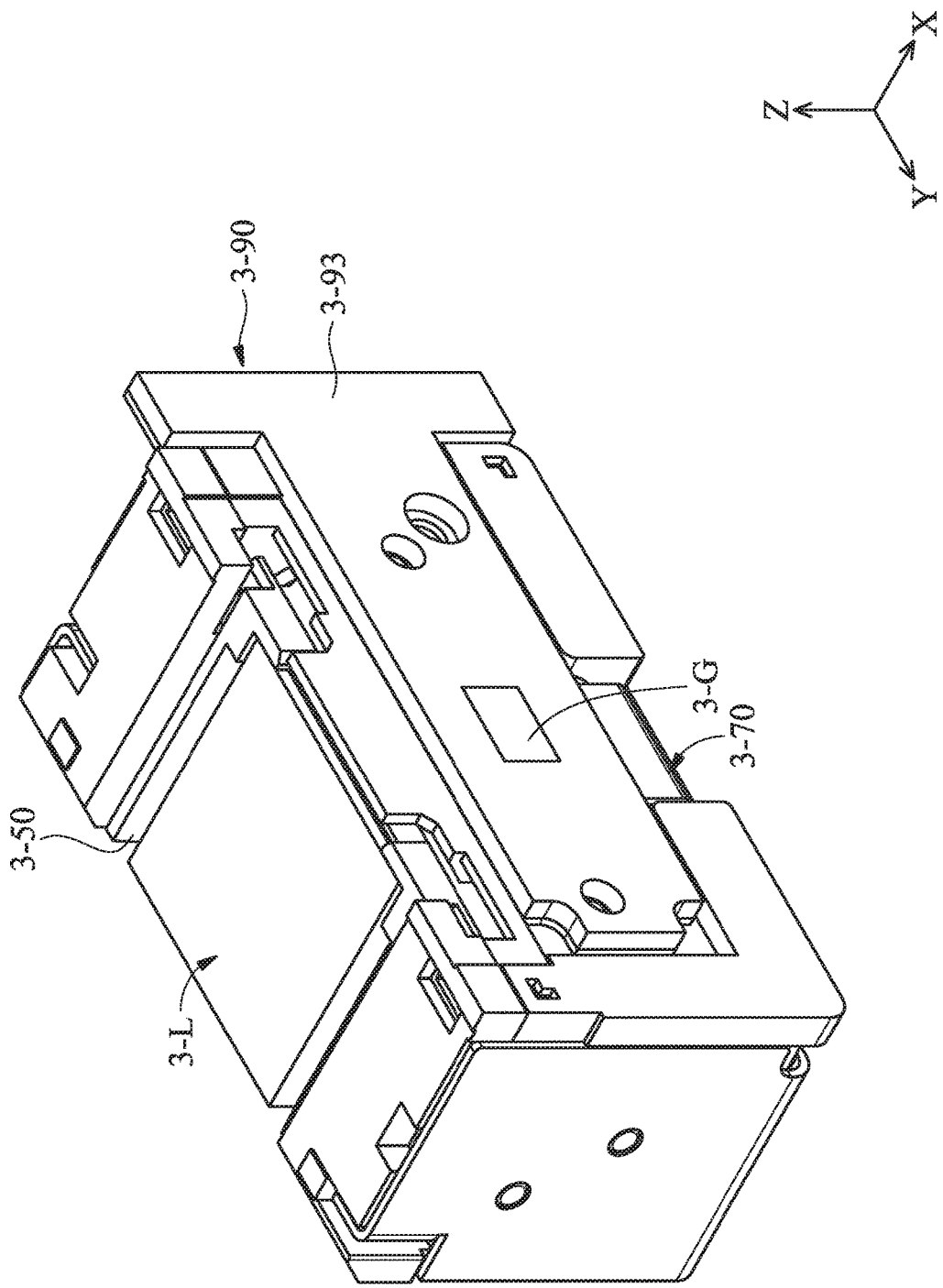
FIG. 44 is a schematic diagram showing that the through hole 3-92 in FIG. 42 is filled with the adhesive 3-G.

Next, please refer to FIG. 44, which is a schematic diagram showing that the through hole 3-92 in FIG. 42 is filled with the adhesive 3-G. As shown in FIG. 44, the adhesive 3-G can be applied in the aforementioned through hole 3-92 during assembly, and the adhesive 3-G covers the sensing element 3-82 so as to enhance the bonding strength between the circuit board 3-70, the sensing element 3-82 and the casing 3-90. In addition, the sensing element 3-82 can be protected by the adhesive 3-G to prevent the sensing element 3-82 from being damaged by collision with external objects, thereby improving the safety of use.

Figure 45:
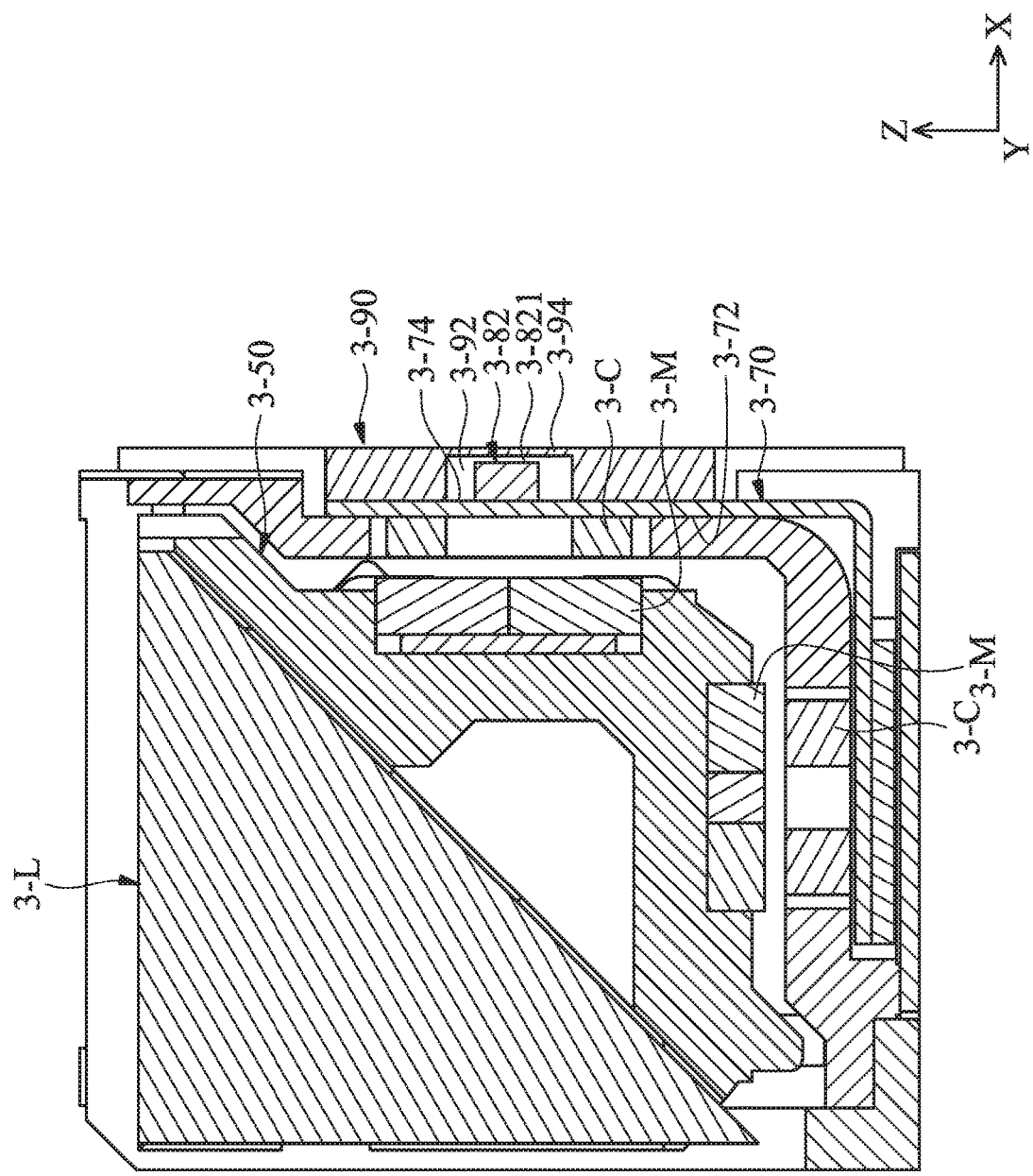
FIG. 45 is a cross-sectional view of a driving mechanism according to another embodiment of the present disclosure.

Please refer to FIG. 45, which is a cross-sectional view of a driving mechanism according to another embodiment of the present disclosure. The difference between the embodiment of FIG. 45 and the embodiment of FIG. 42 to FIG. 44 is mainly that a stop wall 3-94 is further formed on the casing 3-90, the stop wall 3-94 seals the aforementioned through hole 3-92 and covers the sensing element 3-82, and the outer wall surface 3-821 of the sensing element 3-82 is spaced apart from the stop wall 3-94 by a distance. Thus, the sensing element 3-82 can be protected by the aforementioned stop wall 3-94 to prevent the sensing element 3-82 from being damaged by collision with external objects, thereby ensuring the normal operation of the sensing element 3-82.

In conclusion, the driving mechanism of the present disclosure mainly places the sensing element or/and the electronic component on the outer surface of the circuit board to prevent the sensing element or/and the electronic component from being damaged by collision with the holder or other internal components during use, thereby improving the reliability and stability of the driving mechanism.

Furthermore, because the position of the aforementioned sensing element does not protrude from the outer side surface of the casing, and the sensing element or/and the electronic component can be covered by the adhesive or the shielding portion/stop wall on the casing, the sensing element or/and the electronic component are not damaged by collision with external objects, thereby ensuring that the sensing element or/and the electronic component operate normally.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. An optical camera system, comprising:
  a first lens driving mechanism, configured to hold a first optical component, and the first lens driving mechanism comprising:
    a first outer frame, having at least three side walls perpendicular to each other; and
    a first driving assembly, configured to drive the first optical component to move relative to the first outer frame;
  a second lens driving mechanism, configured to hold a second optical component, the second lens driving mechanism comprising:
    a second outer frame, having at least three side walls perpendicular to each other; and
    a second driving assembly, configured to drive the second optical component to move relative to the second outer frame;
  a casing, having at least three side walls perpendicular to each other, wherein at least two side walls of the first outer frame face two side walls of the casing, and at least two side walls of the second outer frame face two side walls of the casing;
  a third lens driving mechanism, configured to hold a third optical component, and the third lens driving mechanism comprising:
    a third outer frame, having at least three side walls perpendicular to each other; and a third driving assembly, configured to drive the third optical component to move relative to the third outer frame; and a processing circuit, wherein the first lens driving mechanism, the second lens driving mechanism and the third lens driving mechanism are configured to respectively generate a first image, a second image, and a third image, and the processing circuit is configured to composite the first image, the second image and the third image, and wherein the processing circuit is configured to compare the first image, the second image, and the third image, and when a graph is included in the first image but is not included in the second image and the third image, the processing circuit determines that the graph is a noise.

2. The optical camera system as claimed in claim 1, wherein the optical camera system further includes an outer frame configured to be disposed between the first outer frame, the second outer frame, and the casing after the first optical component and the second optical component are arranged in parallel, so that the first outer frame and the second outer frame do not move relative to the casing.

3. The optical camera system as claimed in claim 1, wherein the second driving assembly includes a shape memory alloy driving assembly.

4. The optical camera system as claimed in claim 1, wherein the second driving assembly includes a first driving magnetic member and a first driving coil.

5. The optical camera system as claimed in claim 4, wherein the first lens driving mechanism and the second lens driving mechanism are arranged in a first direction, and the first driving magnetic member has a long strip-shaped structure extending in the first direction.

6. The optical camera system as claimed in claim 4, wherein the first driving magnetic member is not disposed between the first optical component and the second optical component.

7. The optical camera system as claimed in claim 1, wherein the first lens driving mechanism further includes a position sensing assembly for sensing a distance of the first optical component moving along an optical axis of the first optical component.

8. The optical camera system as claimed in claim 7, wherein the first lens driving mechanism further includes a circuit member, and a portion of the position sensing assembly is disposed on the circuit member.

9. The optical camera system as claimed in claim 1, wherein the second lens driving mechanism further includes a reflecting unit.

10. The optical camera system as claimed in claim 1, wherein a direction of an incident light entering the first optical component is different from a direction of an incident light entering the second optical component.

11. The optical camera system as claimed in claim 1, wherein the first lens driving mechanism has a first focal length, the second lens driving mechanism has a second focal length, the third lens driving mechanism has a third focal length, the third focal length is greater than the second focal length, the second focal length is greater than the first focal length, and the processing circuit is configured to composite the first image, the second image and the third image according to the third image.

12. The optical camera system as claimed in claim 11, wherein the third image corresponds to a region in the second image, and the second image corresponds to a region in the first image.

13. The optical camera system as claimed in claim 1, wherein at least one of the first image, the second image and the third image includes infrared light information.

14. The optical camera system as claimed in claim 1, wherein at least one of the first image, the second image and the third image is a color image, and at least one of the first image, the second image and the third image is a black and white image.

15. The optical camera system as claimed in claim 1, wherein the first image, the second image and the third image respectively include information of different colors, and information of colors of the first image, the second image and the third image are not the same.

16. The optical camera system as claimed in claim 15, wherein the first image, the second image and the third image respectively include red light information, blue light information and green light information.

17. The optical camera system as claimed in claim 1, wherein each of the first lens driving mechanism, the second lens driving mechanism and the third lens driving mechanism has a circuit pin, and the circuit pins are disposed on a same side of the optical camera system.

18. The optical camera system as claimed in claim 1, wherein the first optical component has a first focal length, the second optical component has a second focal length, and the second focal length is at least three times the first focal length.

* * * * *